US005621583A

United States Patent [19]
Parks et al.

[11] Patent Number: 5,621,583
[45] Date of Patent: Apr. 15, 1997

[54] METHOD AND DEVICE FOR READING AND WRITING MAGNETICALLY ENCODED DATA ON LINEAR TRACKS

[75] Inventors: A. Harold Parks, San Leandro; James R. W. Clymer, Cupertino; Douglas A. Reim, San Jose; William N. Aldrich, Redwood City; Ajeet Singh, Berkeley; Albert S. Hoagland, Saratoga; Hi-Dong Chai, San Jose, all of Calif.

[73] Assignee: Cartesian Data, Inc., Sunnyvale, Calif.

[21] Appl. No.: 606,359

[22] Filed: Feb. 23, 1996

Related U.S. Application Data

[62] Division of Ser. No. 215,140, Mar. 18, 1994, Pat. No. 5,521,774.

[51] Int. Cl.$^6$ .................................................. G11B 5/52
[52] U.S. Cl. ............................................. 360/81; 360/106
[58] Field of Search .......................... 360/81, 69, 82–83, 360/106, 109

[56] References Cited

U.S. PATENT DOCUMENTS

| | | | |
|---|---|---|---|
| 4,081,847 | 3/1978 | Shimada et al. | 360/107 |
| 4,363,045 | 12/1982 | Herman | 360/104 |
| 4,423,450 | 12/1983 | Hamilton | 360/111 |
| 4,636,893 | 1/1987 | McClure | 360/101 |
| 4,669,013 | 5/1987 | Scranton et al. | 360/106 |
| 4,676,649 | 6/1987 | Phillips | 356/401 |
| 4,692,999 | 9/1987 | Frandsen | 29/596 |
| 4,734,794 | 3/1988 | Mehnert et al. | 360/2 |
| 4,743,987 | 5/1988 | Farmer et al. | 360/106 |
| 4,745,503 | 5/1988 | Muraoka et al. | 360/106 |
| 4,751,598 | 6/1988 | Hamilton | 360/110 |
| 4,819,091 | 4/1989 | Brezoczky et al. | 360/97.01 |
| 4,819,106 | 4/1989 | Ueda et al. | 360/106 |
| 4,860,139 | 8/1989 | Hamilton | 360/126 |
| 4,868,432 | 9/1989 | Frandsen | 310/12 |
| 4,945,515 | 7/1990 | Ooumi et al. | 365/174 |
| 4,972,397 | 11/1990 | Zurbrick et al. | 369/44.16 |
| 4,974,107 | 11/1990 | Liu et al. | 360/106 |
| 4,984,115 | 1/1991 | Takahashi et al. | 360/106 |
| 5,041,932 | 8/1991 | Hamilton | 360/104 |
| 5,047,883 | 9/1991 | Aldrich et al. | 360/109 |
| 5,063,712 | 11/1991 | Hamilton et al. | 51/67 |
| 5,073,242 | 12/1991 | Hamilton | 204/192.22 |
| 5,079,654 | 1/1992 | Uno et al. | 360/78.14 |
| 5,111,351 | 5/1992 | Hamilton | 360/104 |
| 5,121,270 | 6/1992 | Alcudia et al. | 360/77.01 |
| 5,122,917 | 6/1992 | Spainger | 360/126 |
| 5,163,218 | 11/1992 | Hamilton | 29/603 |
| 5,166,850 | 11/1992 | Dolby et al. | 360/77.13 |
| 5,174,012 | 12/1992 | Hamilton | 29/603 |
| 5,220,473 | 6/1993 | Brock et al. | 360/121 |
| 5,262,908 | 11/1993 | Iwamatsu et al. | 360/77.12 |
| 5,394,277 | 2/1995 | Pahr et al. | 360/53 |
| 5,394,278 | 2/1995 | Pahr et al. | 360/66 |
| 5,396,376 | 3/1995 | Chambors et al. | 360/48 |
| 5,400,192 | 3/1995 | Mizoshita et al. | 360/77.16 |
| 5,453,887 | 9/1995 | Negishi et al. | 360/77.01 |

*Primary Examiner*—John H. Wolff
*Attorney, Agent, or Firm*—Skjerven, Morrill, MacPherson, Franklin & Friel; Alan H. MacPherson; E. Eric Hoffman

[57] ABSTRACT

A memory storage module for storing and accessing information which includes a flat storage medium having an X-axis and a Y-axis. A plurality of read/write heads are coupled to a head array assembly which is capable of motion along the X-axis. The head array assembly positions the heads adjacent to the medium. An X-axis motor is coupled to the head array assembly and causes the heads to undergo reciprocating substantially linear motion along the X-axis of the medium. A Y-axis motor creates linear motion between the heads and the medium along the Y-axis of the medium. The heads are controlled to store or access information on the medium as the heads move across the X-axis of the medium. The Y-axis motor moves the heads from track to track along the Y-axis of the medium. The Y-axis motor can be connected to move either the medium or the head array assembly along the Y-axis.

10 Claims, 80 Drawing Sheets

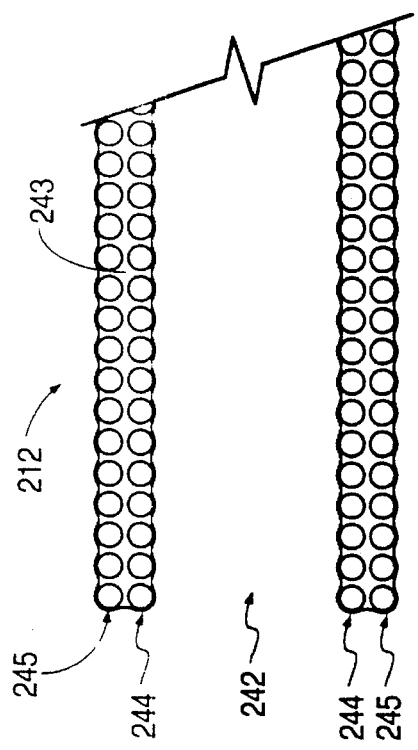
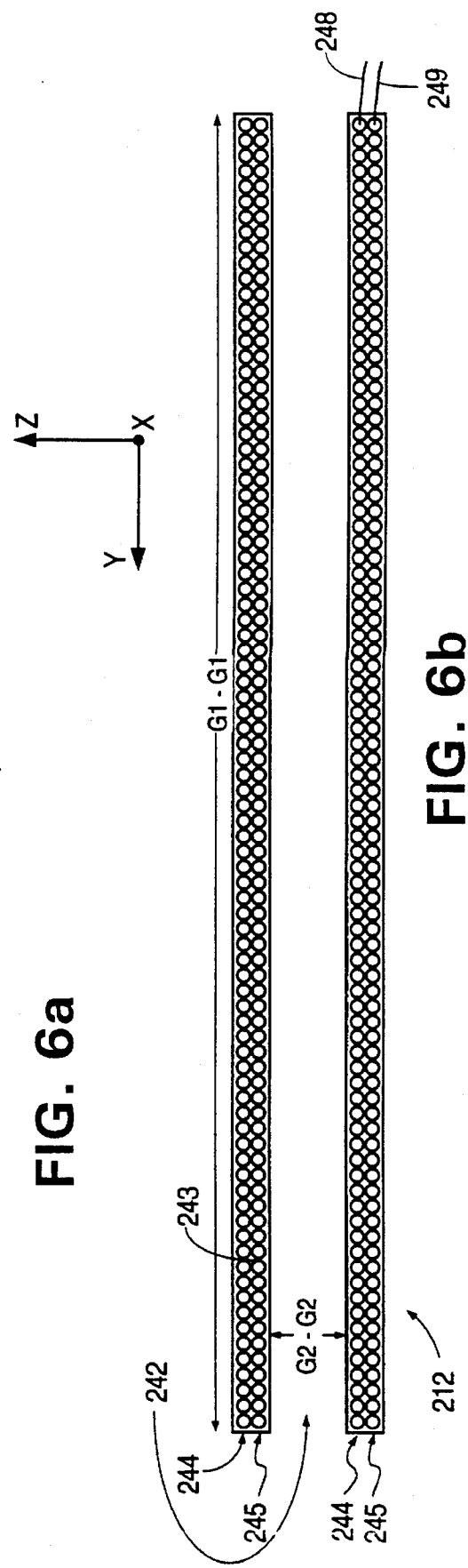

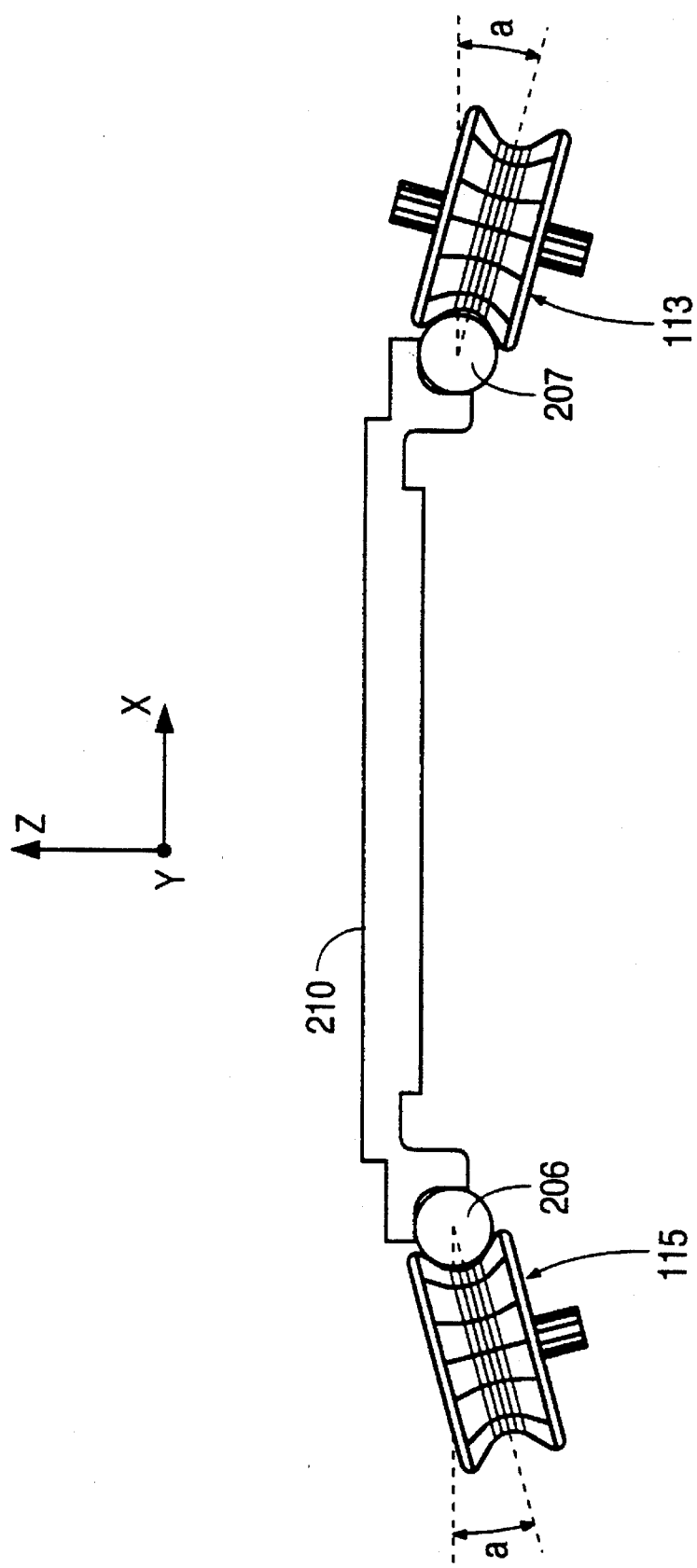

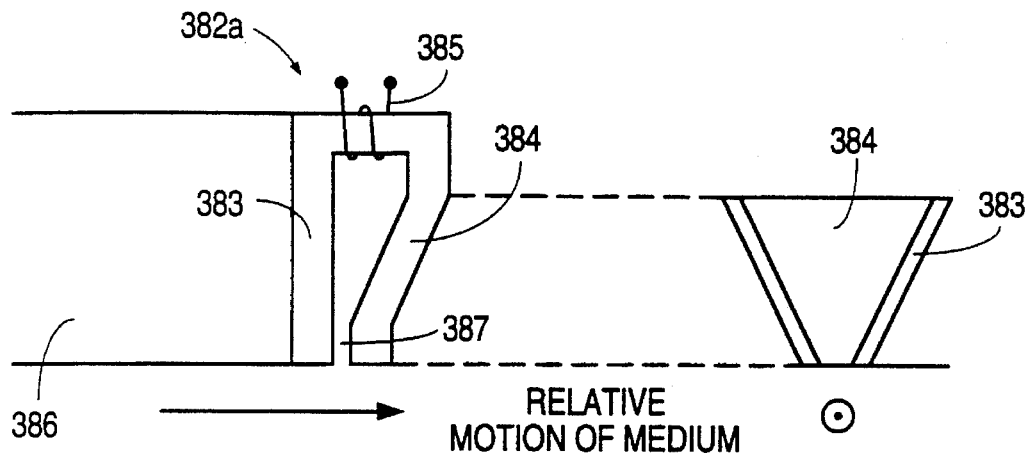
FIG. 16a   FIG. 16b
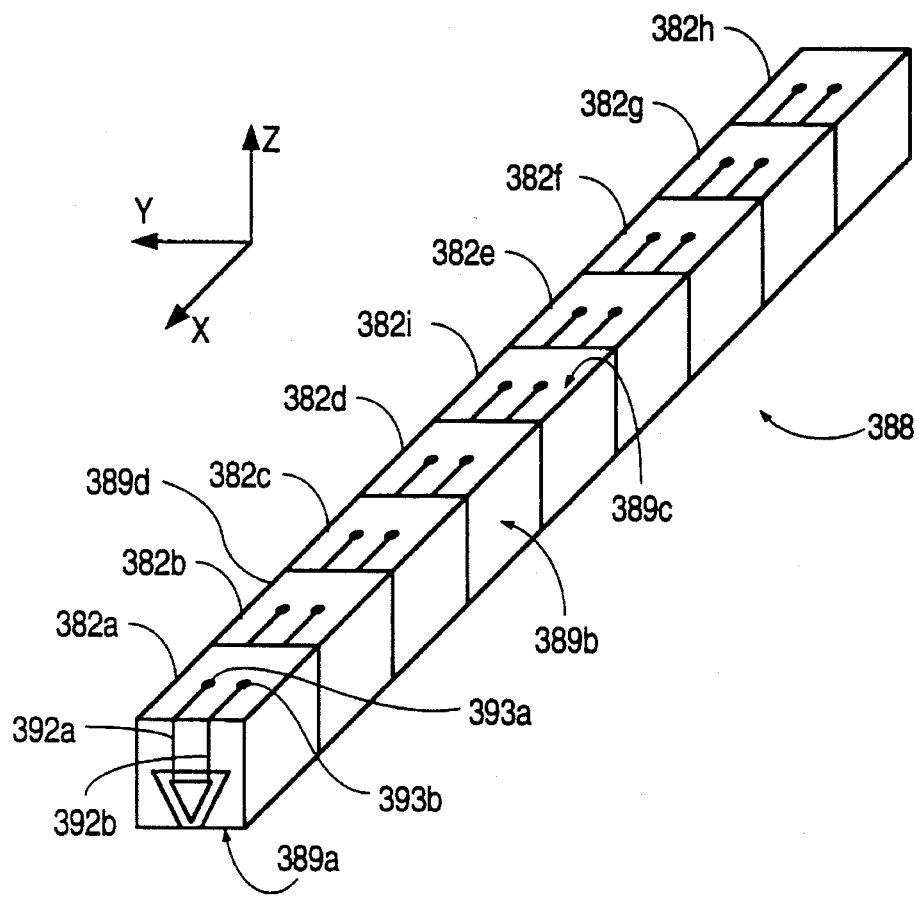
FIG. 16c

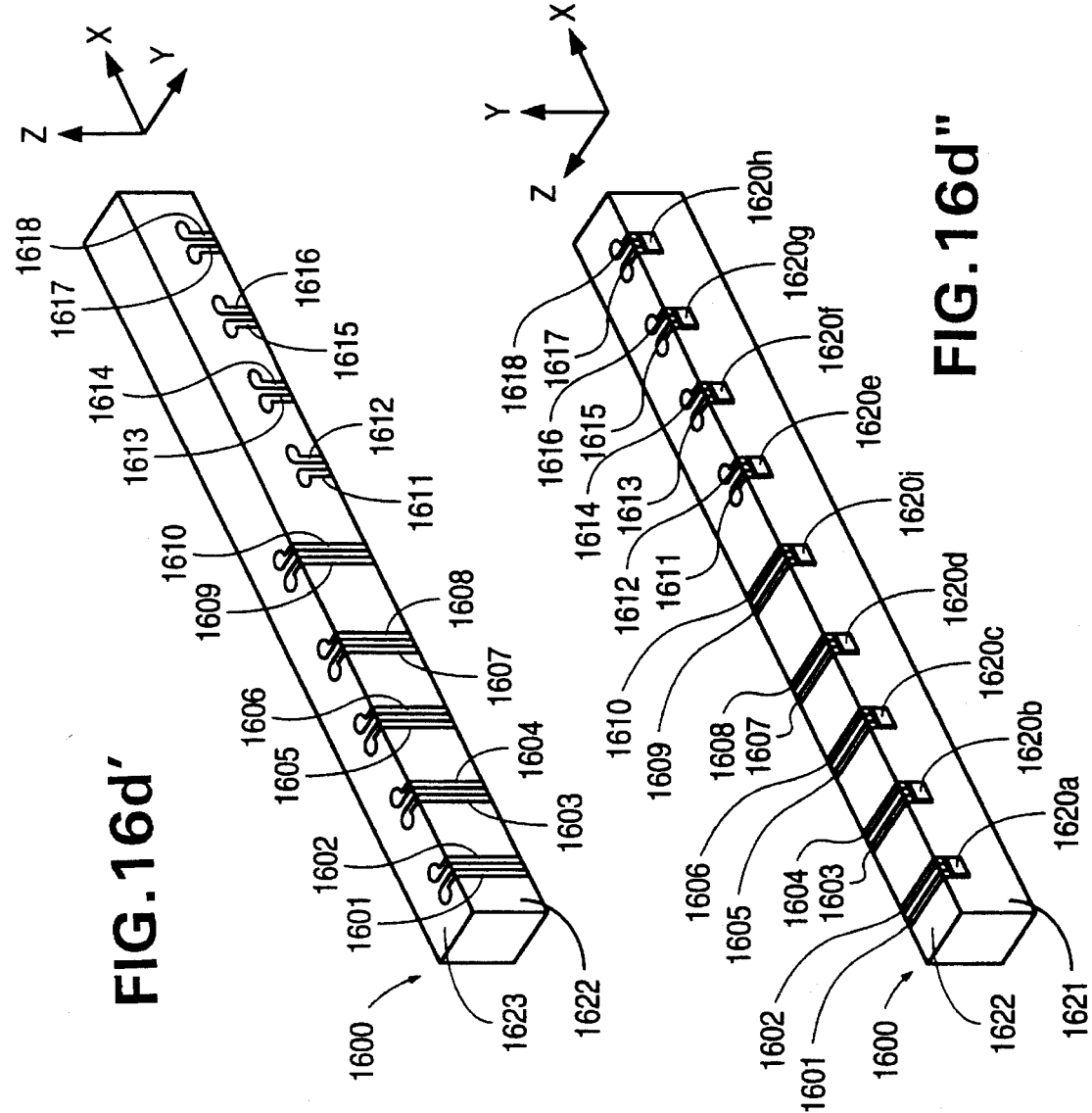

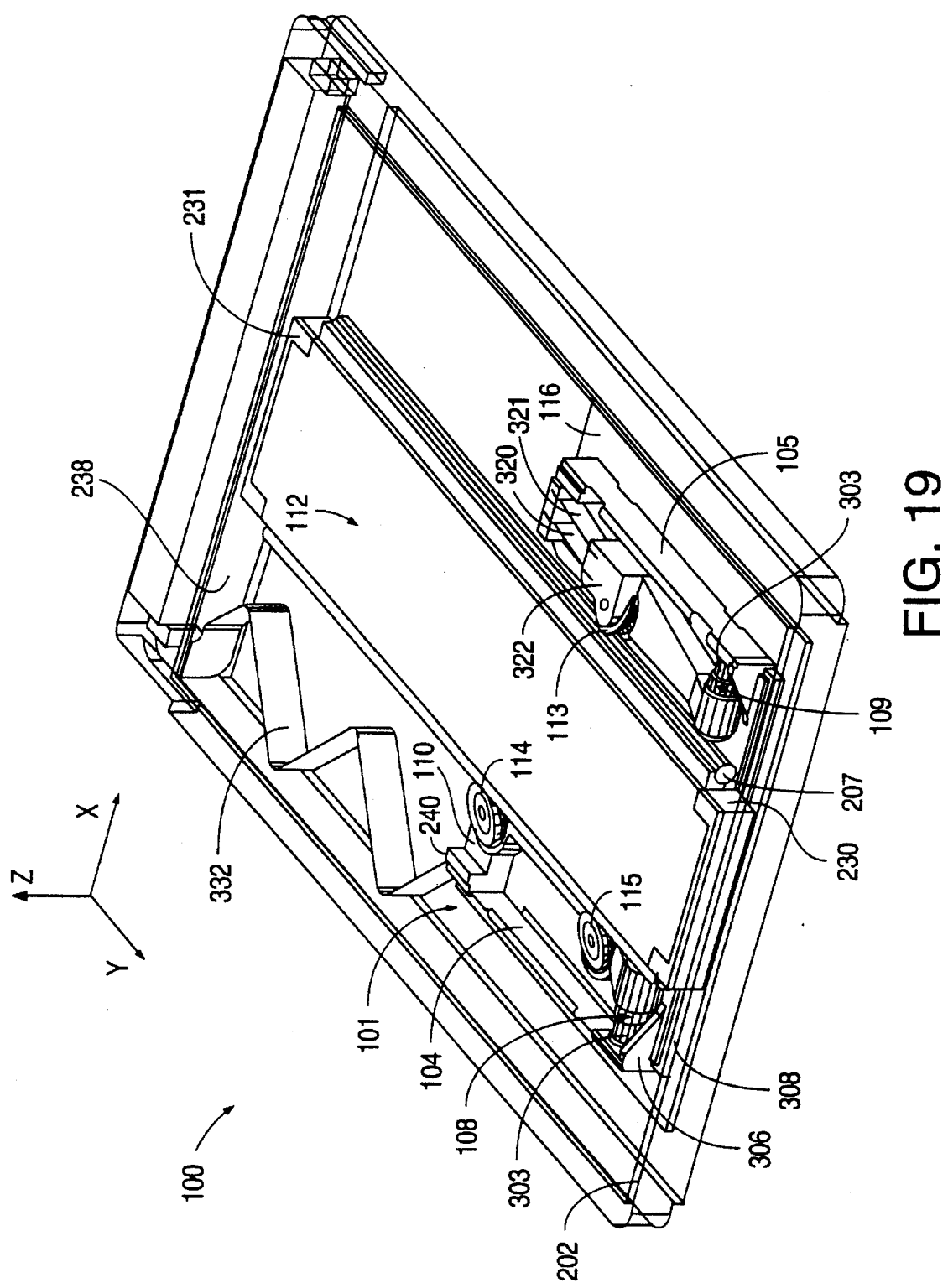

Velocity (in/s) vs. Displacement (in)

Displacement (in) vs. Time (ms)

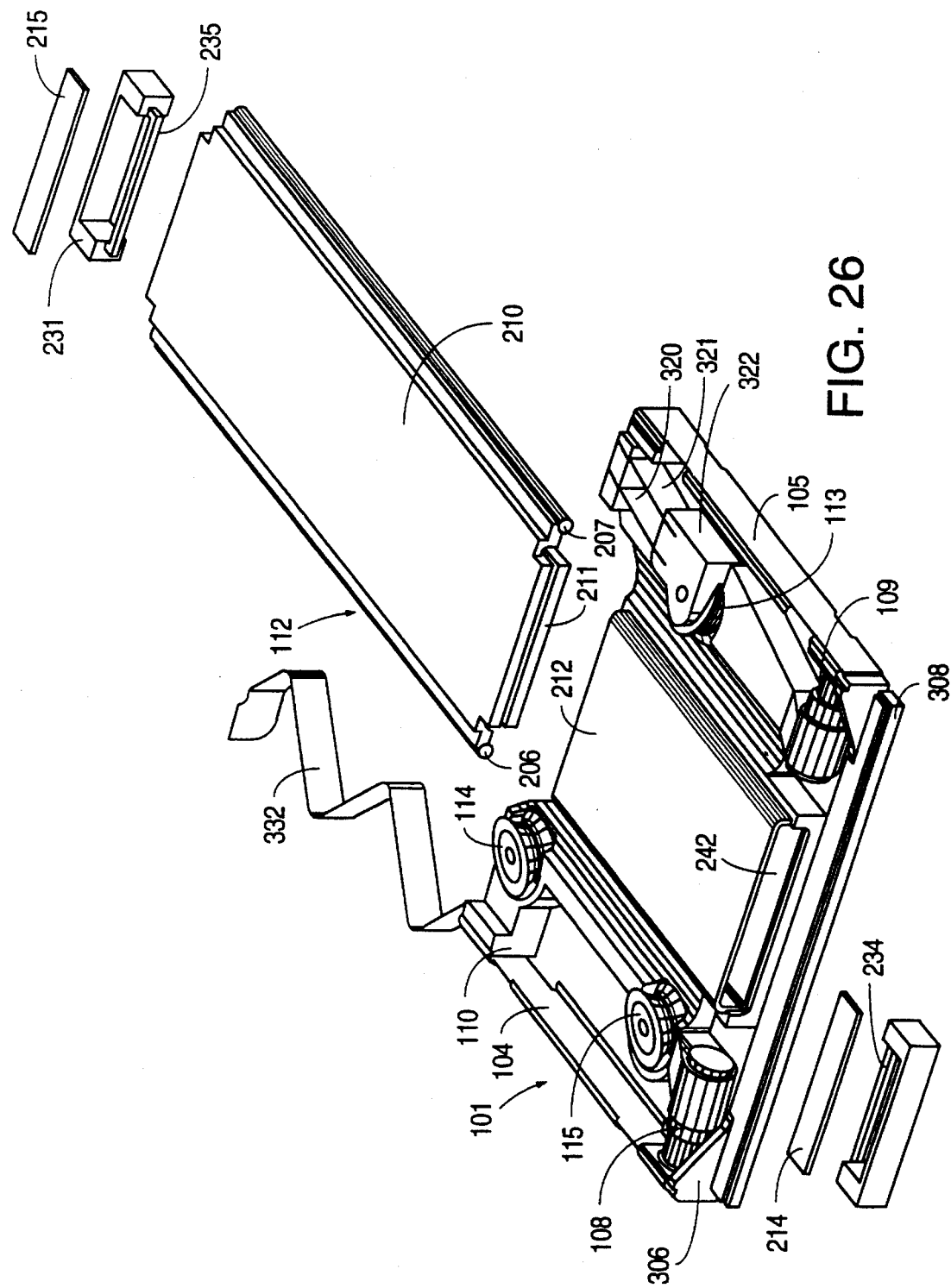

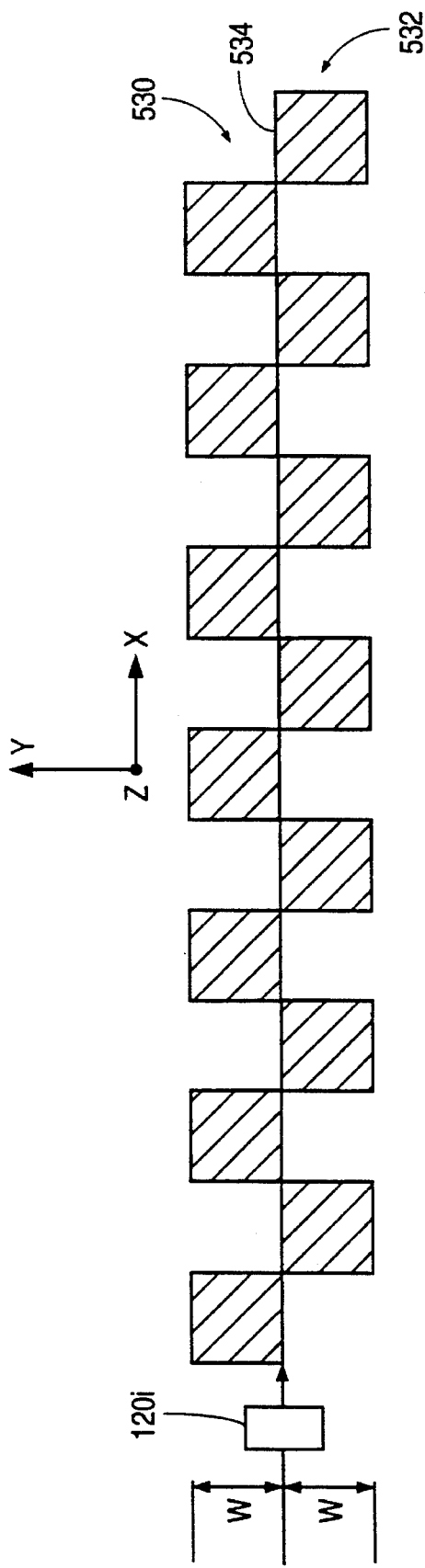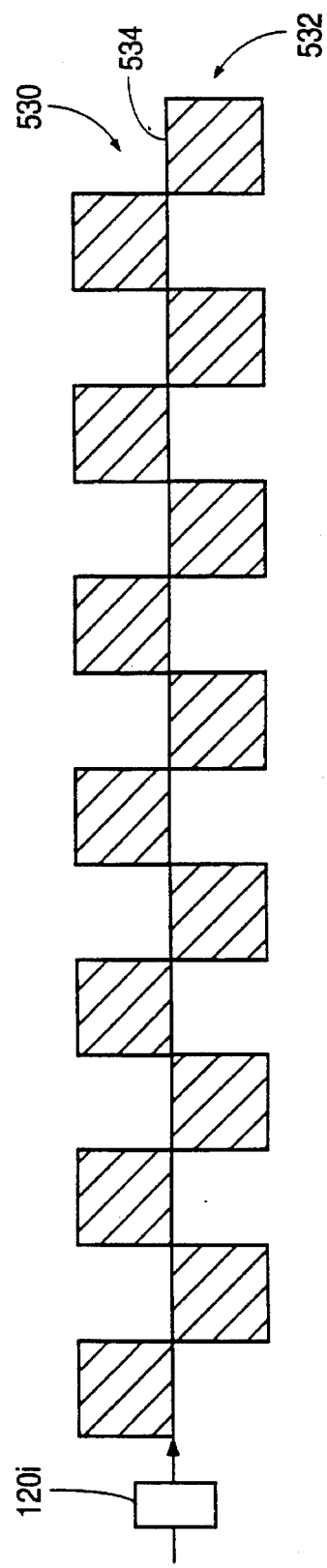
FIG. 28b
FIG. 28c

METHOD AND DEVICE FOR READING AND WRITING MAGNETICALLY ENCODED DATA ON LINEAR TRACKS

This application is a division of application Ser. No. 08/215,140, filed Mar. 18, 1994 now U.S. Pat. No. 5,521,774.

FIELD OF THE INVENTION

The present invention relates to a method and device for reading and writing information onto a magnetic medium.

BACKGROUND OF THE INVENTION

Hard disk drive systems use a magnetic head to read and write magnetically encoded information on a magnetic disk. When the hard disk drive system is off, the magnetic head rests on the surface of the magnetic disk or is retracted from the surface of the medium to protect the medium. When the system is started, the hard disk is rotated about its central axis. The magnetic head remains in contact with the disk until the disk achieves a relative speed with respect to the head which enables the head to "fly" above the disk. Read and write operations are performed as the magnetic head flies above circular tracks on the hard disk.

SUMMARY OF THE INVENTION

In accordance with the present invention, a method and device for storing and accessing information on a flat storage medium having an X-axis and a Y-axis is provided. In one embodiment, a read/write head is positioned adjacent to the flat storage medium and an X-axis motor creates a reciprocating, substantially linear motion between the read/write head and the medium along the X-axis of the medium. The read/write head causes bits of data to be stored or accessed on a track of the medium as the read/write head moves across the X-axis of the medium. A Y-axis motor creates a linear motion between the read/write head and the medium along the Y-axis of the medium. The relative linear motion of the read/write head along the Y-axis moves the read/write head from track to track on the medium.

In alternate embodiments, the Y-axis motor can cause either the medium or the read/write head to move along the Y-axis. Similarly, the X-axis motor can cause either the medium or the read/write head to reciprocate along the X-axis.

In one embodiment, a plurality of read/write heads are coupled together, such that the read/write heads reciprocate along the X-axis in unison. This allows the read/write heads to simultaneously access or store information on the medium as the read/write heads move along the X-axis. In general, a plurality of stripes of data tracks are provided on the medium such that one data stripe corresponds uniquely to one of the plurality of read/write heads. While each data stripe extends along the Y-axis, the data tracks in each data stripe are parallel to the X-axis.

Because a plurality of data channels are simultaneously accessible from the medium surface, a high data transfer rate is obtained. This high data rate is particularly useful in communication applications such as burst mode information storage, satellite communications, cellular phone fax and voice mail, graphics fax, video transmission and imaging. In applications where lower data rates are desirable, the data from multiple data heads is multiplexed.

In one embodiment, a servo head is physically coupled to the read/write heads, such that the read/write heads and the servo head reciprocate along the X-axis in unison. As the servo head moves along the X-axis, it causes positioning information stored on a servo track in a servo stripe of the medium to be accessed. In one embodiment, the servo stripe is located in the middle of the medium within an equal number of data stripes positioned on either side of the servo stripe. In other embodiments, the servo stripe is not the middle stripe.

In another embodiment, the servo information is embedded in the data tracks, and the read/write heads are used to access the servo information. In yet another embodiment, more than one servo head is used to read servo information from a corresponding number of servo stripes. In another embodiment, an optical system is used to obtain servo information.

The servo positioning information is provided to control circuitry which controls the operation of the X-axis and Y-axis motors. In this manner, the velocity of the servo head along the X-axis and the position of the servo head along the Y-axis are precisely controlled. Because the read/write heads are coupled to the servo head, the velocity and positioning of the read/write heads are also precisely controlled. Consequently, the read/write heads can be moved in accordance with a controlled velocity profile while accessing and storing information on the medium. Also, the distance between tracks along the Y-axis can be small because the read/write heads can be precisely positioned along the Y-axis.

In one embodiment, the medium is either square or rectangular. The medium contains a data stripe corresponding to each of the read/write heads and a servo stripe corresponding to the servo head. Each data stripe includes a plurality of fixed length data tracks which are substantially parallel to the X-axis of the medium. While each data track is substantially parallel to the X-axis, the data tracks in each stripe collectively are "aligned" along the Y-axis of the medium, such that each data stripe has a rectangular shape on the surface of the medium. A plurality of data stripes and one servo stripe are formed across the medium in the X-direction. Bits of data can be accessed or stored on the medium when the read/write heads pass over the data tracks while traveling along the X-axis. Similarly, the servo stripe includes a plurality of fixed length servo tracks each of which is parallel to the X-axis of the medium but which together are collectively "aligned" with the Y-axis of the medium. The servo stripe has a rectangular shape on the surface of the medium. In one embodiment, the servo tracks are longer than the data tracks, thereby allowing the servo head to access information from each of the servo tracks during brief periods before and after the read/write heads have passed over their associated data tracks. Bits of servo information can be accessed by the servo head as the servo head passes over servo tracks while traveling along the X-axis of the medium.

The present invention also includes a method of moving the read/write heads and servo head along the Y-axis to position the read/write heads and servo head over the desired tracks on the medium (i.e., track seeking). This method includes moving the servo head in the X direction over one of the servo tracks along the X-axis of the medium to read the stored servo information. The servo information, which includes information representative of the current position of the servo head along the Y-axis (i.e., the current track number), is used to generate a positioning signal which is provided to the Y-axis motor to move the servo head along the Y-axis from the servo head's current position on a specific servo track to a new position on another servo track which corresponds to the position of the desired data tracks. Because the read/write heads are coupled to the servo head, the read/write heads move in unison with the servo head along the Y-axis. Consequently, the read/write heads are also moved to the position along the Y-axis corresponding to the desired data tracks on the medium.

After the servo head and read/write heads are moved along the Y-axis to the desired tracks (which run in the X direction), the servo head and read/write heads are fine positioned along the Y-axis on the desired tracks. To perform this fine positioning (i.e., track following), the servo head is moved in the X-direction along the X-axis of the desired servo track to read centering information stored on the servo track. The centering information, which is representative of the distance along the Y-axis that the servo head is displaced from the Y-axis center of the servo track, is used to generate a signal which is provided to the Y-axis motor to adjust the position of the servo head along the Y-axis, such that the servo head is positioned over the Y-axis center of the servo track. By centering the servo head along the Y-axis on the servo track, the read/write heads are similarly centered along the Y-axis on their respective data tracks.

The present invention also involves controlling the velocity of the servo head and read/write heads as these heads are reciprocating in the X-direction along the X-axis of the medium. Controlling the velocity of these heads within a certain range assures that the heads are capable of storing and accessing information on the medium. As the servo head is moved over a servo track in the X-direction along the X-axis of the medium, the servo head reads a positioning signal which indicates the position of the servo head along the X-axis of the servo track. This positioning signal is used to generate a signal representative of the actual velocity of the servo head along the X-axis. The positioning signal is also used to create a third signal representative of the desired velocity of the servo head for the given position of the servo head along the X-axis. The difference between the signal representative of the actual velocity of the servo head along the X-axis and the signal representative of the desired velocity of the servo head along the X-axis is used to control the velocity of the servo head, and thereby also control the velocity of the read/write heads.

The present invention also includes an apparatus for moving the heads in a linear manner along the Y-axis. This apparatus includes a pair of fixed guide rods positioned parallel to the Y-axis in a plane which is parallel to the X-Y plane of the medium. A plurality of rotatable guide rollers are used to couple the guide rods to the support structure for the heads. Each guide roller has a rotating roller having a substantially V-shaped groove. The groove of each roller is positioned on one of the guide rods such that each groove tangentially contacts its associated guide rod at two places. Each guide roller also has a axle which is affixed to a carriage assembly. In this manner, the guide rollers support the carriage assembly on the guide rods. The guide rollers are each positioned at an angle with respect to the plane in which the guide rods lie. In this configuration, a force applied to the carriage assembly along the Y-axis causes the guide rollers to rotate freely along the guide rods, thereby moving the carriage assembly along the Y-axis. The heads are connected to the carriage assembly, such that the heads are also moved along the Y-axis. This configuration, and in particular, the angling of the guide rollers, provides an axial preload to the guide rollers and renders the carriage assembly less sensitive to forces applied along axes other than the Y-axis.

Another feature of the present invention is a monolithic or composite head array which physically couples a plurality of magnetic read/write heads so that these heads can be moved in unison along tracks (along the X-axis) of the magnetic medium, thereby allowing magnetic read/write heads to read and write data onto the magnetic medium. In one embodiment, these heads are fabricated along a single line. Thus, when the head array is positioned adjacent to the medium, the heads are aligned with the X-axis of the medium and when the head array is reciprocated along the X-axis, each of the heads in the head array is reciprocated along the X-axis. To perform read and write operations on the magnetic medium as the heads move along the X-axis, the gap of each head is positioned perpendicular to the X-axis.

In one embodiment of the present invention, the head array includes a semiconductor substrate. Both the read/write heads and the pre-amplifiers required for each read/write head are fabricated on the semiconductor substrate, thereby advantageously locating the pre-amplifiers close to their respective read/write heads.

Unlike prior art disk drives, the memory storage module of the present invention provides relative motion between the heads and the medium only when storing or accessing information on the medium and during starting and stopping of the memory storage module. This results in substantial power savings and a low duty cycle for the X-axis and Y-axis motors.

Additionally, the start-up time of a memory storage module of the present invention is approximately two orders of magnitude less than prior art disk drives. In prior art disk drives, the magnetic head is typically in contact with the disk for hundreds of inches before the head flies. In a fraction of this distance, the read/write heads of the present invention can be brought up to operating speed, access or store a file, and be stopped. Consequently, the present invention can be utilized in a contact recording environment without causing excessive head wear.

A memory storage module in accordance with the present invention can be used in transportation applications such as vehicle diagnostics (loop mode sensor recording), navigation data storage, and missile navigation. The present invention can also be used in aerospace applications, such as replacing the tape drives presently used in spacecraft. A memory storage module of the present invention can also be used within a computer as a main mass storage unit, a graphics memory or an I/O storage device. In addition, a memory storage module in accordance with the present invention can be used in industrial applications such as a serial multiple channel data recorder, a programmable memory for machine tools or an automated machine CPU servo buffer. Scientific applications of a memory storage module in accordance with the present invention include a remote site data recorder, a digital high speed camera, and a multiple channel data recorder. Consumer applications include an electronic pocket camera, a voice and data recorder, a palmtop digital assistant, an electronic pocket book (read only device) and a VCR-CATV program download.

This invention will be more fully understood in light of the following detailed description taken together with the drawings.

BRIEF DESCRIPTION OF THE DRAWINGS

FIGS. 6a and 6b are cross sectional views of an encapsulated Y-axis coil along section line 6b—6b of FIG. 5, FIG. 11a is a cross section of linear guide rollers and guide rods after assembly of the Y-axis motor/guide rod assembly and carriage assembly, FIG. 13b is a cross section of the Y-axis motor of FIG. 13a along section line 13b—13b of FIG. 13a.

FIG. 15b is a side view of the support bar, wire compliance spring, and monolithic head array of FIG. 15a.

FIG. 19 is an isometric view of a memory storage module showing the connection of a flexible printed circuit cable to a carriage and a printed circuit board, FIG. 26 is an exploded isometric view illustrating the assembly of one embodiment of the Y-axis motor/guide rod assembly, FIGS. 28b and 28c are schematic illustrations of the Y-axis track following information of a servo track.

DETAILED DESCRIPTION

Figure 1:
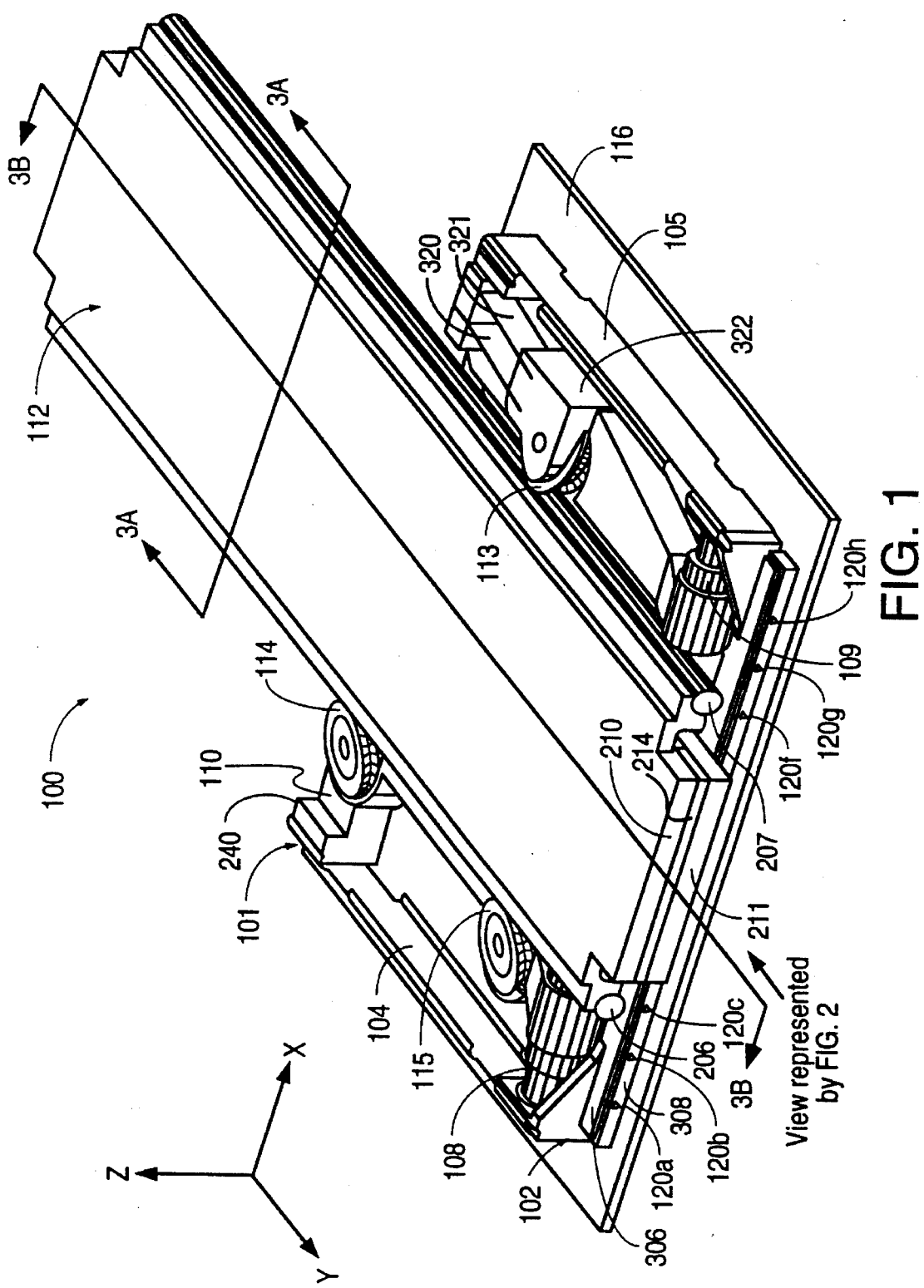
FIG. 1 is an isometric view of the carriage assembly, the Y-axis motor/guide rod assembly, and the fixed medium of one embodiment of a memory storage module.
Figure 2:
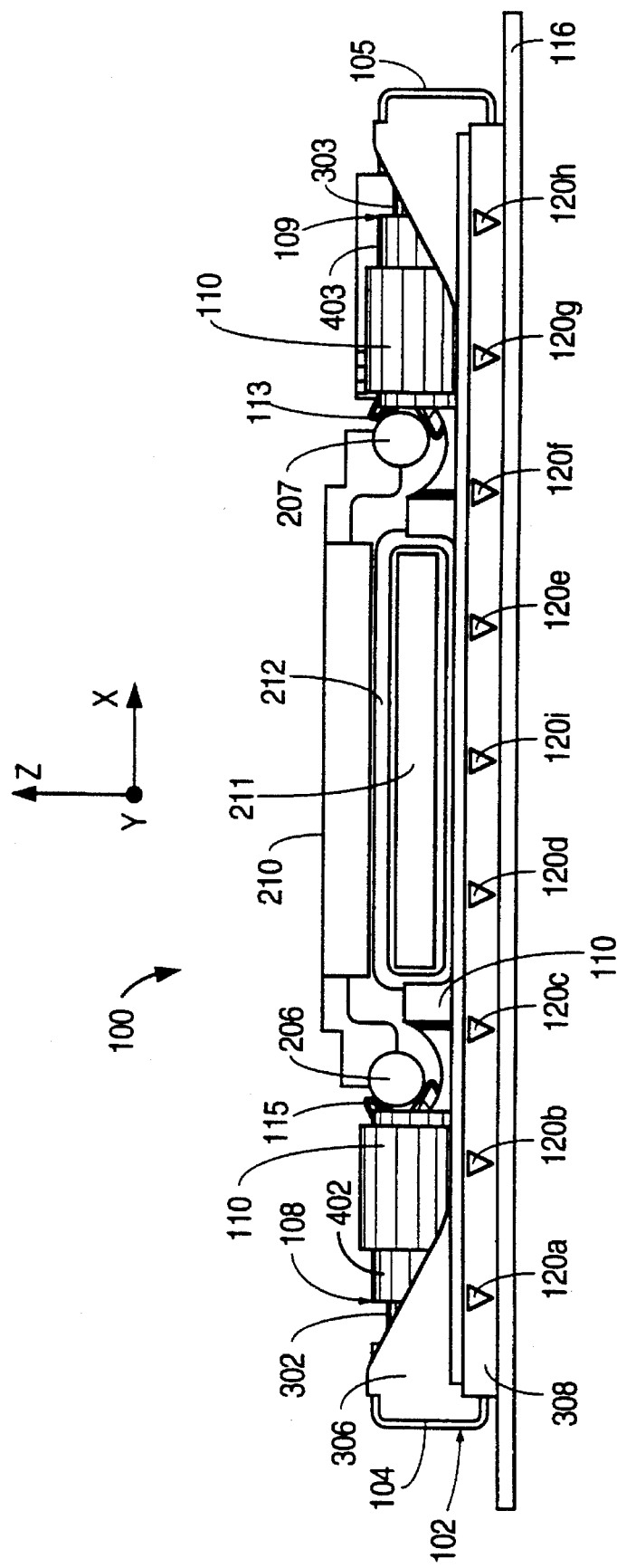
FIG. 2 is an end view of the memory storage module of FIG. 1 (with permanent magnet 214 removed for purposes of illustration)

FIG. 1 is an isometric view of carriage assembly 101, Y-axis motor/guide rod assembly 112, and fixed magnetic medium 116 of one embodiment of a memory storage module 100 in accordance with the present invention. FIG. 2 is an end view of memory storage module 100 of FIG. 1 (with permanent magnet 214 removed for purposes of illustration). In general, memory storage module 100 operates as follows. The X-axis motors 108 and 109 of the carriage assembly 101 cause the head array 308 to oscillate along the X-axis, thereby sweeping magnetic heads 120a–i across substantially linear data tracks on the medium 116. The Y-axis motor/guide rod assembly 112 moves the carriage assembly 101 along the Y-axis to position the oscillating heads 120a–i over tracks on the magnetic medium 116. A detailed description of the construction, operation and control of one embodiment of the memory storage module 100 is set forth below.

Y-Axis Motor/Guide Rod Assembly

Figure 3A:
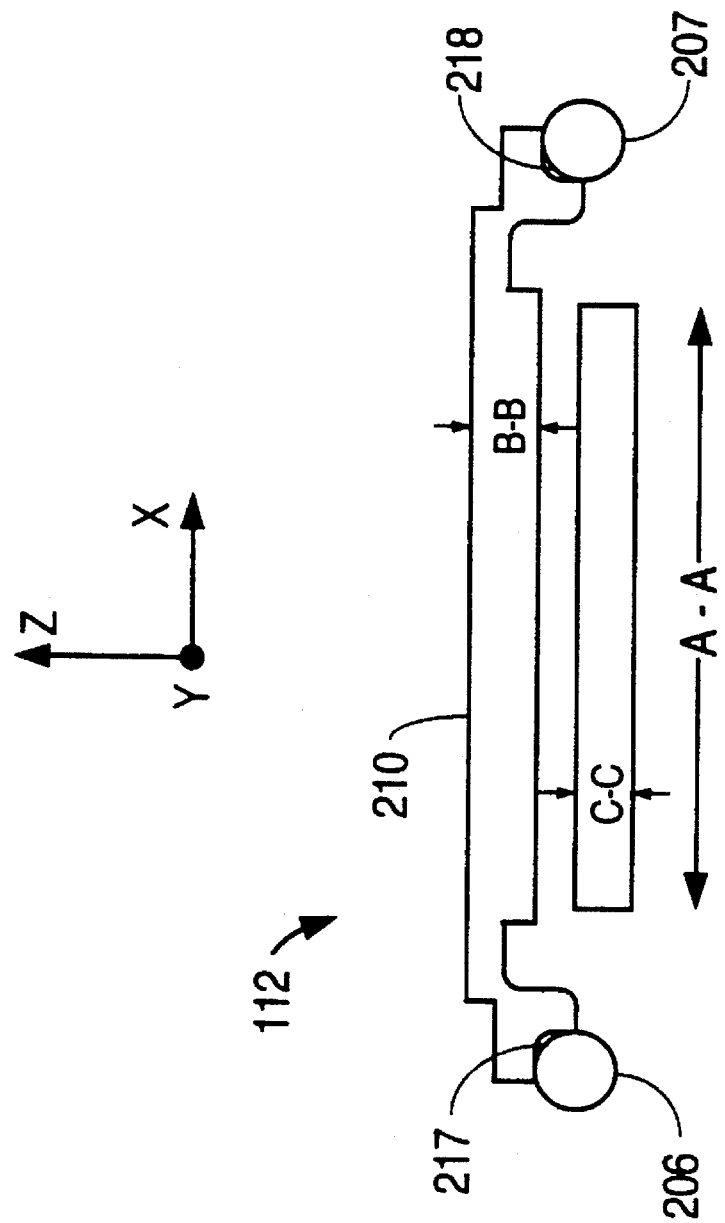
FIG. 3a is a cross sectional view of Y-axis motor/guide rod assembly along section line 3a—3a of FIG. 1.
Figure 3B:
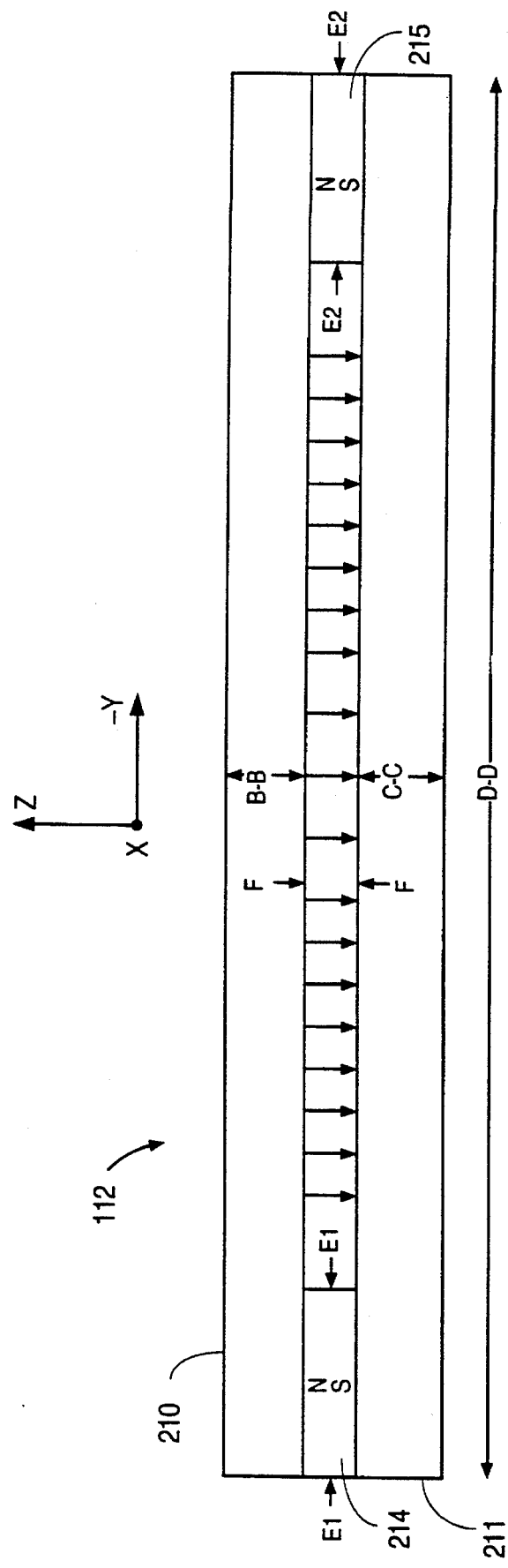
FIG. 3b is a cross sectional view of Y-axis motor/guide rod assembly along section line 3b—3b of FIG. 1.

FIG. 3a is a cross sectional view of Y-axis motor/guide rod assembly 112 along section line 3a—3a of FIG. 1. FIG. 3b is a cross sectional view of Y-axis motor/guide rod assembly 112 along section line 3b—3b of FIG. 1. For purposes of clarity, FIGS. 3a and 3b do not illustrate Y-axis coil 212 (FIG. 2). FIG. 3b is drawn out of proportion to more easily illustrate the various parts. Y-axis motor/guide rod assembly 112 (FIG. 1) includes back plate/upper pole 210, guide rods 206–207, center pole 211, permanent magnets 214 (FIGS. 1 and 3b) and 215 (FIG. 3b) and Y-axis coil 212 (FIG. 2).

The back plate/upper pole 210 and center pole 211 are made of a material having a relatively high magnetic permeability, such as Vanadium Permandur or 1010 steel. In one embodiment, these poles 210–211 have a width along section A—A (FIG. 3a) of 11.68 mm. Upper pole 210 has a height along section B—B of 1.183 mm and center pole 211 has a height along section C—C of 1.183 mm (FIGS. 3a–3b). Poles 210–211 have a length of approximately 65 mm along section D—D (FIG. 3b). Permanent magnets 214, 215 are positioned between upper pole 210 and center pole 211 (FIG. 3b). In one embodiment, permanent magnets 214–215 are made of 35MGO Neodymium. Permanent magnets 214–215 each have a width of 11.68 mm along section A—A (FIG. 3a), a length of 3 mm along sections E1—E1 and E2—E2 (FIG. 3b), and a height of 0.635 mm along section F—F (FIG. 3b). This results in a gap of 0.635 mm between upper pole 210 and center pole 211.

Permanent magnets 214–215 establish a magnetic field as indicated by the magnetic flux lines shown between upper pole 210 and center pole 211 in FIG. 3b. Like poles of permanent magnets 214–215 are positioned on the same pole piece. Thus, in FIG. 3b, the north pole of each permanent magnet 214–215 is positioned on upper pole 210. The magnetic flux density created in the gap between upper and center poles 210–211 is approximately 800–1200 gauss. Although this magnetic flux density is fairly uniform along the Y-axis, the flux density near permanent magnets 214–215 is slightly higher than the flux density near the center of the poles along the Y-axis. Magnetic saturation of poles 210–211 is avoided by careful selection of the dimensions and materials of poles 210–211 and permanent magnets 214–215.

In an alternate embodiment, permanent magnets 214–215 are replaced with pieces of Vanadium Permandur and a long, flat permanent magnet is mounted on the lower surface of upper pole 210 to establish a magnetic field between upper and center poles 210–211.

Guide rods 206–207 are connected in grooves 217–218 (FIG. 3a) of back plate/upper pole 210 with an adhesive, such as Loctite Speedbonder 324 or 326, or by brazing. Guide rods 206–207 are made of stainless steel or another non-magnetic material having a low magnetic permeability. Guide rods 206–207 have a diameter such that they receive carriage guide rollers 113–115 (FIGS. 1 and 2). In one embodiment, guide rods 206–207 have a diameter of 0.0625 inches.

Figure 4A:
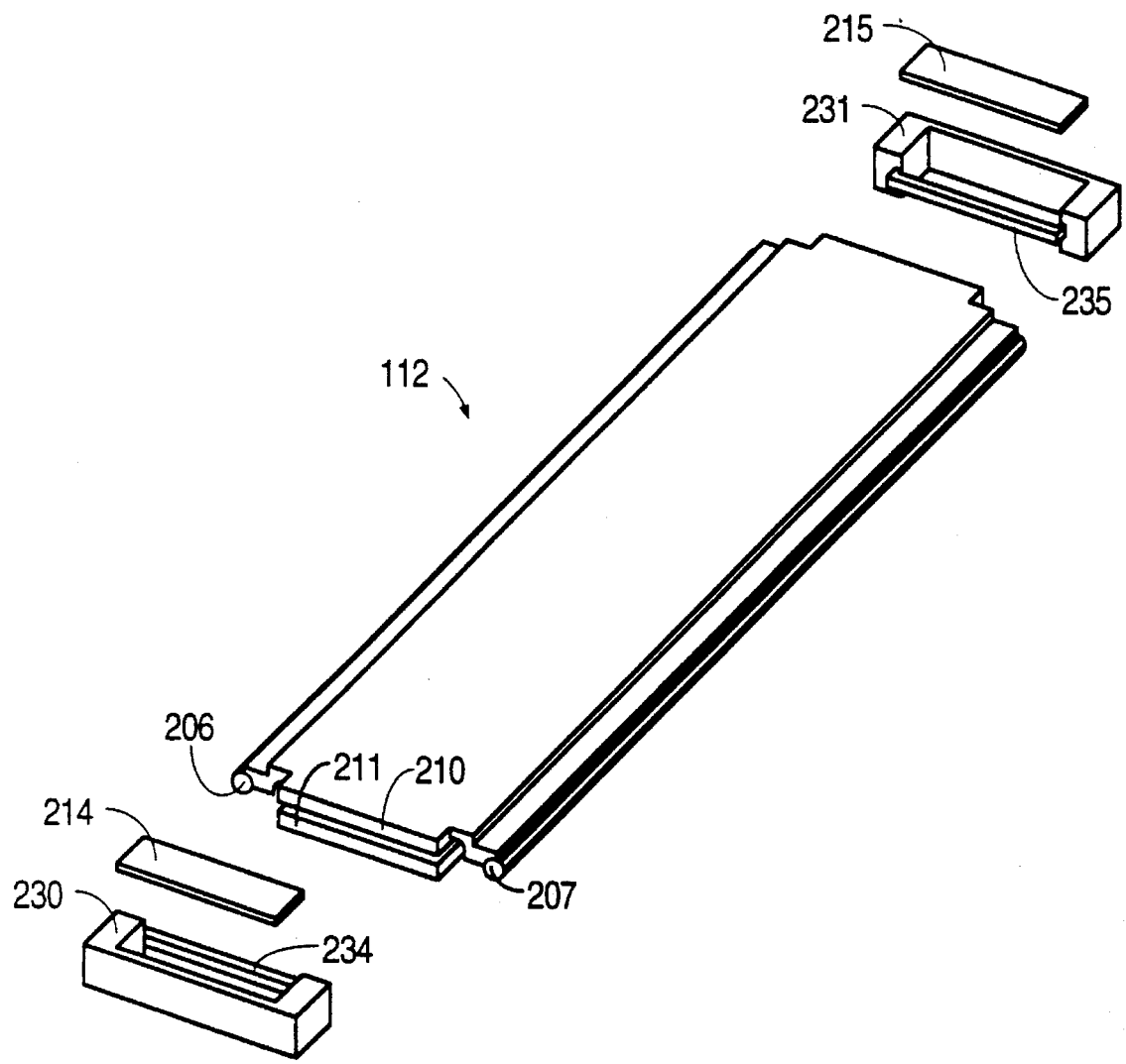
FIG. 4a is an isometric view of clips which couple the upper pole, the center pole and the permanent magnets of a Y-axis motor.

FIG. 4a is an isometric view of clips 230–231 which couple upper pole 210, center pole 211 and permanent magnets 214–215 of Y-axis motor 112. Clips 230–231 each include a positioning extension 234–235, respectively, which holds permanent magnets 214–215, respectively. In an alternate embodiment, permanent magnets 214–215 are insert molded within clips 230–231. As clips 230–231 are fitted over the ends of upper pole 210 and center pole 211, permanent magnets 214–215 are positioned between upper pole 210 and center pole 211. Clips 230–231 are made of a non-magnetic material having a low magnetic permeability such as glass filled polycarbonate or a plastic. Clips 230–231 assure that a low-reluctance closed magnetic path does not exist between the north and south poles of permanent magnets 214–215. The external surfaces of clips 230–231 which are not in contact with permanent magnets 214–215 can be covered with a material having a high magnetic permeability to shield the rest of memory storage module 100 from any stray magnetic fields existing at permanent magnets 214–215, upper pole 210 and/or center pole 211.

Connection of the Y-Axis Motor to the PCB

Figure 4B:
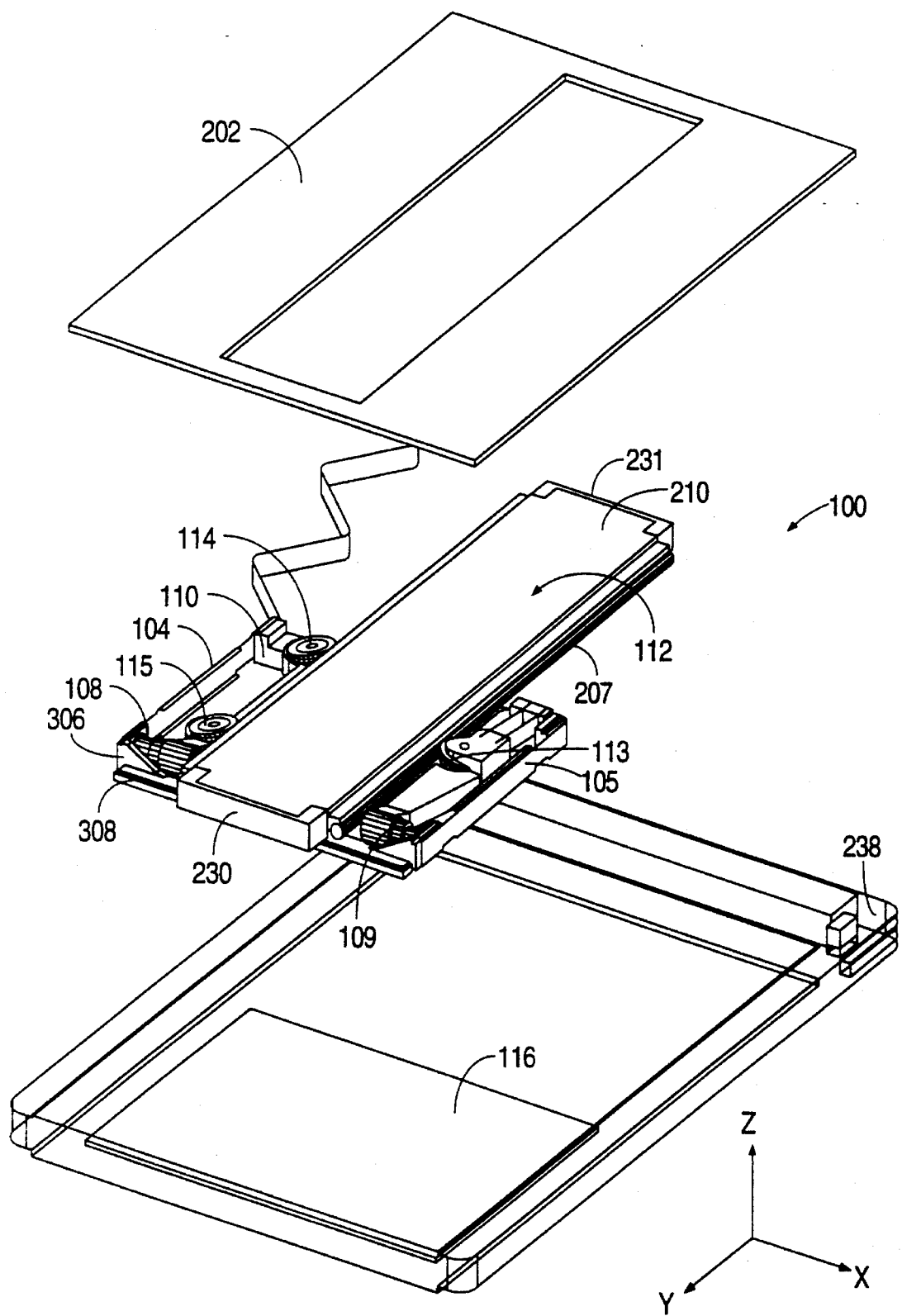
FIG. 4b is an exploded isometric view of one embodiment of a memory storage module, illustrating the interconnection of the Y-axis motor, the printed circuit board, the medium and the stationary housing.

FIG. 4b is an exploded isometric view of memory storage module 100, illustrating the interconnection of Y-axis motor 112, printed circuit board (PCB) 202, medium 116 and stationary housing 238.

As shown in FIG. 4b, the upper portion of back plate/upper pole 210 fits into an opening in printed circuit board (PCB) 202. This configuration reduces the profile of memory storage module 100 along the Z-axis by incorporating some of the height of upper pole 210 into PCB 202. A thicker upper pole 210 advantageously eliminates magnetic saturation which could occur in a thin upper pole. In one embodiment, the electronic circuitry necessary to operate memory storage module 100 is positioned within cavities in multi-layer PCB 202 such that this circuitry (i.e. integrated circuit chips) does not exceed the height of PCB 202. In one embodiment, the opening in PCB 202 is used to align the Y-axis motor/guide rod assembly 112 within memory storage module 100. In another embodiment, the alignment of Y-axis motor/guide rod assembly 112 is performed by affixing Y-axis motor/guide rod assembly 112 to stationary housing 238. The opening in PCB 202 is then fitted over the Y-axis motor/guide rod assembly 112.

The back plate/upper pole 210 is affixed to PCB 202 by applying an ultraviolet cured adhesive, such as Loctite UV 349 or 352, at the interfaces between PCB 202 and clips 230–231 and the interfaces between upper pole 210 and PCB 202.

PCB 202 is connected to stationary housing 238 of memory storage module 100 with screws or a suitable adhesive such as Loctite No. UV349 or 352 such that PCB 202 forms the upper surface of memory storage module 100. Y-axis motor/guide rod assembly 112 is thereby held stationary during operation of memory storage module 100. In one embodiment, the height of memory storage module 100 along the Z-axis is approximately 5 mm. This low profile along the Z-axis is facilitated by the unique configuration of the elements of memory storage module 100.

Because the final assembly of the memory storage module 100 is performed along a single axis, namely, the Z-axis, the manufacturing of memory storage module 100 can be automated because the device is self aligning by design (See, FIG. 4b).

Carriage Assembly

Figure 5:
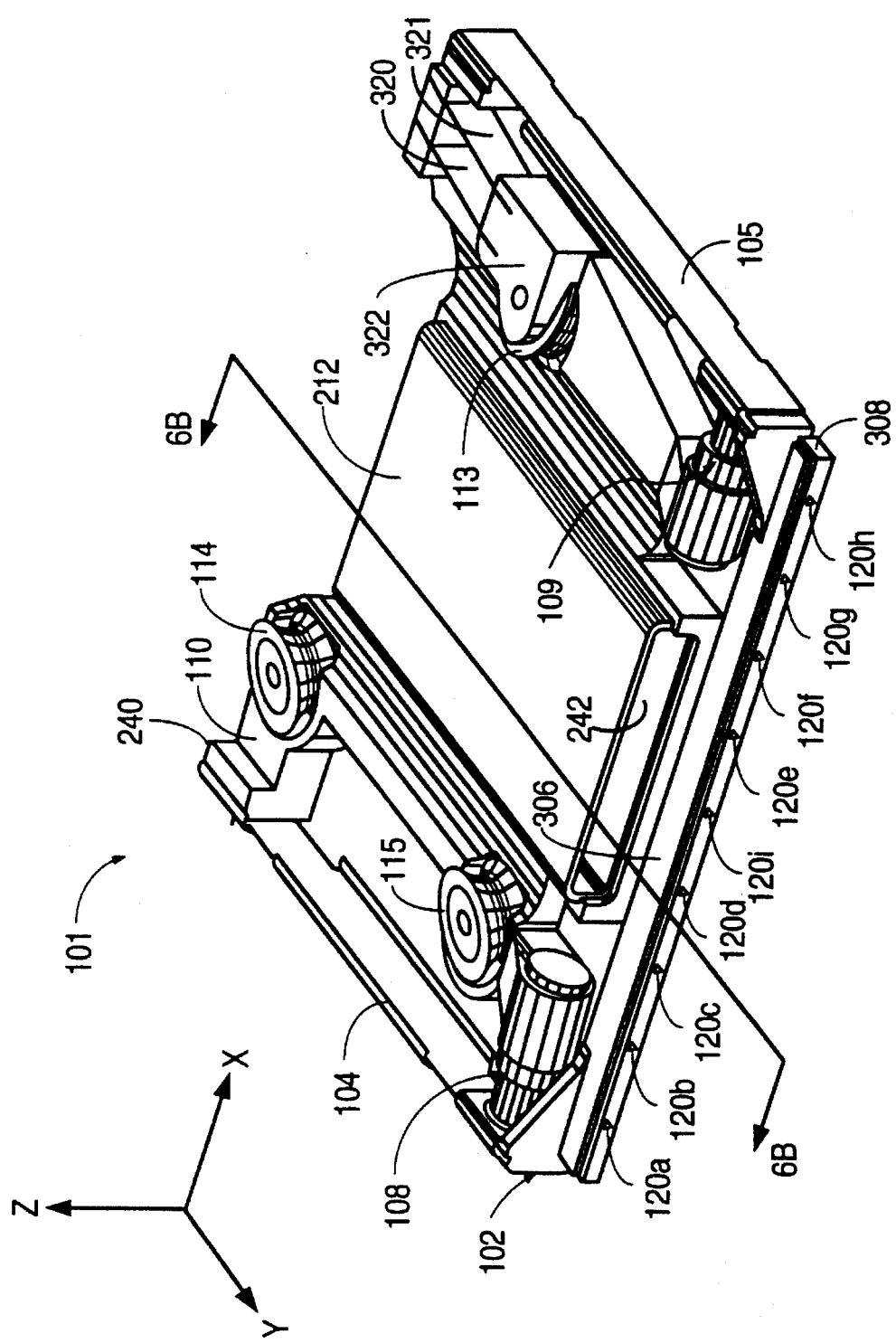
FIG. 5 is an isometric view of a carriage assembly.

FIG. 5 is an isometric view of carriage assembly 101. Carriage assembly 101 includes support bar 306, head array 308, roller housing 322, preload springs 320–321, heads 120a–i, flexures 104–105, X-axis motors 108–109, carriage 110, carriage guide rollers 113–115, Y-axis coil 212 and bonding pad 240. Carriage 110 is made of a rigid material such as a magnesium alloy or a composite injection molded plastic such as a glass and/or carbon filled polycarbonate. Magnesium AZ91D, an ASTM-approved high purity alloy, is used in one embodiment of the present invention. This alloy has the capacity to absorb energy anelastically, thereby damping noise and vibrations caused by X-axis motors 108–109. Magnesium is also one of the lightest known structural materials. Because carriage assembly 101 must be moved by Y-axis motor/guide rod assembly 112, a lighter carriage 110 results in a power savings within memory storage module 100.

Y-Axis Coil

Carriage 110 provides a sturdy frame upon which other elements of carriage assembly 101 are mounted. Y-axis coil 212 is mounted near the center of carriage 110. An opening 242 in the center of Y-axis coil 212 is dimensioned to closely receive center pole 211 of Y-axis motor/guide rod assembly 112.

FIGS. 6a and 6b are cross sectional views of the encapsulated Y-axis coil 212 along section line 6b—6b of FIG. 5. In one embodiment, Y-axis coil 212 is made using a 33 gauge copper conductor with a heavy gauge bondable insulation 243, such as RSTSL #1 bondable wire available from the Rea Magnet Wire Company, Inc., Fort Wayne, Ind. The conductor is wound around a mandrel which defines the inner dimensions of Y-axis coil 212 (i.e., the dimensions of opening 242). The insulation is then either chemically and/or heat cured, causing the insulation to fuse together into a single rigid mass. After curing, the encapsulated Y-axis coil 212 is removed from the mandrel. In one embodiment, Y-axis coil 212 has 200 turns, configured as an inner winding 244 having 100 turns and an outer winding 245 having 100 turns (FIGS. 6a–6b). By selecting an even number of winding layers (i.e., two), the two leads 248–249 of Y-axis coil 212 exit from the same end of Y-axis coil 212 (FIG. 6b). This configuration facilitates the connection of Y-axis coil 212 to bonding pad 240 at the rear of carriage assembly 101 (FIG. 5). Leads 248–249 exit Y-axis coil 212 at the rear of carriage 110 (i.e., the end of carriage 110 furthest from heads 120a–i), travel along the back of carriage 110 and terminate at bonding pad 240. In one embodiment, the length of Y-axis coil 212 along section G1—G1 is 22.86 mm (0.900 ") and the vertical spacing G2—G2 is 1.55 mm (FIG. 6b). This length is determined by the conductor size and the number of turns in Y-axis coil 212.

Figure 7:
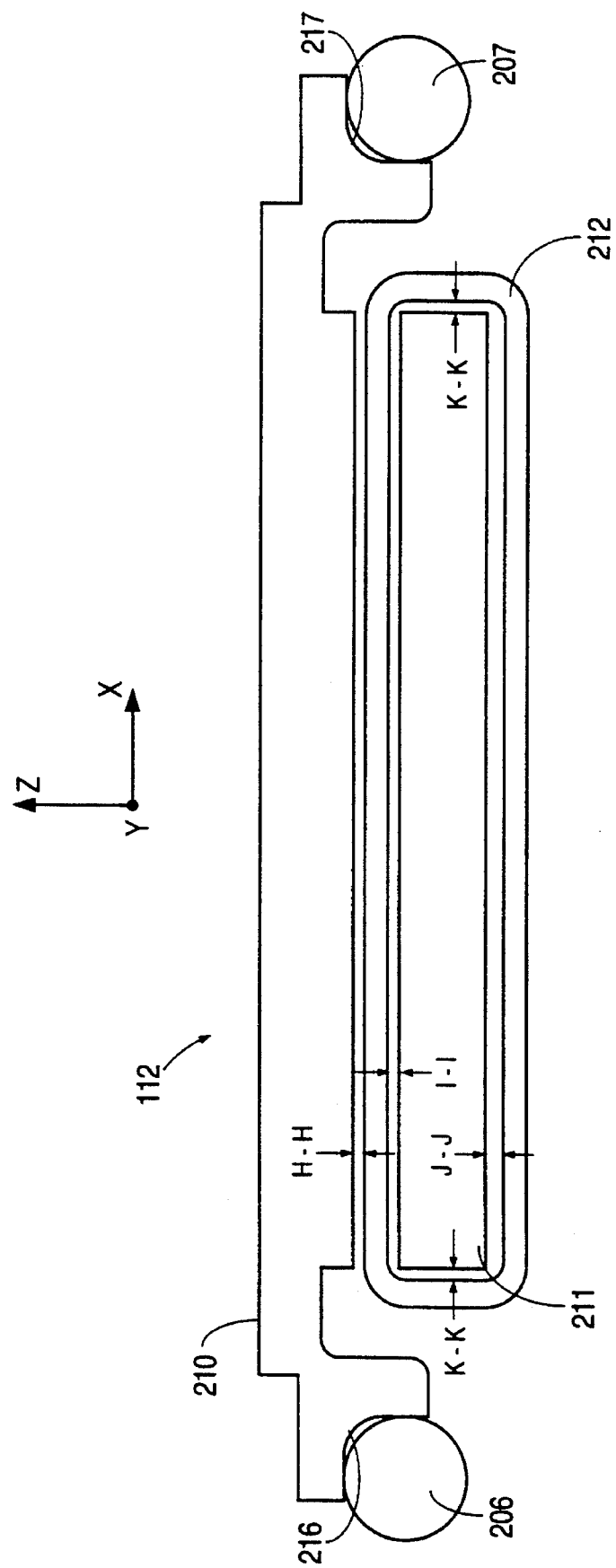
FIG. 7 is an end view of an assembled Y-axis coil, upper pole, center pole, and guide rods, with the clips and permanent magnets removed.

FIG. 7 is an end view of an assembled Y-axis coil 212, upper pole 210, center pole 211, and guide rods 206–207, with clips 230–231 and permanent magnets 214–215 removed. Y-axis coil 212 is closely received between upper pole 210 and center pole 211, without touching these poles. In one embodiment, the clearance H—H between upper pole 210 and Y-axis coil 212 is 0.127 mm. The clearance I—I between top of center pole 211 and Y-axis coil 212 is also 0.127 mm. The clearances K—K between the sides of center pole 211 and Y-axis coil and the clearance J—J between the bottom of center pole 211 and Y-axis coil 212 are each 0.254 mm. The top portion of Y-axis coil 212 is closely spaced between upper pole 210 and center pole 211 to increase the coupling of the magnetic field existing between upper pole 210 and center pole 211 with the current flowing in Y-axis coil 212.

Y-axis coil 212 is affixed to carriage 110 (FIG. 5) with an adhesive such as a chemically cured RTV (room temperature vulcanizing) adhesive, cyanoacrylate or an epoxy.

In an embodiment which utilizes a molded plastic carriage 110, Y-axis coil 212 can be affixed as previously discussed or insert molded as part of carriage 110.

Carriage Guide Rollers

Carriage guide rollers 113–115 (FIGS. 1, 2, 4b and 5), which rotate freely about a central axis, are also mounted on carriage 110. Guide rollers 113–115 each contain a substantially V-shaped groove which is dimensioned to receive guide rods 206–207 of Y-axis motor/guide rod assembly 112, such that each V-shaped groove tangentially contacts a guide rod at two points. After memory storage module 100 is assembled, guide rollers 113–115 suspend carriage assembly 101 from Y-axis motor/guide rod assembly 112. The straight sides of the grooves of guide rollers 113–115 contact guide rods 206–207 (FIGS. 2, 11). Guide rollers 113–115 rotate along guide rods 206–207, allowing carriage assembly 101 to move along the Y-axis.

Figure 8B:
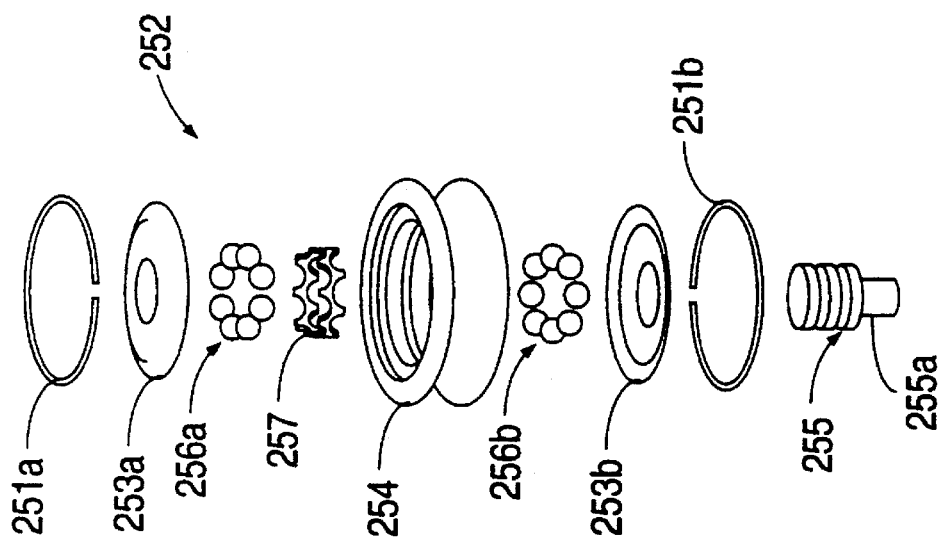
FIG. 8b is an exploded isometric view of the carriage guide roller of FIG. 8b.
Figure 8A:
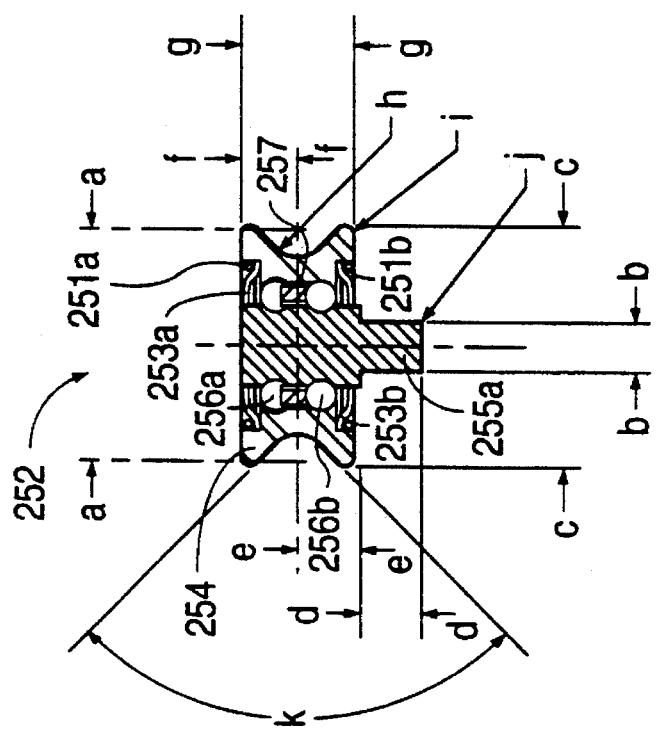
FIG. 8a is a cross section of one embodiment of a carriage guide roller.

FIG. 8a is a cross section of a guide roller 252 in accordance with one embodiment of the present invention. FIG. 8b is an exploded isometric view of guide roller 252. Outer race 254, inner race 255 and, ball groups 256a–b are all made of a fine grain material, such as stainless steel DD400 (available from NMB-Minebea), which is capable of achieving a smooth surface finish. The bearing clips 251a–b, bearing shields 253a–b and cage 257 are made of materials which are conventional for these types of parts. The rotation of outer race 254 around inner race 255 is facilitated by ball groups 256a–b. The use of two ball groups 256a–b provides a sturdy guide roller structure. The dimensions of guide roller 252 in accordance with one embodiment of the present invention are illustrated in FIG. 8a, where a—a is 4.51 mm; b—b is 1.00 mm; c—c is 4.72 mm; d—d is 1.45 mm; e—e is 1.05 mm; f—f is 1.0 mm; g—g is 2.00 mm; h (radius) is 0.51 mm; i (radius) is 0.13 mm; j (chamfer) is 0.05×0.10 mm; and k (angle) is 90 degrees. To mount guide roller 252 in carriage 110, axle 255a of inner race 255 is affixed in a pre-formed opening in carriage 110 using a suitable adhesive, such as Loctite No. 680 or 675. In the previously described embodiment, guide roller 252 has a minimum dynamic load rating of 26 kilograms (Kgs), a minimum static load rating of 10 Kgs and a maximum starting torque rating of 1000 mg/mm.

Figure 9C:
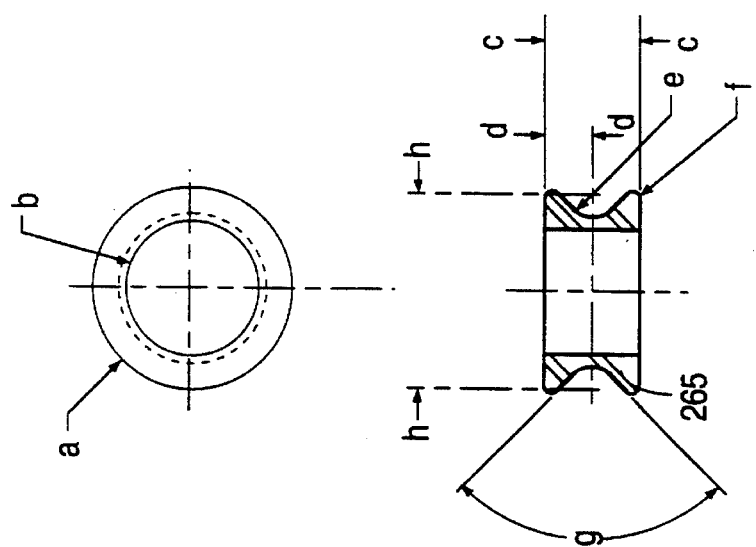
FIG. 9a is a cross section of an alternate carriage guide roller design.
FIG. 9b is an exploded view of the guide roller of FIG. 9a, FIG. 9c is a plan and cross sectional view of the outer race of the guide roller of FIG. 9a, FIG. 10 is an isometric view of a generic snap-in carriage guide roller.
Figure 9B:
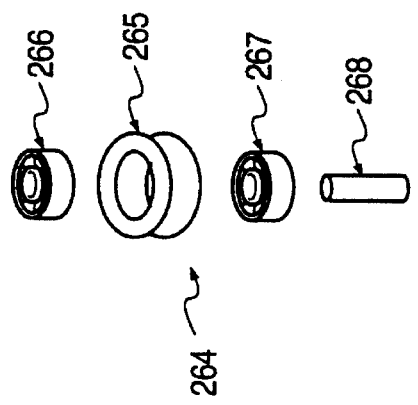
Figure 9A:
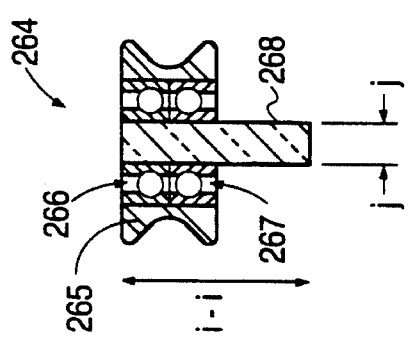

FIG. 9a is a cross section of an alternate guide roller 264. FIG. 9b is an exploded isometric view of guide roller 264. FIG. 9c is a plan and cross sectional view of outer race 265. Guide roller 264 consists of outer race 265, bearings 266–267 and axle 268. In one embodiment, outer race 265 is made of a fine grain material such as stainless steel DD400 and has an outer diameter, a, of 4.72 mm, an inner diameter, b, of 3 mm, and a height c—c of 2 mm. Section d—d measures 1.00 mm; radius e is 0.51 mm; radius f is 0.13 mm; angle g is 90 degrees; and section h—h measures 4.51 mm. Bearings 266–267 are available from NMB-Minebea Corporation as part number NMB DDL-310W51F. Prior to use the lubrication is thoroughly cleaned from bearings 266–267 and replaced with G. E. Krytox, 3% to 5% fill. Because bearings 266–267 are unshielded (i.e., open to the outside world), guide roller 264 does not represent a preferred embodiment. Axle 268 is made of a material such as stainless steel AISI 303. Axle 268 has a height i—i of 3.5 mm and a diameter j—j of 1 mm. A suitable grade of Loctite adhesive is used to connect guide roller 265, bearings 266–267 and axle 268. All cylindrical fits meet USA Standard LN-1 or the equivalent.

Figure 10:
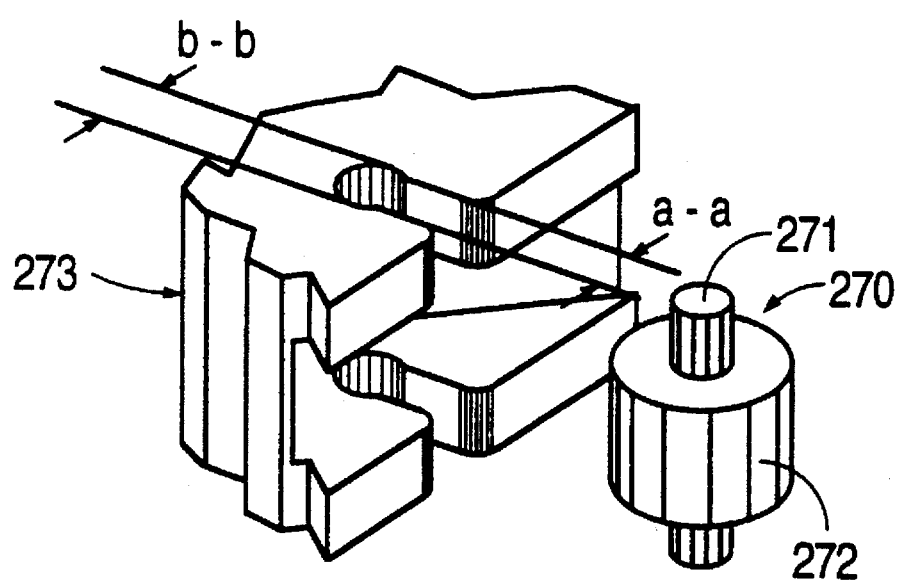

FIG. 10 is an isometric view of a generic snap-in guide roller 270. Outer race 272 of guide roller 270 rotates freely about axle 271. Section a—a of carriage 273 is slightly wider than section b—b of carriage 273 to allow axle 271 of guide roller 270 to snap tightly into carriage 273. This type of guide roller 270 may be used in conjunction with a carriage made of a molded plastic composite or another material which is sufficiently flexible to allow axle 271 of guide roller 270 to be snapped into place. The snap fit should be tight enough to hold axle 271 stationary.

FIG. 11a is an end view of guide rollers 113 and 115 and guide rods 206—207 after assembly of Y-axis motor/guide rod assembly 112 and carriage assembly 101 (FIGS. 1 and 2). Center pole 211, Y-axis coil 212 and carriage 110 are not shown in FIG. 11a for purposes of clarity. Guide rollers 113–115 are each positioned at the same angle, a, preferably in the range of 7.5 to 15 degrees, with respect to the X-Y plane. Angling guide rollers 113–115 provides an axial preload component on the bearings within guide rollers 113–115, thereby increasing the ability of guide rollers 113–115 to support carriage assembly 101. While the axial preload slightly reduces bearing life, the loss of bearing life is insignificant when considering the projected lifetime (at least five years) of memory storage module 100. In one embodiment, guide rollers 113–115 are positioned at a 15 degree angle with respect to the X-Y plane.

Figure 11B:
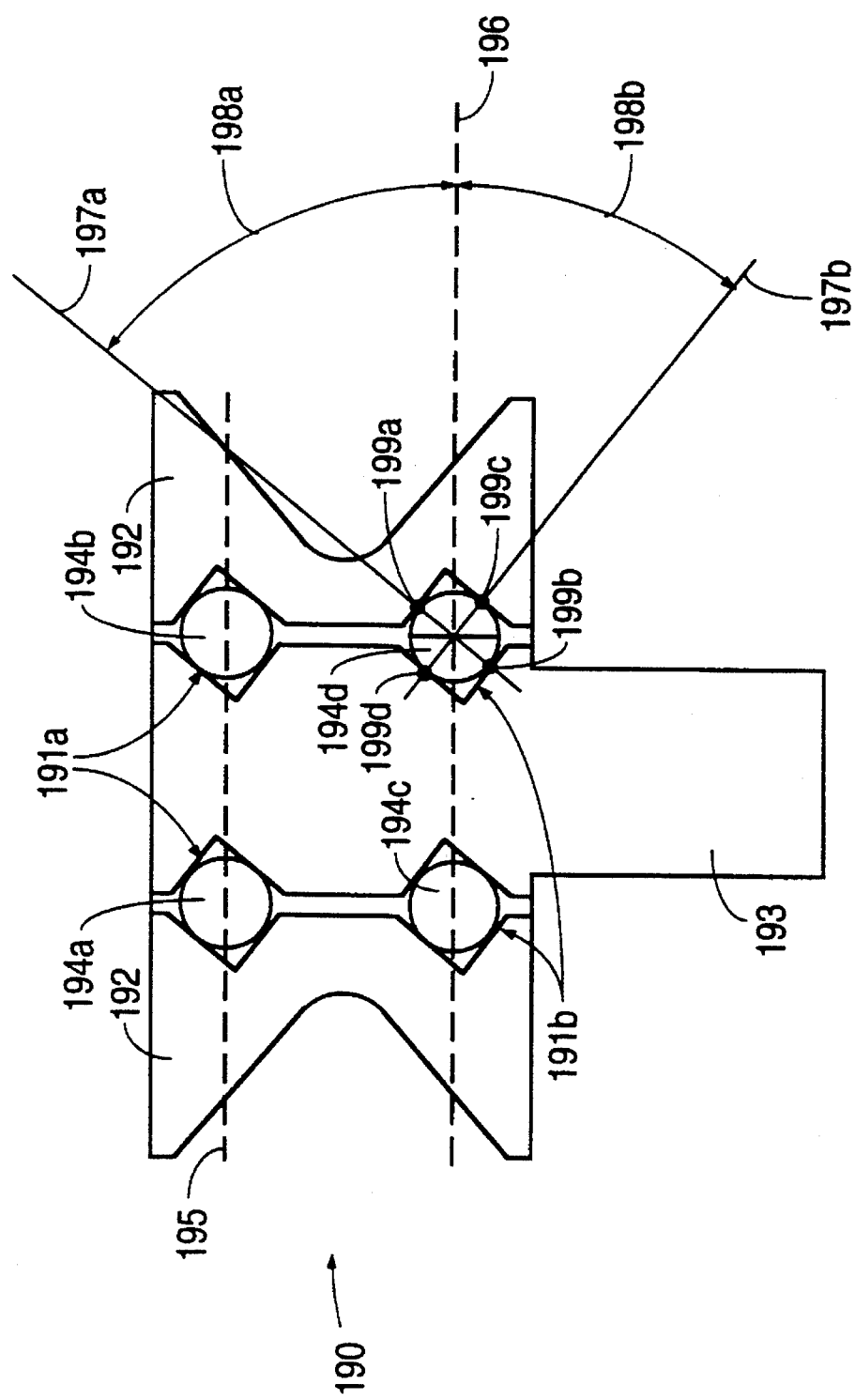
FIG. 11b is a cross section of a guide roller having a modified groove geometry.

FIG. 11b is a cross section of a guide roller 190 having a modified groove geometry. Guide roller 190 includes grooves 191a and 191b, outer race 192, inner race 193 and ball bearings 194a–194d. Although only ball bearings 194a–194d are illustrated in FIG. 11b, it is understood that guide roller 190 includes additional ball bearings which are not illustrated. Lines 195 and 196 pass through the centers of ball bearings 194a–194b and 194c–194d, respectively. Grooves 191a and 191b are shaped asymmetrically with respect to lines 195 and 196, respectively. For example, ball bearing 194d contacts groove 191b at contact points 199a, 199b, 199c and 199d. Line 197a extends through contact points 199a and 199b. Line 197a forms an angle 198a with respect to line 196. Line 197b extends through contact points 199c and 199d. Line 197b forms an angle 198b with respect to line 196. Because first angle 198a is greater than second angle 198b, the axial stiffness of guide roller 190 is improved in the embodiment illustrated in FIG. 11a.

Guide roller Preload

Figure 12A:
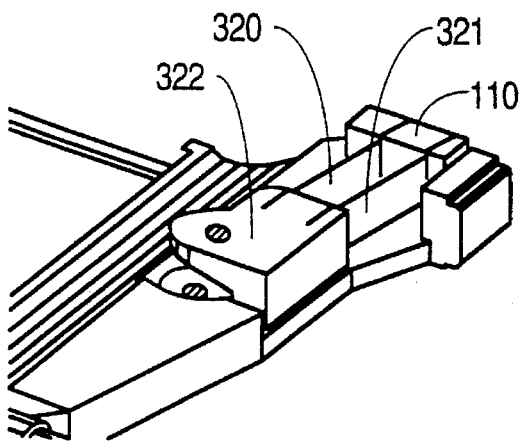
FIGS. 12a–12b are isometric views of a guide roller preload mechanism.
Figure 12B:
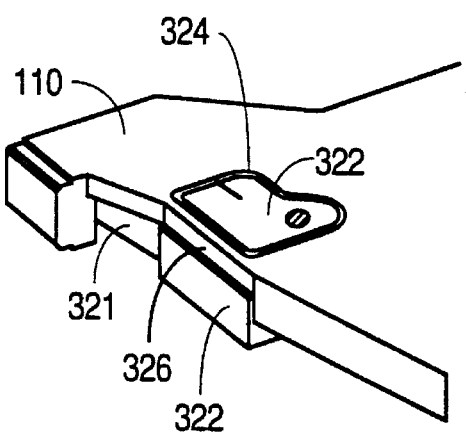

In one embodiment, guide roller 113 is positioned half way between guide rollers 114 and 115 along the Y-axis to evenly distribute the loading among the bearings in these three guide rollers 113–115 (FIGS. 1, 4b and 5). To further promote evenly distributed loading on the guide roller bearings, guide roller 113 is preloaded. Preloaded guide roller 113 insures even loading on the roller bearings even if guide rods 206–207 are not perfectly parallel or otherwise irregularly configured or positioned. FIGS. 12a–12b are isometric views of the preload structure for guide roller 113, including roller housing 322 and preload springs 320–321. Leaf-type preload springs 320–321 are mounted to carriage 110 at one end and to roller housing 322 at the other end. In one embodiment, roller housing 322 is made of the same material as carriage 110. Roller housing 322 is not directly connected to carriage 110. As shown in FIG. 12b, a gap 324 separates roller housing 322 from carriage 110. A small web portion 326 of carriage 110 limits the movement of roller housing 322 away from carriage 110. Web portion 326 protects preload springs 320–321 from excessive bending and prevents guide roller 113 from becoming dislocated from guide rail 207 when memory storage module 100 is subjected to shock or vibration. Preload springs 320–321 and roller housing 322 are located such that when guide roller 113 is affixed in roller housing 322 and engaged with guide rod 207, the force exerted by preload springs 320–321 is directed along the center of contact between guide roller 113 and guide rod 207. This force is also directed and along the median line of preload springs 320–321 to prevent twisting of these springs. This results in a balanced and sturdy guide roller configuration.

Figure 12C:
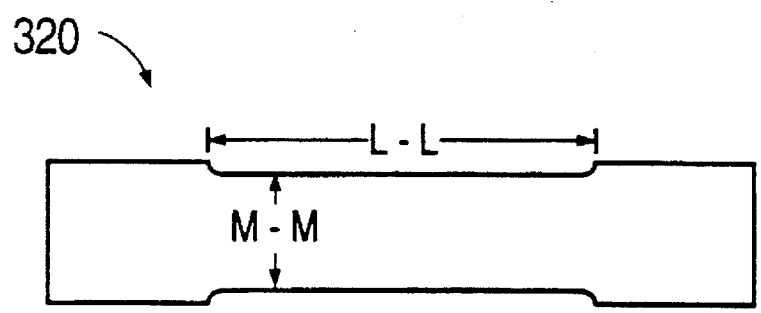
FIG. 12c is a side view of a preload spring.

FIG. 12c is a side view of preload spring 320. In one embodiment, each preload spring 320–321 is made of 0.127 mm thick stainless steel and has the dimensions illustrated in FIG. 12c. Active length L—L measures 5.08 mm and active height M—M measures 1.905 mm.

In an embodiment which utilizes a molded plastic carriage 110, preload springs 320–321 can be formed as previously discussed or molded as part of carriage 110.

The structure of memory storage module 100 is mechanically "stiffer" than prior art disk drives, thereby enabling memory storage module 100 it to withstand higher external forces during non-operating conditions than prior art disk drives. The stiffer mechanical structure of memory storage module 100 exists partly because medium 116 is fixed to stationary housing 238. The carriage structure also contributes to the stiffness of memory storage module 100 because the guide rollers 113–115 support carriage assembly 101 on guide rods 206–207 such that the center of mass of carriage assembly 101 is located within the triangular perimeter formed by guide rollers 113–115.

Alternate Y-axis Motor

Figure 13A:
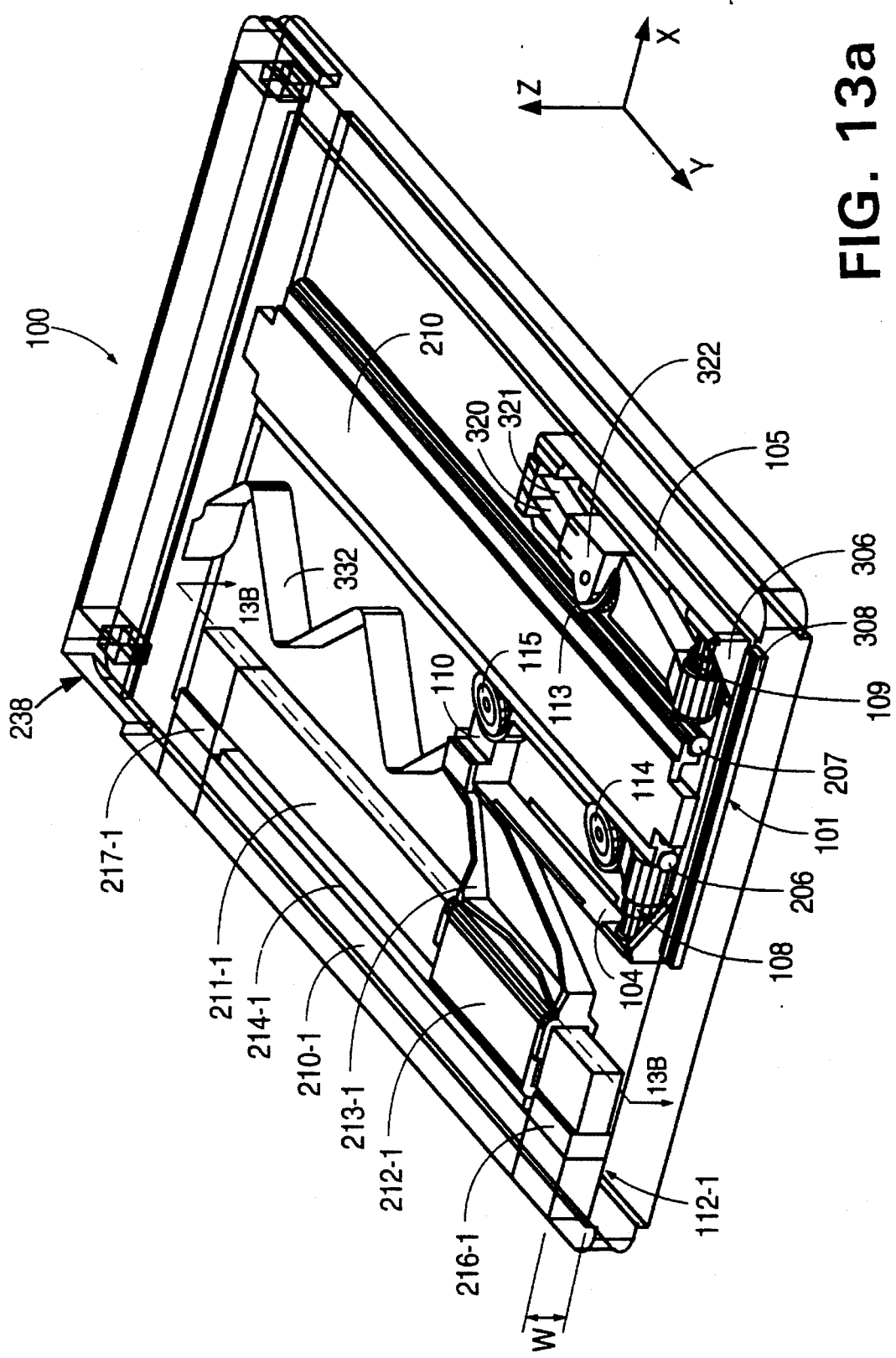
FIG. 13a is an isometric view of an alternate Y-axis motor which can be used to move a carriage assembly along the Y-axis.

FIG. 13a is an isometric view of an alternate Y-axis motor 112-1 which can be used to move carriage assembly 101 along the Y-axis. The embodiment illustrated in FIG. 13a utilizes guide rollers 113–115 to support carriage assembly 101 on guide rods 206–207. However, Y-axis coil 212, center pole 211 and permanent magnets 214–215 are not present in this embodiment. Instead, Y-axis motor 112-1 uses outer pole 210-1, center pole 211-1, permanent magnet 214-1, end plates 216-1 and 217-1, Y-axis coil 212-1 and coupling clip 213-1. Outer pole 210-1 is coupled to stationary housing 238. End plates 216-1 and 217-1 connect outer pole 210-1 to center pole 211-1. Outer pole 210-1, center pole 211-1 and end plates 216-1 and 217-1 are made of a high permeability material such as Vanadium Permandur or 1010 steel. In one embodiment, permanent magnet 214-1 is coupled to outer pole 210-1 such that the south pole of permanent magnet 214-1 is coupled to outer pole 210-1 and the north pole of permanent magnet 214-1 faces center pole 211-1. This establishes a magnetic field in the gap between permanent magnet 214-1 and center pole 211-1. Y-axis coil 212-1 surrounds center pole 211-1. Y-axis coil 212-1 is supported by one end of coupling clip 213-1 such that Y-axis coil 212-1 does not contact center pole 211-1 or permanent magnet 214-1. The other end of coupling clip 213-1 is supported by carriage assembly 101. When a current is applied to Y-axis coil 212-1, a force is generated which moves Y-axis coil 212-1 (and thereby carriage assembly 101) along the Y-axis.

Figure 13B:
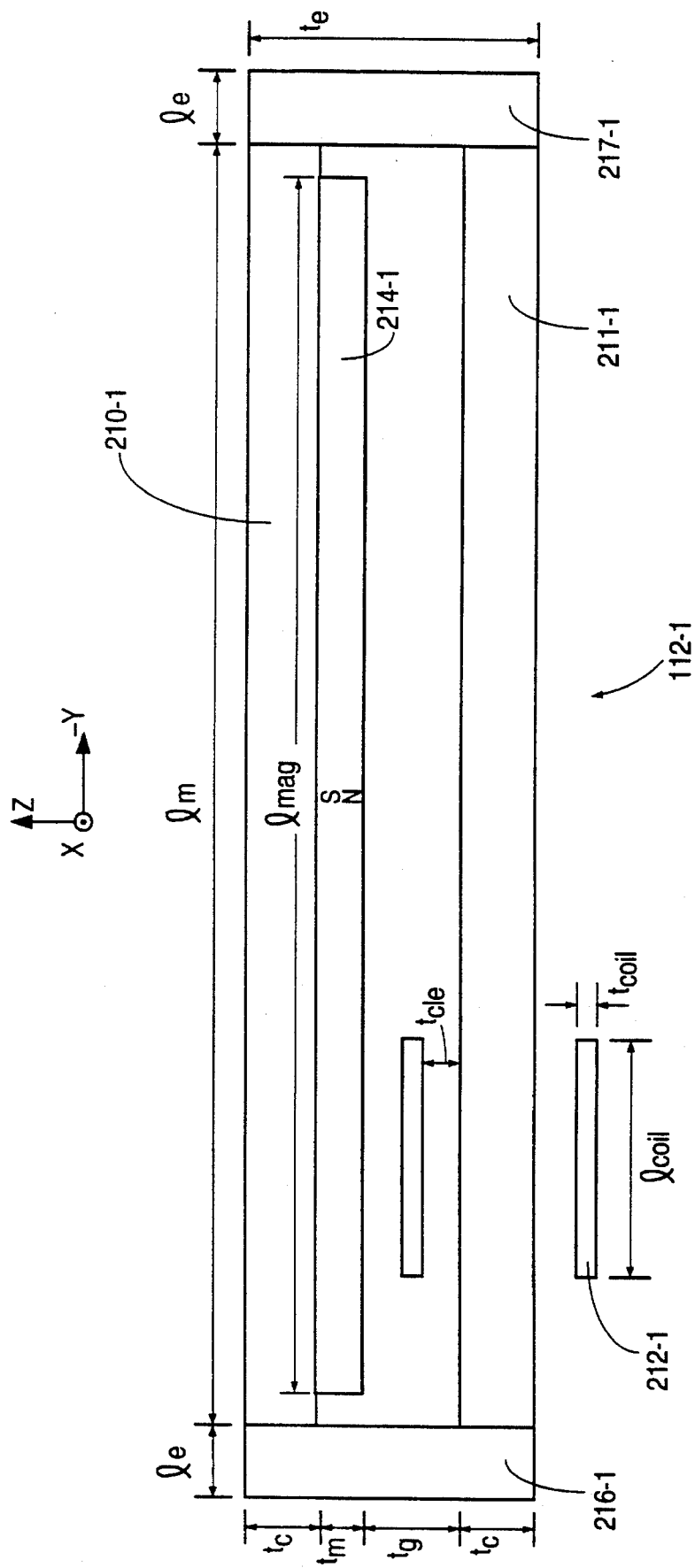

FIG. 13b is a cross section of Y-axis motor 112-1 along section line 13b—13b of FIG. 13a, illustrating approximate dimensions of one embodiment of Y-axis motor 112-1. Y-axis coil 212-1 has a length, $l_{coil}$, of 15 mm, and a thickness, $t_{coil}$, of 0.0762 mm. Outer pole 210-1 and center pole 211-1 have a length, $l_m$, of 55 mm, a thickness, $t_c$, of 5.042 mm and a width, w, of 4 mm (FIG. 13a). End plates 216-1 and 217-1 have a length, $l_e$, of 6 mm, a thickness, $t_c$, of 12 mm, and a width, w, of 4 mm. Permanent magnet 214-1 has a length, $l_{mag}$, of 53 mm, a thickness, $t_m$ of 0.9 mm and a width, w, of 4 mm. The gap between permanent magnet 214-1 and center pole 211-1 has a thickness, $t_g$, of 1.016 mm. The gap between Y-axis coil 212-1 and center pole 211-1 has a thickness, $t_{cle}$, of 0.127 mm. In one embodiment, a current of 0.5 amps applied to Y-axis coil 212-1 generates a force of approximately 0.195 newtons. In an alternate embodiment, permanent magnet 214-1 is mounted on center pole 211-1, rather than outer pole 210-1.

The configuration of Y-axis motor 112-1 allows outer pole 210-1, center pole 211-1 and permanent magnet 214-1 to have increased thicknesses along the X-axis, without increasing the height of memory storage module 100. This additional thickness allows the use of long permanent magnet 214-1. Permanent magnet 214-1 is stronger than permanent magnets 214 and 214 utilized in Y-axis motor 112. The additional thickness of outer pole 210-1 and center pole 211-1 assures that these poles are not saturated by the stronger permanent magnet 214-1. Although Y-axis motor 112-1 has a higher magnetic field than Y-axis motor 112, Y-axis coil 212-1 has less coil utilization than Y-axis coil 212 (i.e., less of the coil is positioned in the gap between the poles). Consequently, Y-axis motor 112 and Y-axis motor 112-1 generate approximately the same force.

Head Array Assembly

Figure 14A:
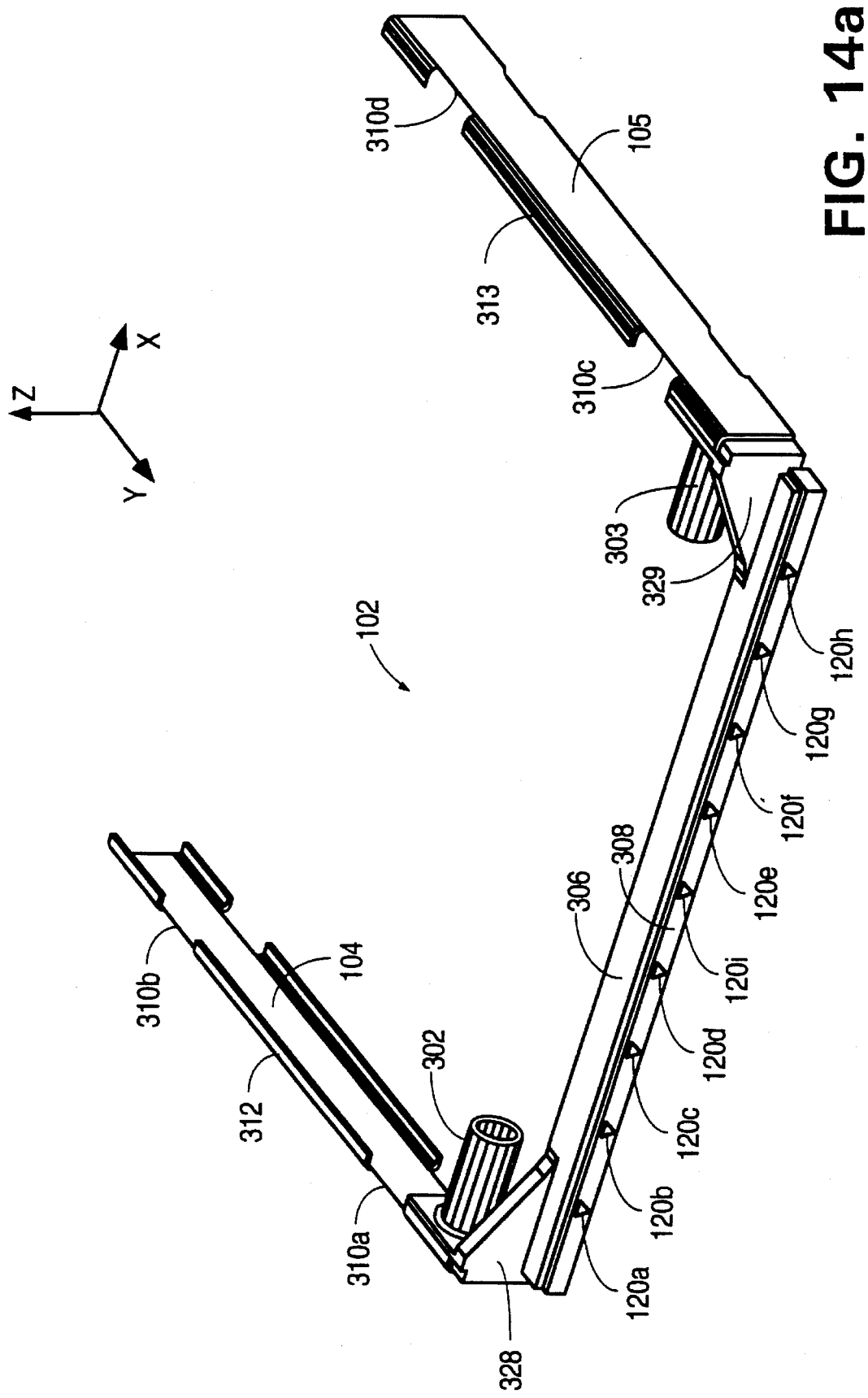
FIG. 14a is an isometric view of a head array assembly, including flexures, X-axis motor coils, support bar, head array, and heads.

FIG. 14a is an isometric view of head array assembly 102, including flexures 104–105, X-axis motor coils 302–303, support bar 306, head array 308, and heads 120a–i. Flexures 104–105 of head array assembly 102 are connected to the rear of carriage 110 (FIGS. 1, 4b and 5).

Flexures

Flexures 104–105 are each connected to carriage 110 at one end and to support bar 306 at the other end (FIGS. 1, 4b and 5). In one embodiment, thin elastomeric sheets are positioned between flexures 104–105 and carriage 110 such that flexures 104–104 make less acoustic noise and transmit less mechanical vibration to carriage 110. Flexures 104–105 are made of a fatigue resistant material which is configured to be flexible in the X-Y plane. The material used for flexures 104–105 should have a modulus of elasticity to density ratio (i.e., specific stiffness), such that flexures 104–105 exhibit desirable natural frequencies along the X, Y and Z axes. Materials having an adequate specific stiffness include titanium, carbon fiber epoxy matrix, aluminum, magnesium, stainless steel, beryllium, and metal matrixes such as aluminum-beryllium combinations. Other materials having proper fatigue and flexure properties can also be used. In an embodiment which utilizes a molded plastic composite as the carriage material, flexures 104–105 may be molded as part of carriage 110. Flexures 104–105 can also be molded together with support bar 306.

In one embodiment, flexures 104–105 are made using a "four-bar" type of construction. This "four-bar" construction utilizes two flexible "bars" i.e., flexures 104 and 105, and two rigid "bars", i.e., support bar 306 and carriage 110. Flexures 104 and 105 include four identical flexible portions 310a–d and two rigid portions 312–313. In one embodiment, rigid portions 312–313 are formed by bending the upper and lower edges of flexures 104–105 to create a "C" shaped structure. In other embodiments, rigid portions 312–313 are created by deforming a portion of flexures 104–105 out of the Y-Z plane or by bonding or welding an element to the center of flexures 104–105. In one embodiment, each flexible portion 310a–d has a length along the Y-axis of 3.175 mm. Each rigid portion has a length along the Y-axis of approximately 22.225 mm. Flexures 104–105 each have a height along the Z-axis of approximately 2.413 mm and a thickness of approximately 0.1524 mm. This construction allows each flexure 104–105 to deflect 0.112 inches in either direction along the X-axis. Consequently, the support bar 306, head array 308 and heads 120a–i have a range of motion of 0.224 inches along the X-axis.

Figure 14B:
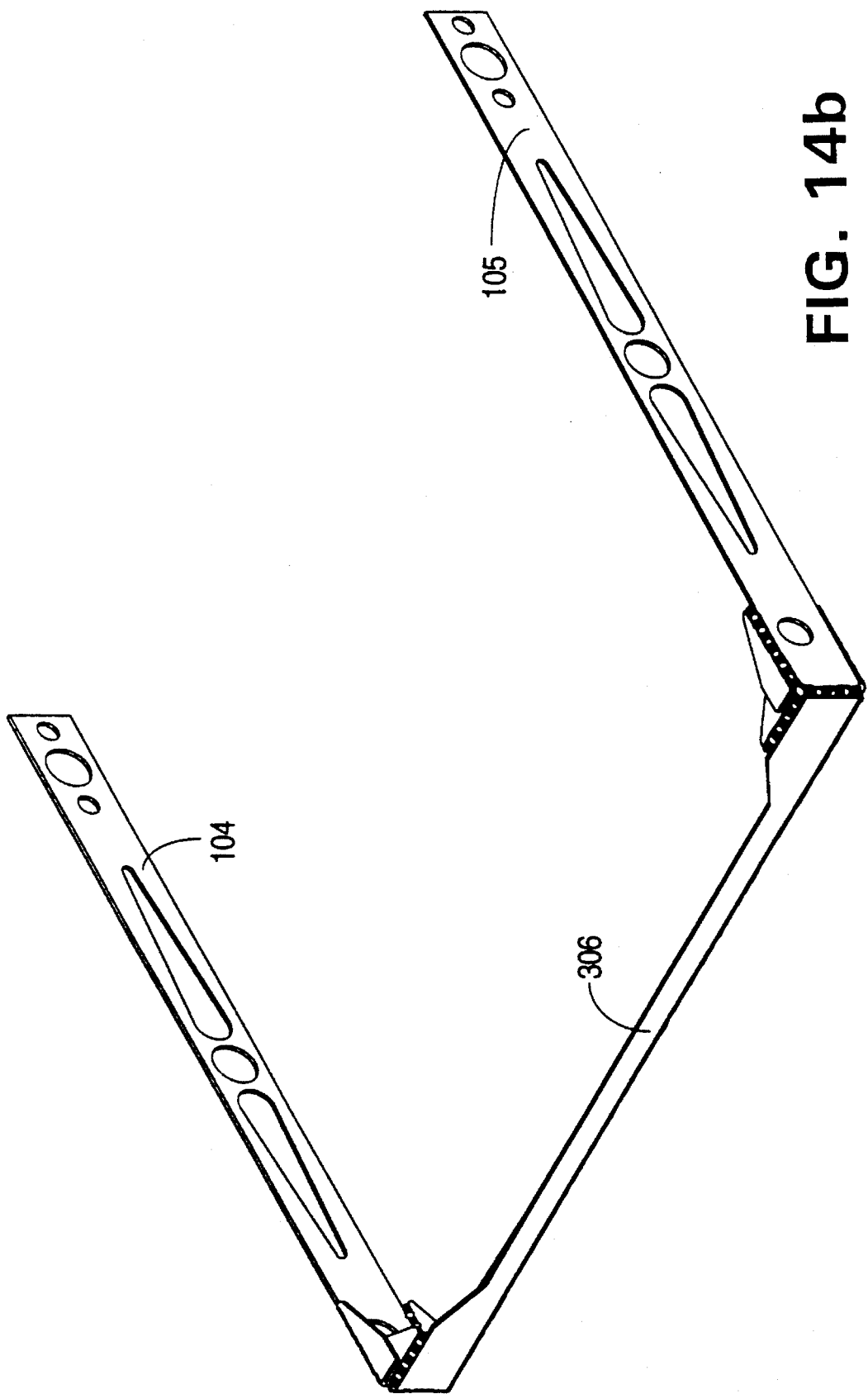
FIG. 14b is an isometric view of flexures and a support bar formed by folding a single sheet of material.
Figure 14C:
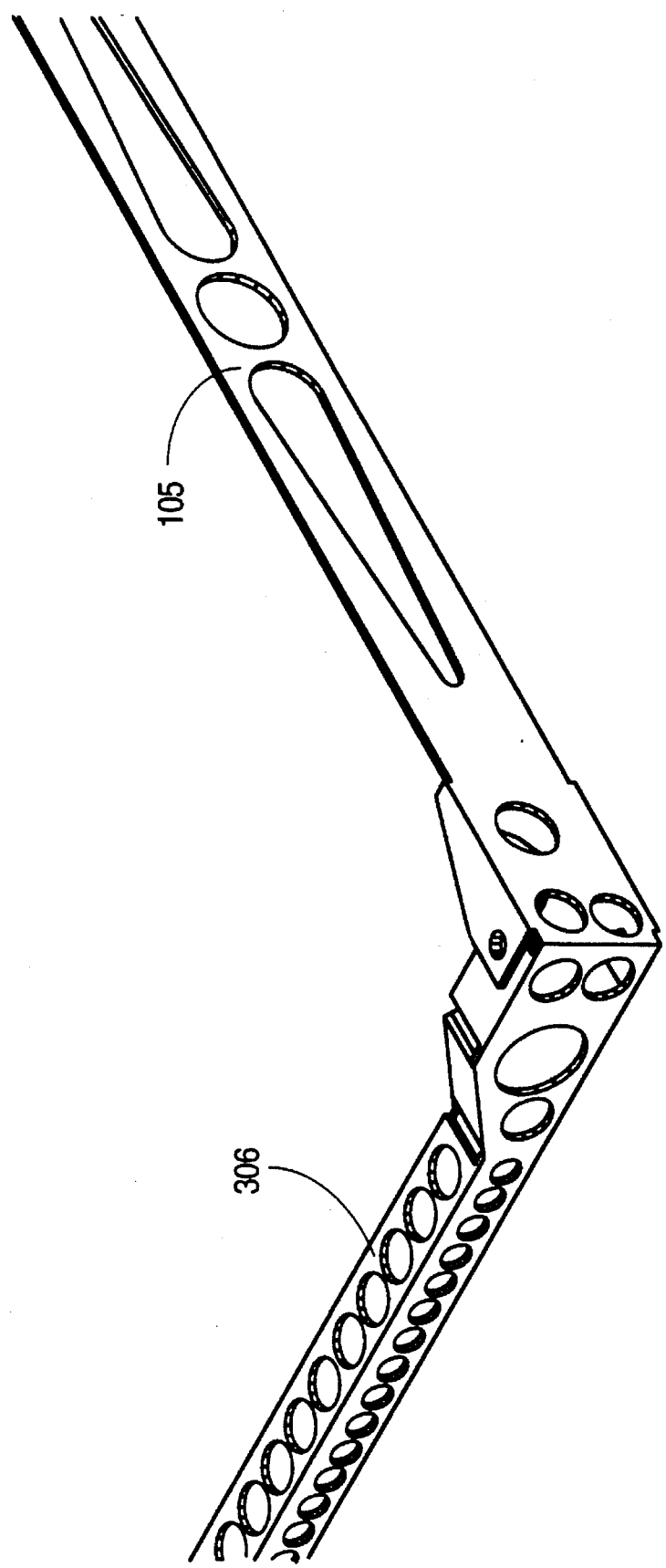
FIG. 14c is an isometric view of a light-weight flexure and a support bar.

In an alternate embodiment, flexures 104–105 are flexible along their entire length to reduce stress concentration along the flexures and thereby increase the life of the flexures (see, e.g. FIGS. 14b–14c). The flexure construction can vary based on the desired velocity profile of heads 120a–i. For example, more than two flexures can be used, with each flexure having one end coupled to carriage 110 and another end coupled to support bar 306.

Support Bar

In one embodiment, support bar 306 is connected to flexures 104–105 by inserting the ends of support bar 306 into the "C" shaped ends of these flexures (FIG. 14a). Support bar 306 is held on the flexures 104–105 with a high strength adhesive or by welding or brazing. In one embodiment, support bar 306 consists of a rigid material such as magnesium, aluminum or a graphite composite thermoplastic, to keep the support bar 306 as light as possible consistent with its required strength. Support bar 306 can also be made of a tubular material. The previously described support bars provide flexibility in optimizing the material and material related design decisions involving support bar 306 and flexures 104–105. In one embodiment, the center of mass of the head array assembly 102 lies directly between the centers of flexures 104–105 to avoid twisting and resultant deflections. Triangular portions 328–329 of support bar 306 create a sturdy support bar structure and also provide clearance for guide rods 206–207 (See FIG. 2) when support bar 306 is oscillating along the X-axis.

In an alternate embodiment, flexures 104–105 and support bar 306 are created by folding a preformed sheet (or sheets) of material. FIG. 14b is an isometric view of flexures 104–105 and support bar 306 formed by folding a single sheet of material, such as stainless steel. The appropriate patterns are formed using conventional fine blanking or chemical milling methods. In other embodiments, flexures 104–105 and support bar 306 are made from more than one piece of material, with the pieces connected by spot, laser or E-beam welding, brazing, soldering or adhesives.

It is desirable to minimize the weight of support bar 306 and thereby maximize the natural frequency of head array assembly 102. FIG. 14c is an isometric view of flexure 105 and support bar 306 which contain holes which reduce the mass of the folded structure while retaining the stiffness of the structure. The mass and the spring rate of the head array assembly 102 are selected to achieve the desired resonant frequency along the X-axis. The mass and spring rate of head assembly 102 are also selected to control other resonant frequencies along the X, Y and Z axes such that these additional resonant frequencies do not interfere with the operation of memory storage module 100.

Compliance Spring

Figure 15A:
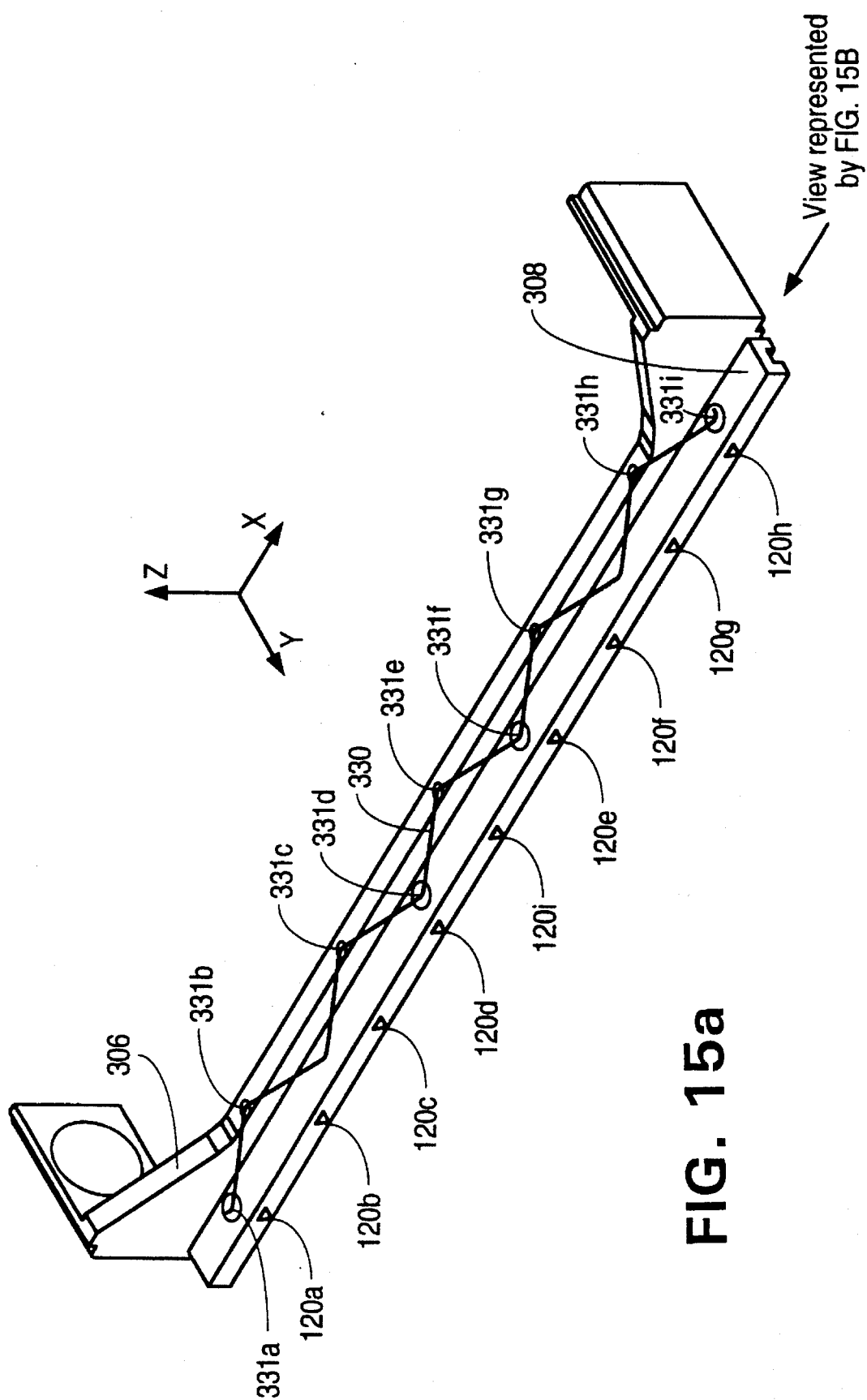
FIG. 15a is an isometric view of a support bar, a wire compliance spring and a monolithic head array.
Figure 15B:
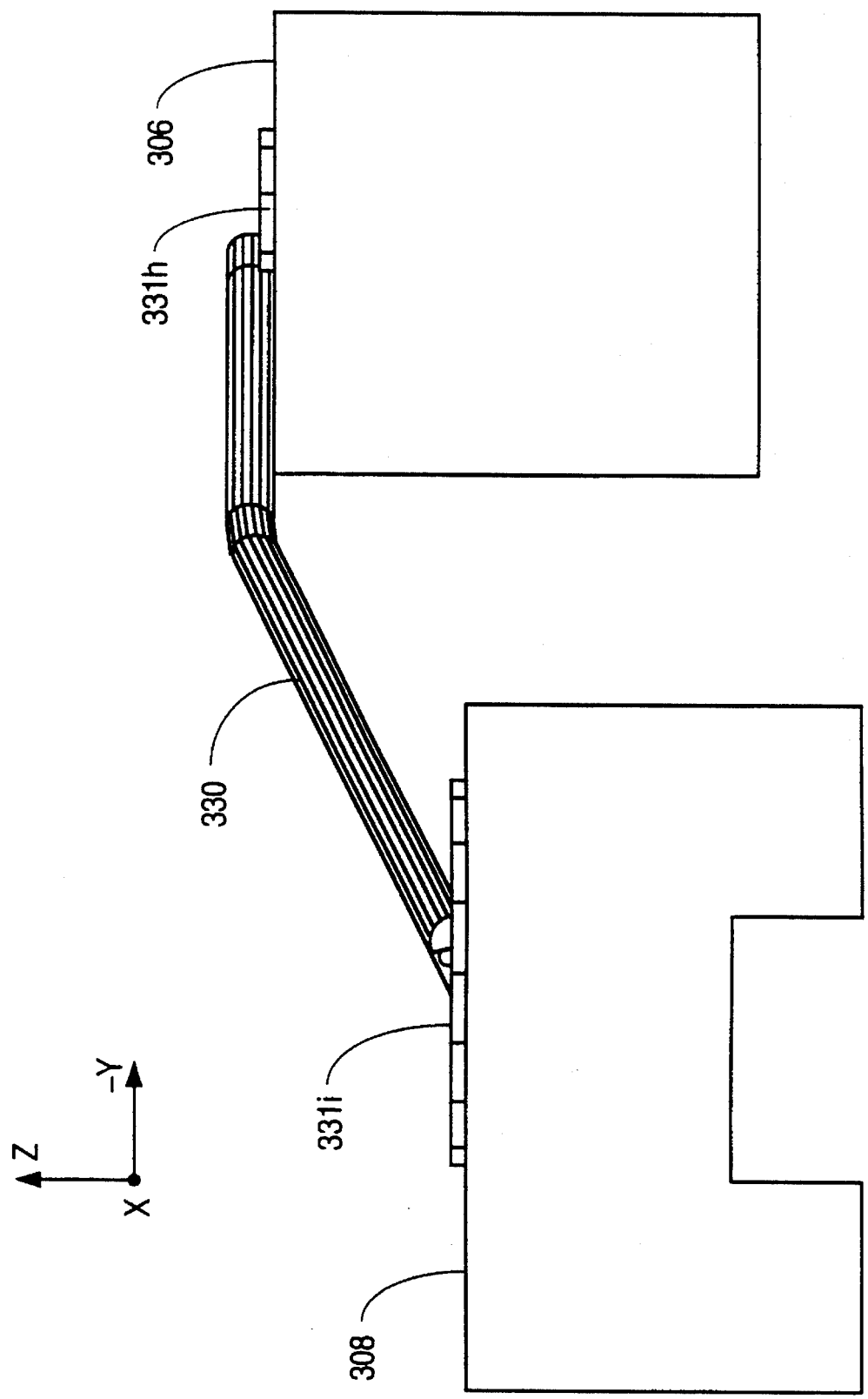

In one embodiment, support bar 306 is connected to head array 308 with a wire compliance spring 330. FIG. 15a is an isometric view of support bar 306, wire compliance spring 330 and monolithic head array 308. FIG. 15b is a side view of support bar 306, wire compliance spring 330 and monolithic head array 308. Wire compliance spring 330 is compliant along the Z-axis and is configured to provide a force along the negative Z-axis when head array 308 is preloaded against medium 116 (FIG. 15b). This preload force properly positions heads 120a–i along the Z-axis such that read and write operations may be performed. Wire compliance spring 330 provides stiffness and stability to the reciprocating head array 308 along the X and Y axes and provides compliance for slight rotation of head array 308 about the Y-axis as head array 308 reaches the ends of its oscillations. The unconnected portions of compliance spring 330 enhance this rotating compliance. The compliance about the Y-axis helps to keep head array 308 parallel to the X-Y plane. Wire compliance spring 330 is made of a material such as stainless steel and is formed into a three-dimensional spring using conventional techniques. Wire compliance spring 330 is attached to head array 308 and support bar 306 by brazing at points 331a–i.

Figure 15C:
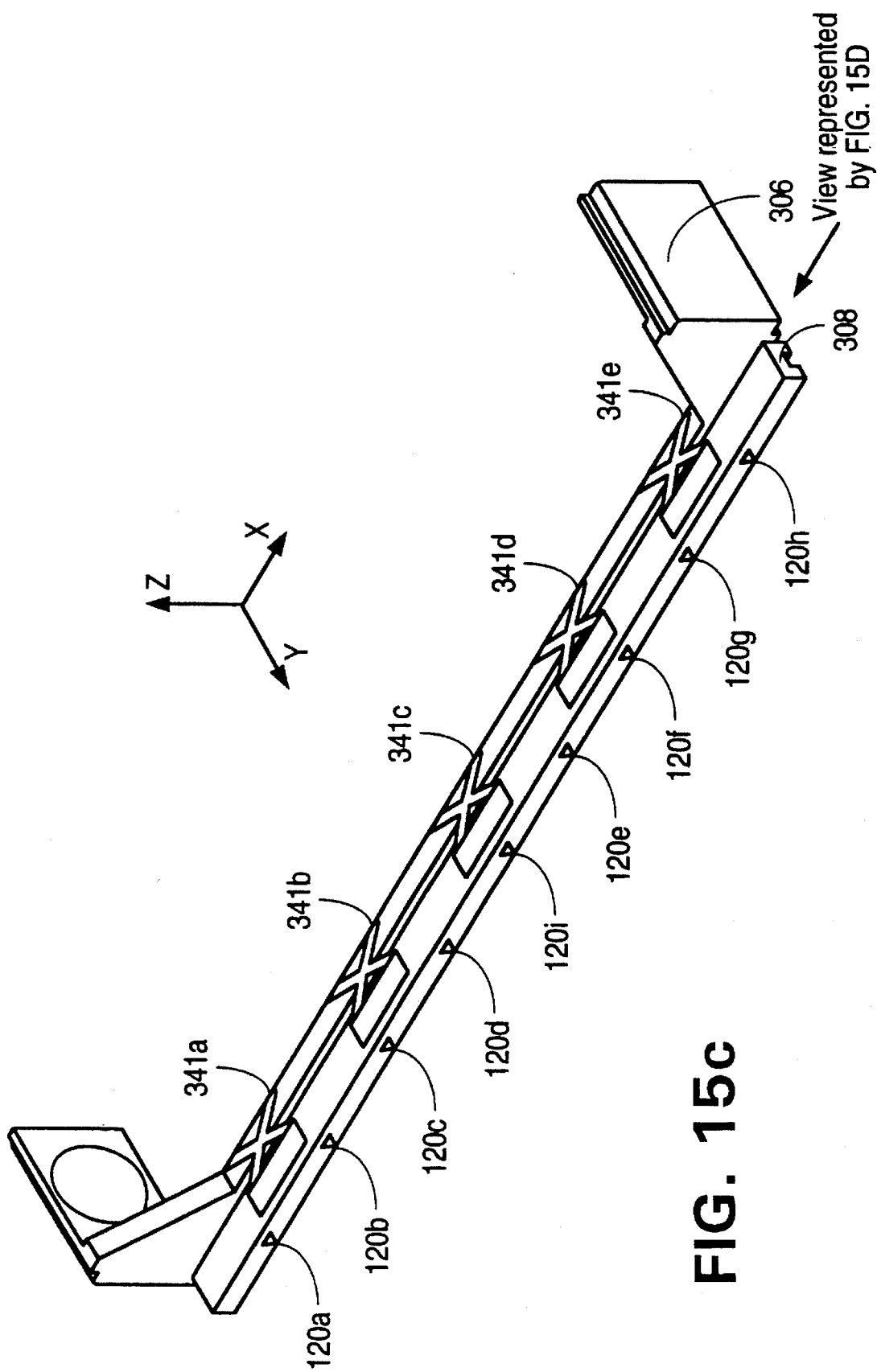
FIG. 15c is an isometric view of a support bar, cross springs and a monolithic head array in accordance with one embodiment of the present invention.
Figure 15D:
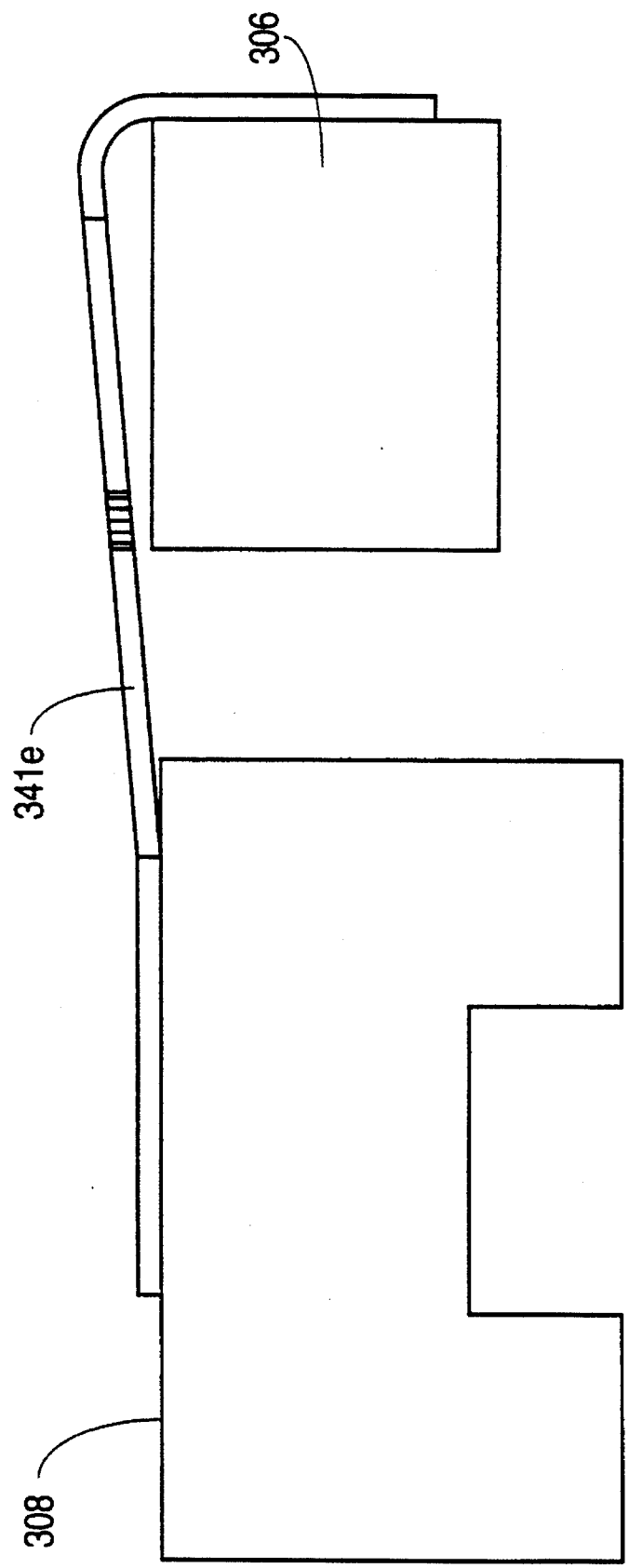
FIG. 15d is a side view of the support bar, cross springs, and monolithic head array of FIG. 15c, FIGS. 15e and 15f are isometric views illustrating an independent compliance spring.

In another embodiment, support bar 306 is connected to head array 308 with cross springs 341a–e. FIG. 15c is an isometric view of support bar 306, cross springs 341a–e and monolithic head array 308. FIG. 15d is a side view of support bar 306, cross spring 341e, and monolithic head array 308. Cross springs 341a–e are compliant along the Z-axis and provide a force along the negative Z-axis to preload head array 308 against medium 116 (not shown). This preload force properly positions heads 120a–i along the Z-axis such that read and write operations may be performed. Cross springs 341a–e also provide stiffness and stability to the moving head array 308 along the X and Y axes. In addition, cross springs 341a–e provide compliance for rotation of head array 308 about the Y-axis as the head array 308 reaches the ends of its oscillations. This compliance helps to keep head array 308 parallel to the X-Y plane. In one embodiment, cross springs 341a–e are fine blanked out of stainless sheet steel. Cross springs 341a–e are attached to head array 308 and support bar 306 by brazing, or by another suitable method.

Figure 15E:
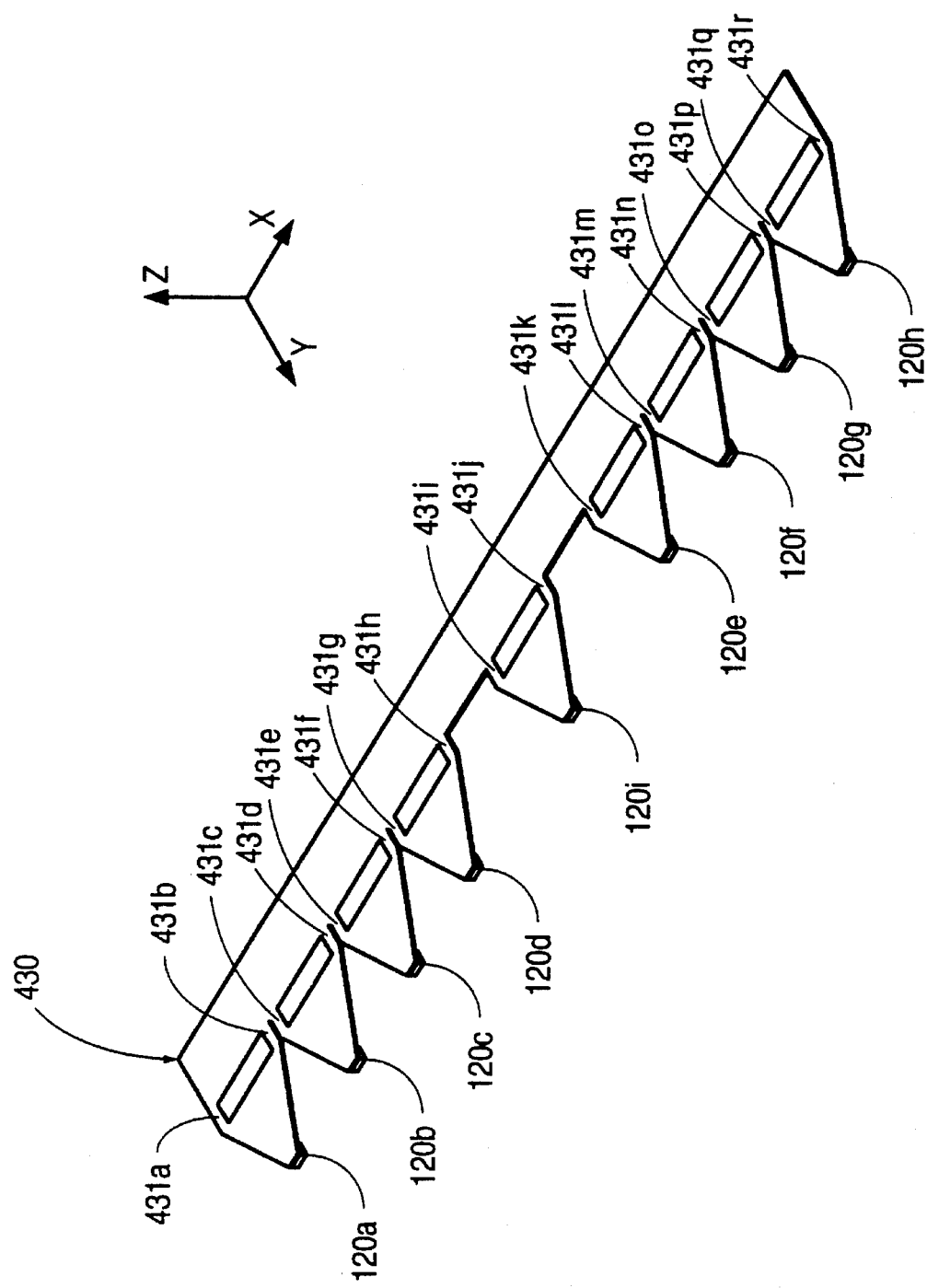
Figure 15F:
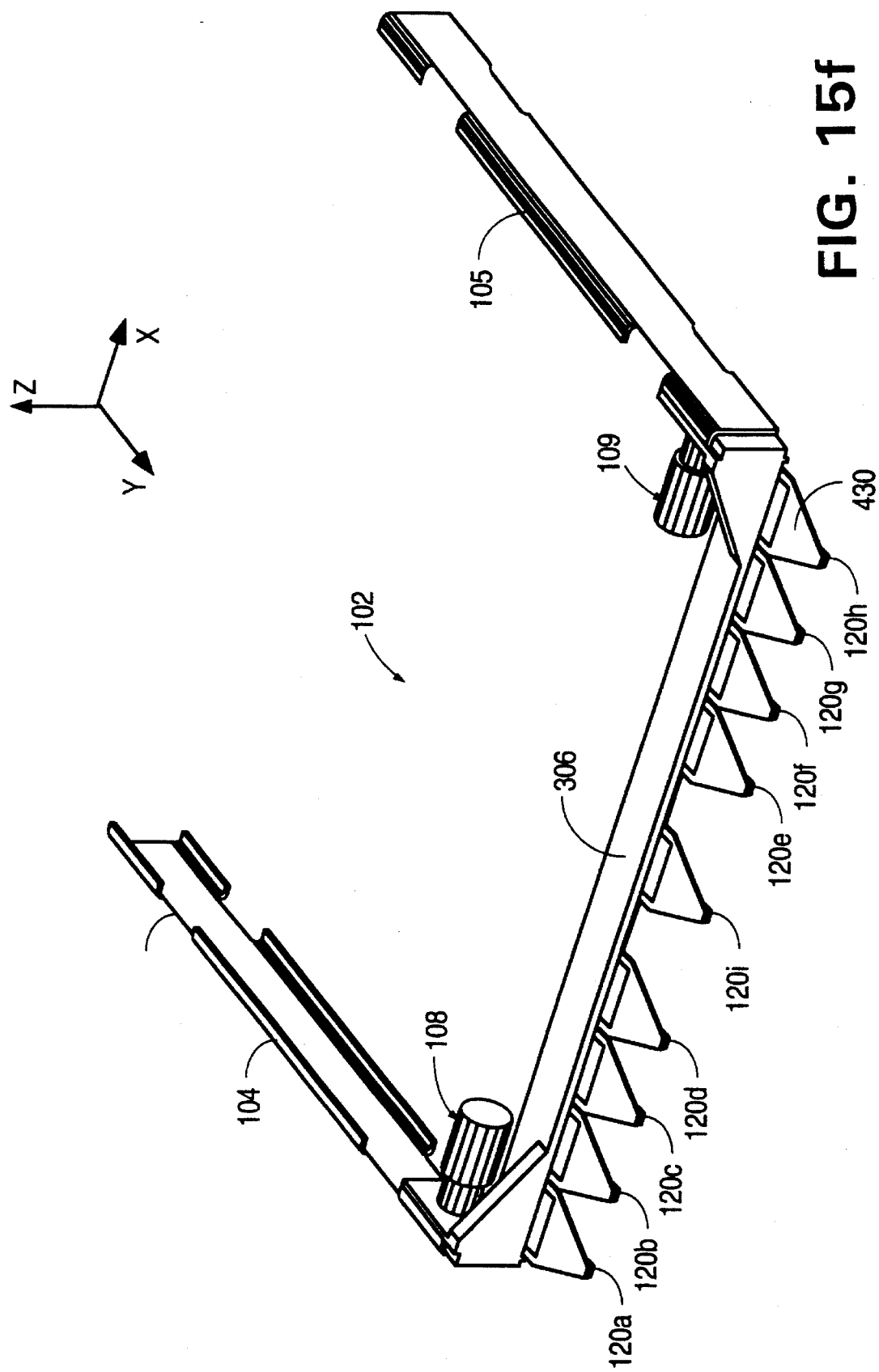

In an alternate embodiment, an independent compliance spring 430 is used to independently support heads 120a–i. FIGS. 15e and 15f are isometric views illustrating independent compliance spring 430. Independent compliance spring 430 is affixed to the underside of support bar 306 using a suitable grade of structural adhesive. The heads 120a–i are supported on the underside of compliance spring 430 with a suitable grade of structural adhesive. Compliance spring 430 is made of a non-magnetic, low permeability material such as stainless steel, alumina, silicon carbide or ceramic. The thin fingers 431a–r of compliance spring 430 are slightly flexible along the Z-axis and provide a preload force in negative Z direction. This flexibility allows each of heads 120a–i to be properly positioned on medium 116 (not shown), even if there are irregularities in the surface of medium 116. Independent compliance spring 430 promotes stiffness and stability of heads 120a–i along the X and Y axes. The shape of compliance spring 430 acts to keep the individual heads 120a–i from experiencing excessive rotation about the Y-axis as heads 120a–i are reciprocating along the X-axis. In certain embodiments, it is desirable to mass balance head array assembly 102 such that the center of mass of head array assembly 102 in a plane parallel to the X-Y plane is co-planar with the force generated by X-axis motors 108–109, thereby minimizing the rotation of support bar 306 about the Y-axis near the end of each oscillation of head array assembly 102. This mass balancing may be done by attaching additional material on support bar 306 or by adjusting the Z-axis position of a component of head array assembly 102, such as coils 302–303 of the X-axis motors 108–109. By balancing head array assembly 102, support bar 306 remains substantially level as heads 120a–i sweep across medium 116.

Alternate Compliance Spring Embodiments

Figure 15G:
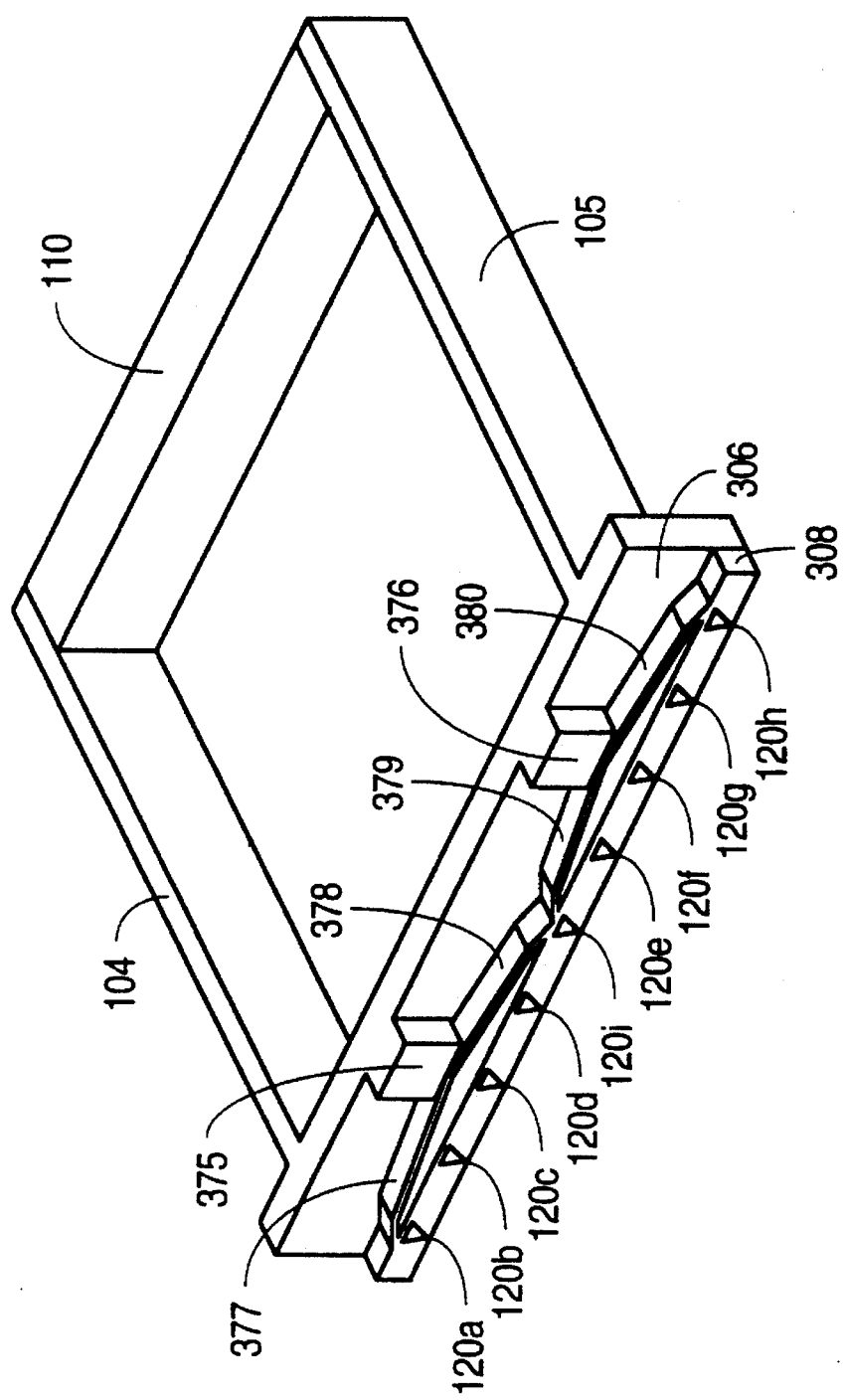
FIGS. 15g and 15h are isometric views of two additional generic compliance spring embodiments.
Figure 15H:
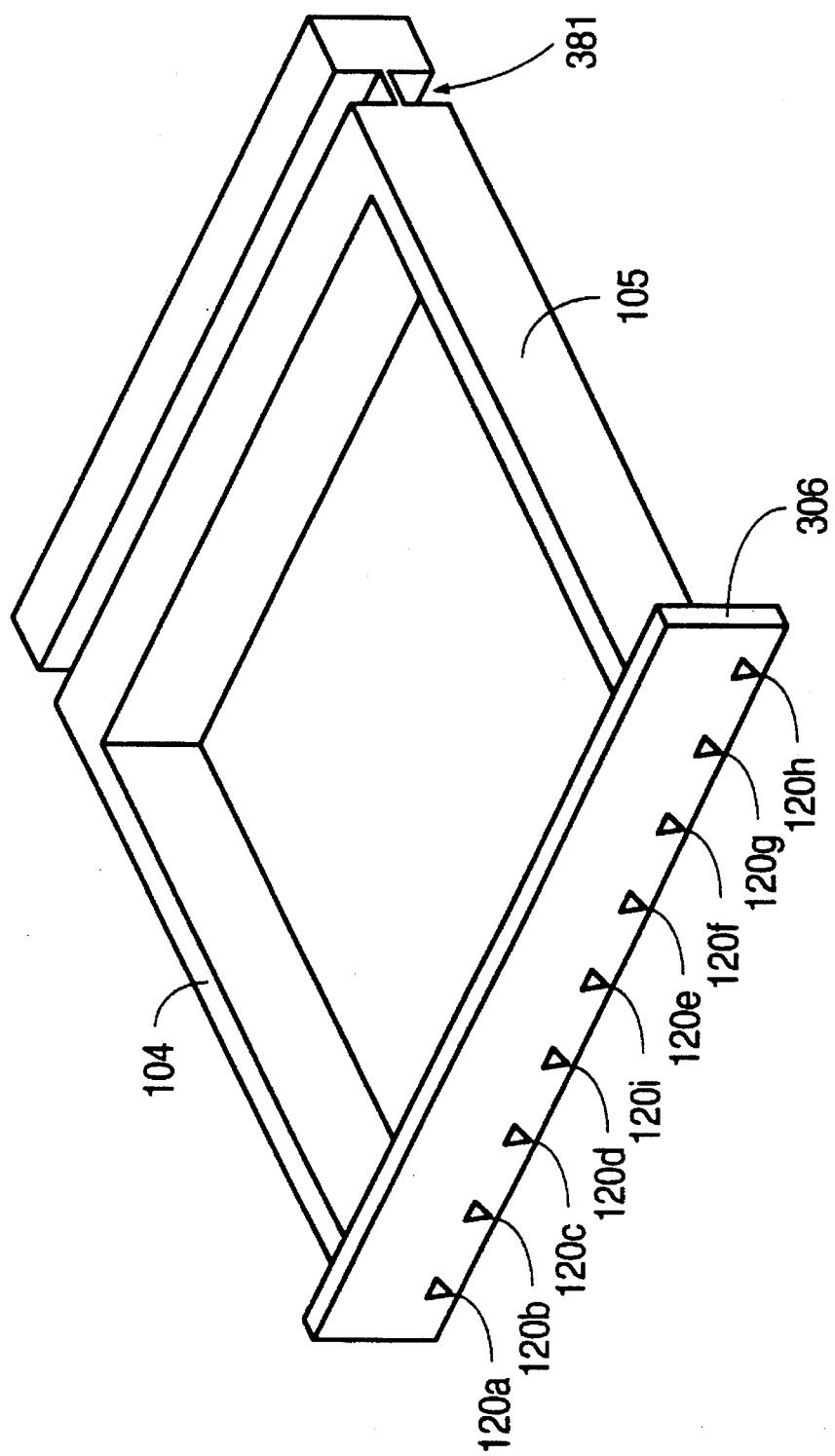

FIGS. 15g and 15h are isometric views of two additional generic compliance spring embodiments.

In FIG. 15g, heads 120a–i are mounted on head array 308. Head array 308 is connected to suspension blocks 375–376 by suspension flexures 377–380. Suspension blocks 375–376 are connected to the support bar 306. Suspension flexures 377–380 provide the necessary compliance for proper operation as a compliance spring. FIG. 15h illustrates another compliance spring embodiment, in which heads 120a–i are mounted on support bar 306. Vertical flexure 381 is compliant along the Z-axis to provide the necessary compliance for operation of the compliance spring.

Head array/Magnetic Heads

Figure 16D:
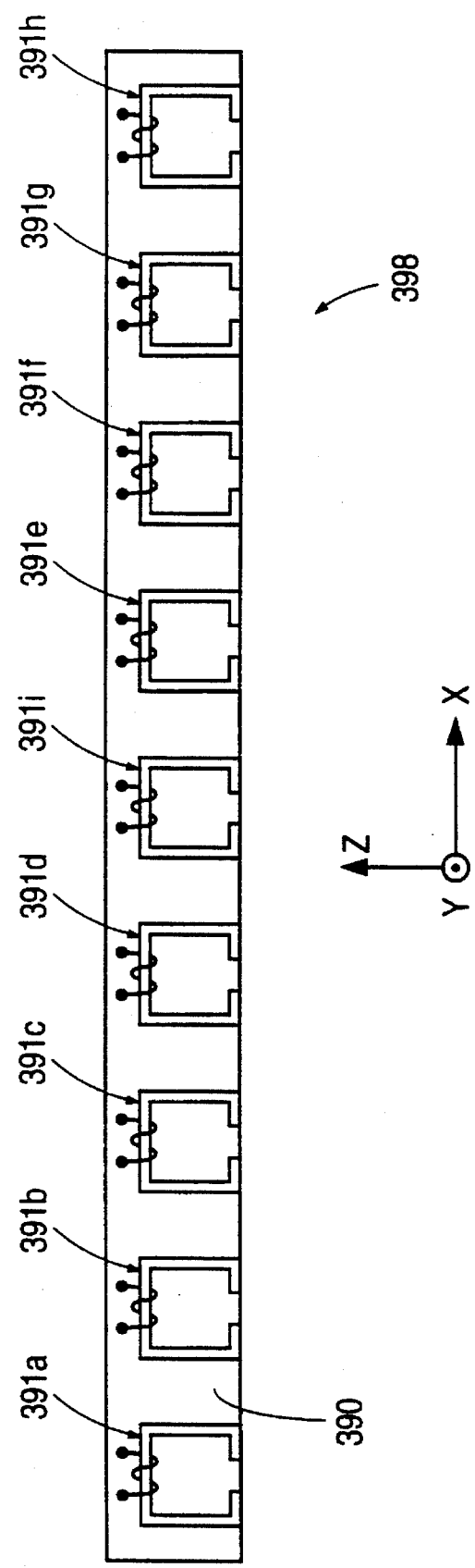
FIGS. 16a–16p illustrate several types of magnetic heads and head arrays which may be used in a memory storage module.

In one embodiment of the present invention, the surface of head array 308 which is closest to magnetic medium 116 contains eight magnetic read/write heads 120a–h and one servo head 120i (FIGS. 1, 2, 4b). During operation of memory storage module 100, heads 120a–i are held in contact with magnetic medium 116. FIGS. 16a–16o illustrate several types of head arrays and magnetic heads which may be used in memory storage module 100. FIGS. 16c–16o use the X-Y-Z coordinate system of FIG. 1.

FIG. 16a is a side view of a thin film inductive magnetic head 382a used in a typical disk drive. FIG. 16b is a front view of magnetic head 382a. Magnetic head 382a, which includes poles 383 and 384, winding 385, and gap 387 is coupled to substrate 386. Gap 387 is perpendicular to the relative motion of the rotating medium. Head 382a is modified for use in memory storage module 100. That is, poles 383 and 384 are reoriented such that gap 387 is perpendicular to the X-axis of medium 116.

FIG. 16c is an isometric view of a composite head array 388 which effectively re-orients gap 387 of head 382a, such that gap 387 is perpendicular to the X-axis. In this embodiment, substrate 386 is cut to form a substrate/head assembly which includes head 382a. A plurality of similarly cut substrate/head assemblies containing heads 382b–i are bonded end to end to form head array 388. Each head 382a–i is positioned with its gap perpendicular to the X-axis. The lower surface 389a of head array 388 is then polished and lapped to create a smooth, flat surface which is placed in contact with the medium.

The windings of each head 382a–i extend to an exposed surface of head array 388 thereby allowing heads 382a–i to be coupled to pre-amplifiers which amplify the read and write signals associated with heads 382a–i. Thus, wires and bonding pads, such as wires 392a–392b and bonding pads 393a–393b, are fabricated using either a plating process or a sputtering process known in the art. The pre-amplifiers are coupled to the bonding pads, such as bonding pads 393a–393b. Bonding pads 393a–393b can be fabricated on the top surface 389c of head array 388 as illustrated in FIG. 16c, on the back surface 389d of head array 388 or on the front surface 389b of head array 388. In an alternate embodiment, the pre-amplifiers are fabricated in substrate 386.

In an alternate embodiment, the previously described substrate/head assemblies are individually mounted on an individual compliance spring such as individual compliance spring 430 as illustrated in FIGS. 15e–f. In such an embodiment, each head 382a–i is oriented with its gap perpendicular to the X-axis.

FIG. 16d is a schematic diagram of a monolithic head array 398 where magnetic heads 391a–i are fabricated on a surface of head array 398 which lies in the X-Z plane (i.e., the front and/or rear surface of head array 398) using thin film head technology. Magnetic heads 391a–i are conventional thin film head structures typically used in rotating disk drives. In one embodiment, magnetic heads 391a–i are fabricated in a straight line along the X-axis, with the gap of each head perpendicular to the X-axis. This configuration allows head array 398 to be fabricated without cutting and bonding the individual heads 391a–i. In an alternate embodiment, thin film heads 391a–i are separated and individually mounted on an individual compliance spring, such as compliance spring 430, illustrated in FIGS. 15e–f.

Figure 16E:
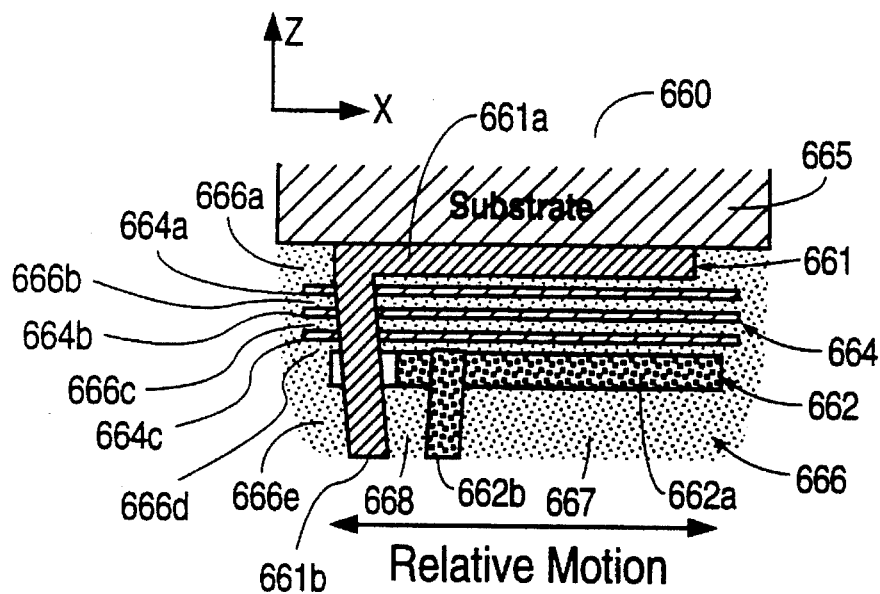
Figure 16F:
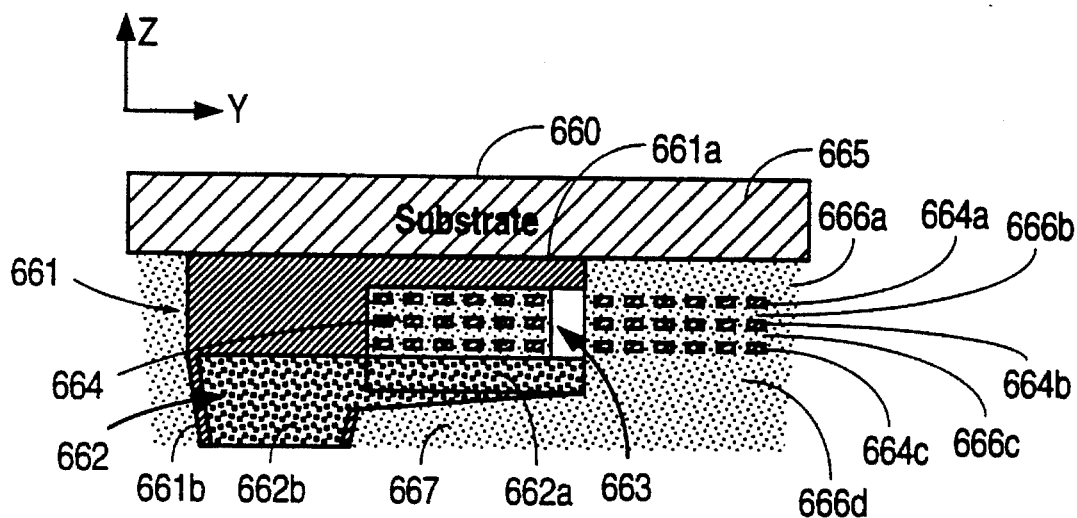

FIGS. 16e and 16f are front and side views, respectively, of a twisted pole magnetic head 660. The poles 661, 662 of head 660 are twisted 90° to position gap 668 perpendicular to the X-axis. Twisted pole magnetic head 660 is a longitudinal inductive recording transducer which can be fabricated in a co-planar arrangement with current thin film technology as described below.

Planar twisted pole magnetic head 660 is fabricated on the bottom surface of substrate 665. Substrate 665 can be ceramic, glass, silicon wafer, a conductive material that has been surface passivated and coated with an insulating material, or some other insulating material. The magnetic upper plate 661a of pole 661 is plated or sputtered onto substrate 665 using conventional photolithographic techniques. Upper plate 661a of pole 661 is coated with a first layer 666a of insulating material 666 which is neither electrically nor magnetically conductive. A first layer 664a of coil 664 is then deposited on the previously deposited layer of insulating material 666. The coil 664 is a conductive material such as copper or aluminum which is plated or sputtered using conventional photolithographic techniques. Coil 664 typically has 2–4 layers. Second and third layers 664b–664c of coil 664 and second, third and fourth layers 666b–d of insulating material 666 are alternately deposited as illustrated in FIGS. 16e–16f. Vias are created in the second and third layers 666b–666c and additional coil material is deposited in these vias to complete the current path between the first, second and third layers 664a–664c of coil 664. In a similar manner, pole tip 661b and magnetic circuit connector 663 are sputter deposited or plated in a series of aligned vias as the layers of insulating material 666 and coil 664 are being built up. Magnetic circuit connector 663 is made of a magnetic material.

After the fourth layer 666d of insulating material 666 is created, the upper plate 662a of pole 662 is deposited by sputtering or plating. Pole 662 is made of a magnetic material. Pole tips 661b and 662b are fabricated by creating at least a fifth layer 666e of insulating material 666, forming aligned vias in fifth layer 666e and depositing magnetic material into these vias. To extend pole tips 661b and 662b, the previously described steps are repeated. The length, width, shape and gap separation of poles 661 and 662 vary depending upon track and linear data density and the relative velocity of head 660. Write currents of head 660 are typically in the range of 5 to $15 \times 10^{-3}$ amperes and read voltages are typically in the range of 200 to 500 microvolts. Poles 661 and 662 are formed without any machining operations except for the polishing of surface 667 of head 660 which comes in contact with magnetic medium 116.

A number of twisted pole heads 660 can be fabricated on the bottom surface of a monolithic head array in the manner illustrated in FIGS. 16d' and 16d". FIGS. 16d' and 16d" are isometric views of a generic monolithic head array 1600 which includes planar magnetic heads 1620a–i. FIGS. 16d' and 16d" illustrate embodiments in which the windings of heads 1620a–i are either extended from bottom surface 1621 of head array 1600 to side surface 1622 or to top surface 1623 of head array 1600. In one embodiment, the windings of heads 1620a–d and 1620i are connected to wire traces 1601–1610 which run from bottom surface 1621 to side surface 1622 to top surface 1623 of head array 1600. In an alternate embodiment, the windings of heads 1620e–h are connected to wire traces 1611–1618 which run from bottom surface 1621 to side surface 1622. Wire traces 1601–1618 are formed on the surface of head array 1600 using conventional plating or sputtering techniques.

Alternately, twisted pole heads 660 can be individually suspended as illustrated in FIGS. 15e–f. Furthermore, because twisted pole head 660 is a co-planar head, twisted pole head 660 can also be fabricated in a two dimensional array.

Figure 16G:
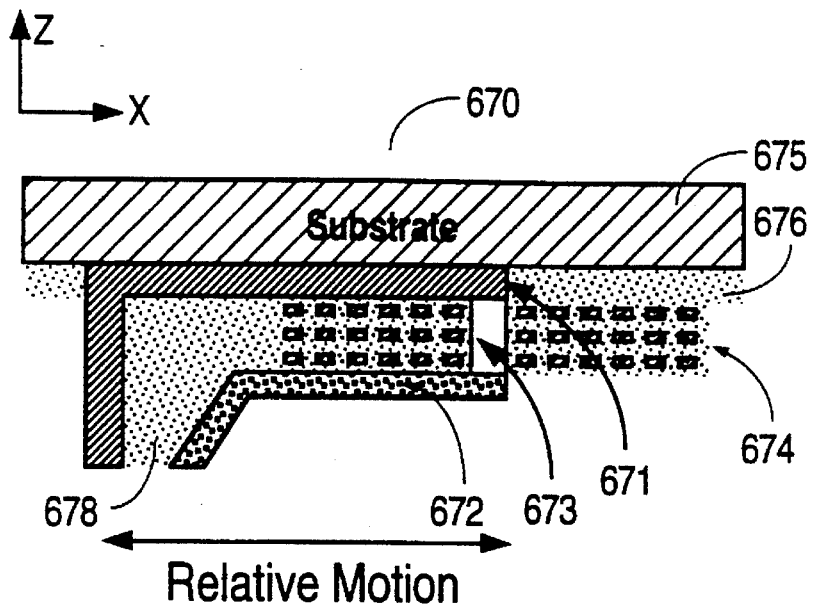
Figure 16H:
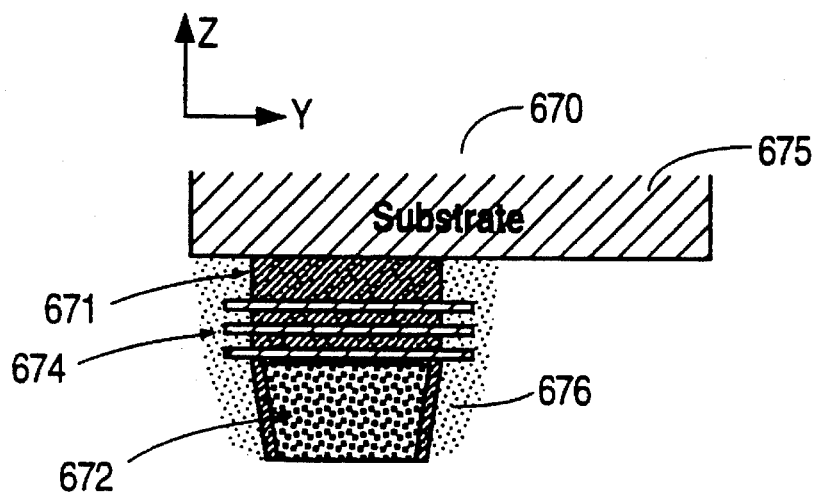

FIGS. 16g and 16h are front and side views, respectively, of a planar L-pole magnetic head 670. L-pole magnetic head 670 is a longitudinal inductive recording transducer which can be fabricated in a co-planar arrangement with current thin film technology.

As illustrated in FIGS. 16g–16h, L-pole magnetic head 670 includes a substrate 675, L-shaped poles 671 and 672, magnetic circuit connector 673, coil 674, insulating material 676, and gap 678. L-pole magnetic head 670 is fabricated on the bottom surface of substrate 675 using a method similar to the method previously described in connection with twisted pole magnetic head 660 (FIGS. 16e–f). Planar L-pole head 670 can be fabricated into a monolithic head array in the manner illustrated in FIGS. 16d' and 16d". Alternately, L-pole head 670 can be individually suspended as illustrated in FIGS. 15e–f. Because L-pole head 670 is a co-planar head, L-pole head 670 can also be fabricated in a two dimensional array.

Figure 16I:
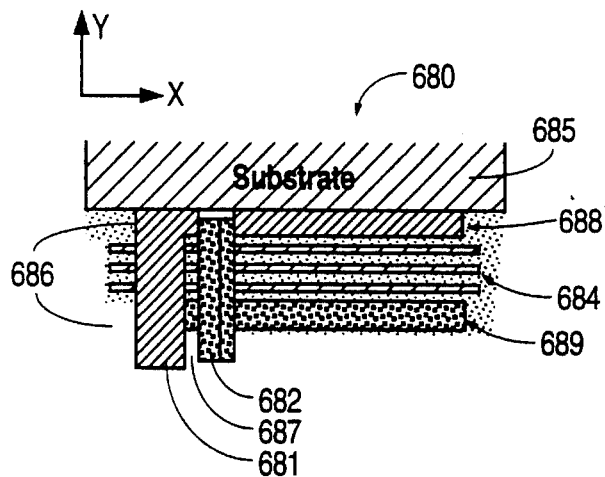
Figure 16J:
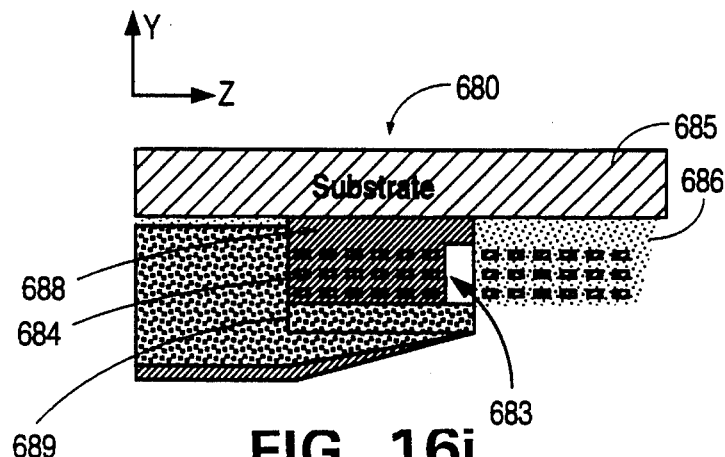
Figure 16K:
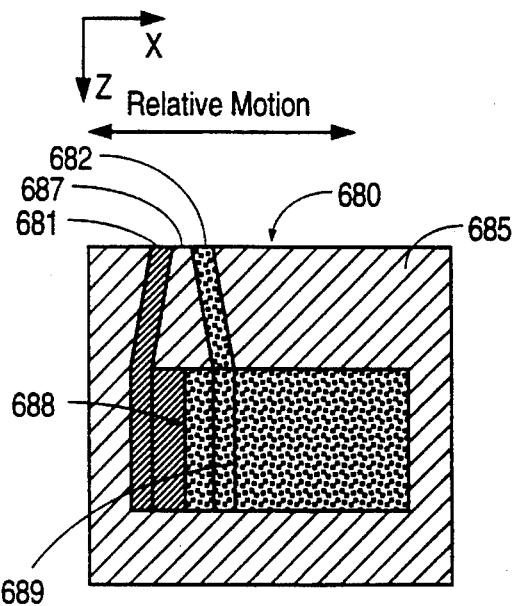

FIGS. 16i–16k are front, side and bottom views of a rotated pole magnetic head 680. Rotated pole head 680 includes a substrate 685, pole tips 681 and 682, top plate 688, bottom plate 689, magnetic circuit connector 683, coil 684, insulating material 686, and gap 687. Rotated pole head 680 is fabricated using the general method previously described in connection with twisted pole head 660 (FIGS. 16e–f). Rotated pole head 680 differs from twisted pole head 660 (FIGS. 16e–f) and L-pole head 670 (FIGS. 16g–h) in that the pole tips 681 and 682 are rotated 90 degrees from top plate 688 and bottom plate 689, respectively, such that gap 687 is orthogonal to the surface of medium 116. Minor lapping and/or polishing is performed at the ends of pole tips 681 and 682 along surface 690 to properly define the width of gap 687. A plurality of heads, like rotated pole head 680 can be fabricated into a monolithic head array in the manner illustrated in FIG. 16d. Alternately, rotated pole head 680 can be individually suspended as illustrated in FIGS. 15e–f.

Figure 16M:
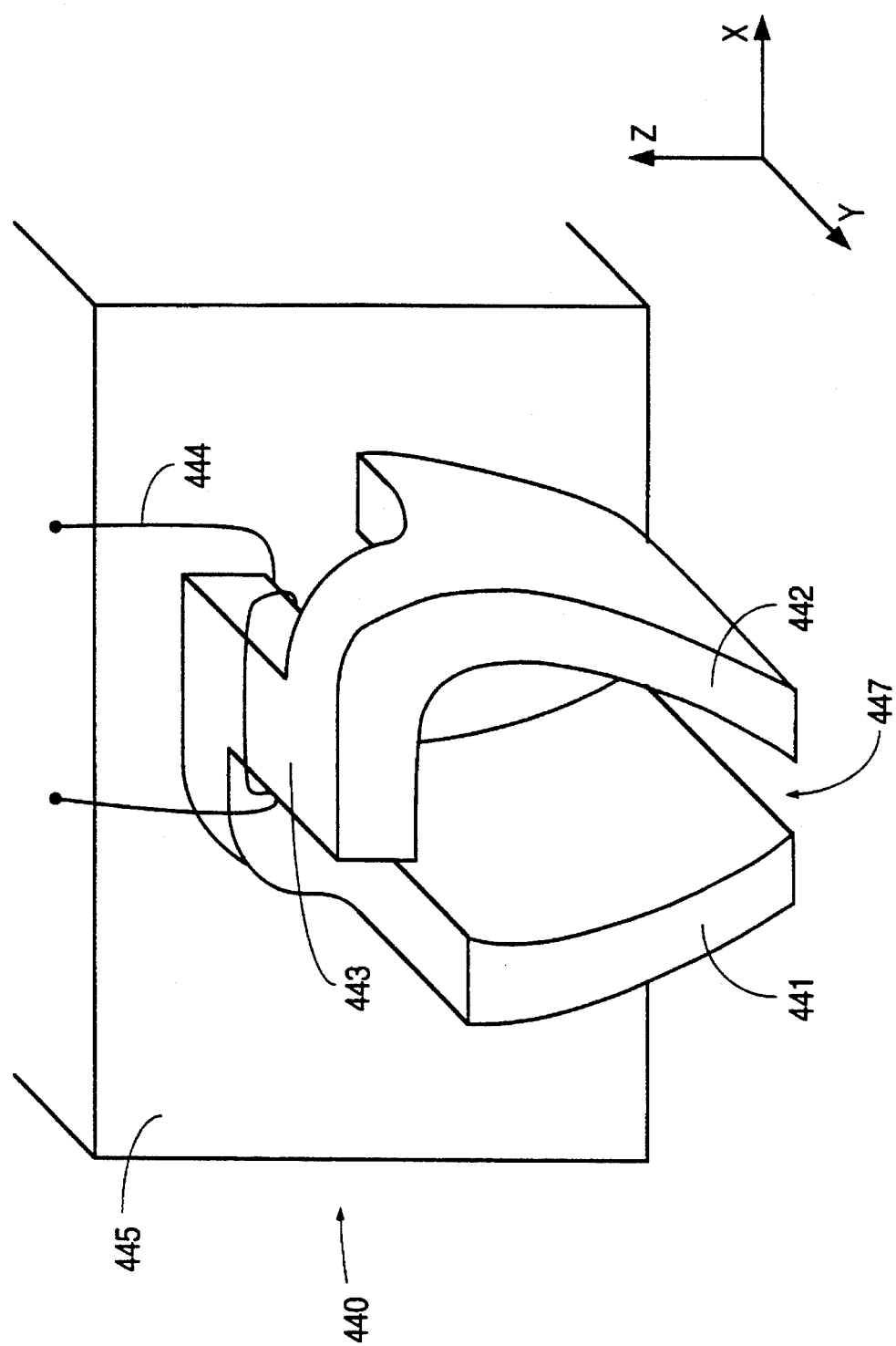

FIG. 16m illustrates an alternate embodiment of a horseshoe shaped magnetic head 440. Magnetic head 440 includes poles 441–442, connector 443, winding 444, substrate 445 and gap 447. The configuration of poles 441 and 442 cause the gap 447 to be properly positioned for operation along the X-axis. Winding 444 is wrapped around connector 443. A collinear row of heads like head 440 can be fabricated on a single substrate to form a monolithic head array as illustrated in FIG. 16d. Alternately, a plurality of heads like head 440 can be individually suspended as illustrated in FIGS. 15e–f.

In another embodiment, planar vertical recording magnetic heads are utilized. A family of planar vertical recording magnetic heads which can be modified for use in memory storage module 100 is described in detail in U.S. Pat. Nos. 5,041,932, 5,111,351, 5,174,012, 5,063,712, 5,163,218, and 5,073,242, which are herein incorporated by reference. FIG. 16m illustrates substrate 456, poles 452–453, winding 454 and gap 457 of vertical recording head 450a. Planar vertical recording head 450a is designed to operate in connection with a vertically oriented magnetic recording medium. Because of the low mass and small surface area of head 450a, potential contact start/stop (CSS) problems are minimized.

Figure 16N:
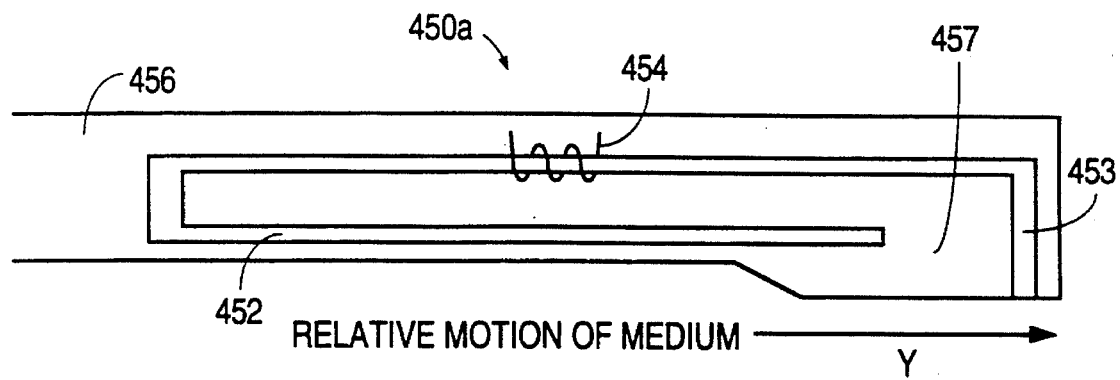
Figure 16O:
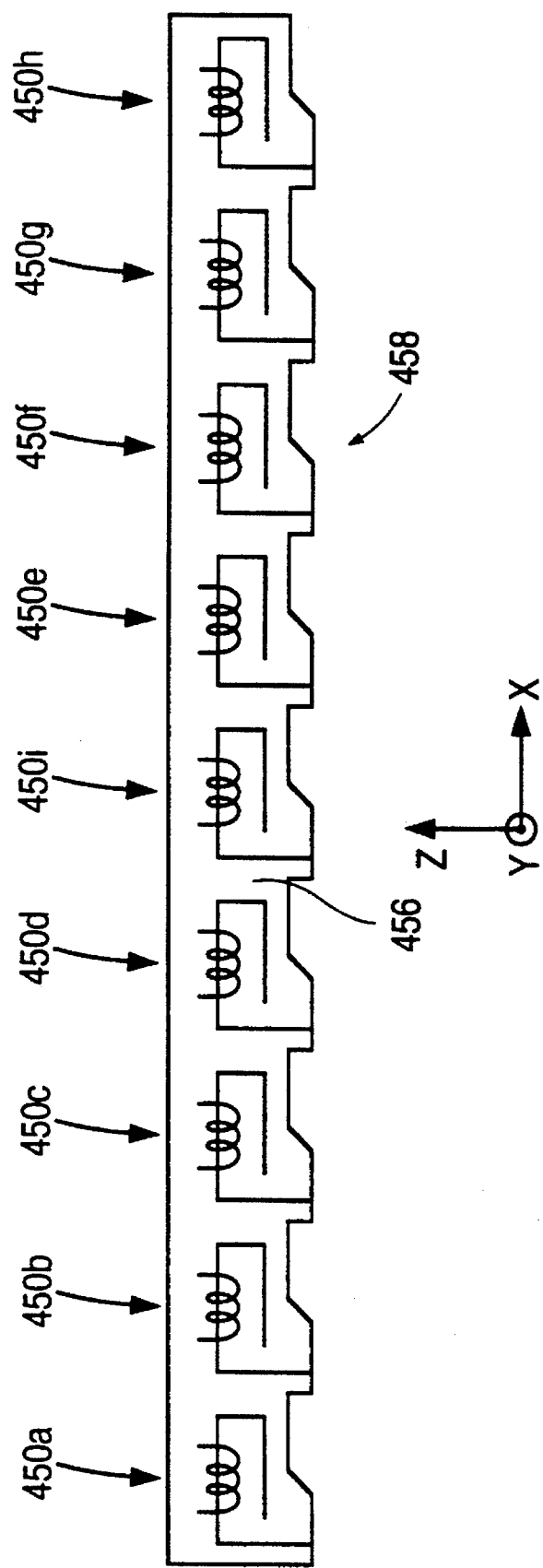
Figure 16P:
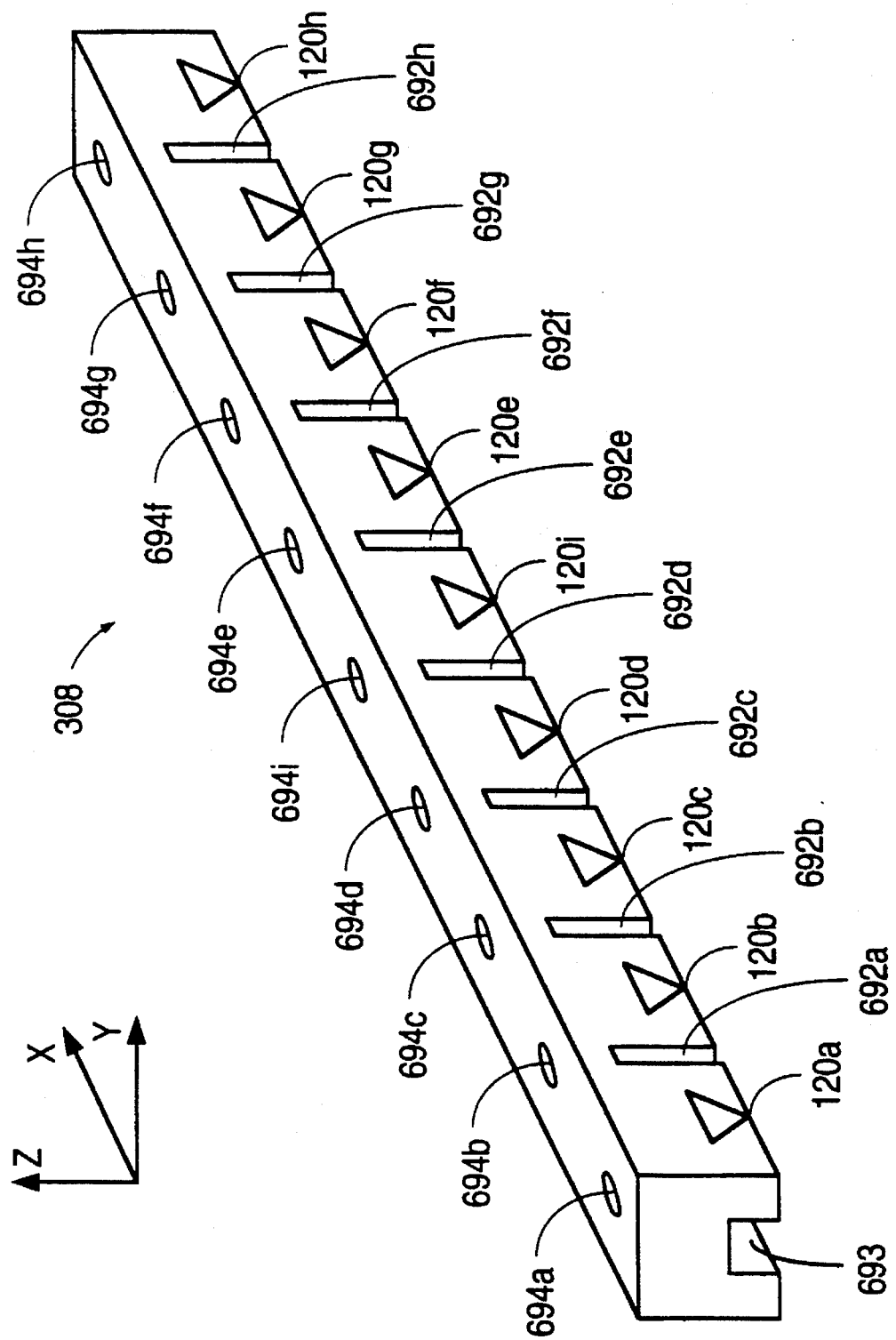

FIG. 16n is a cross sectional view of a head array 458 which includes a row of vertical recording heads 450a–i fabricated in substrate 456. The gap of each head 450a–i is perpendicular to the X-axis. In an alternate embodiment, vertical recording heads 450a–i are individually suspended as illustrated in FIGS. 15e–f.

In another embodiment, the magnetic head described in U.S. Pat. No. 5,122,917 (herein incorporated by reference) is used in memory storage module 100. This head is also designed for contact-type operation. The gap of the head must be rotated 90 degrees to allow for proper operation when the relative motion between the gap and the medium occurs along the X-axis. In one embodiment, each head is individually suspended as illustrated in FIGS. 15e–f. In another embodiment, a row of heads, each having a gap perpendicular to the X-axis, is fabricated on a single substrate to form a monolithic or composite head array.

FIG. 16o is an isometric view of one embodiment of head array 308. Longitudinal notch 693 runs the length of the head array 308 along the X-axis. Longitudinal notch 693 reduces the area of head array 308 which is in contact with medium 116 and reduces the mass of head array 308, thereby increasing the natural resonant frequency of head array assembly 102. Longitudinal notch 693 also reduces stiction and friction between head array 308 and medium 116 by reducing the area of contact between these two elements. The reduced stiction and friction results in reduced wear between head array 308 and medium 116. Longitudinal notch 693 also improves the flexibility of head array 308, thereby facilitating contact between heads 120a–i and medium 116. Longitudinal notch 693 also allows head array 308 to be wider along the Y-axis, thereby improving the stability of head array 308 as heads 120a–i are reciprocated on medium 116.

Lateral notches 692a–692h similarly reduce the mass of head array 308. In addition, lateral notches 692a–692h act to separate heads 120a–i, such that heads 120a–i exhibit a degree of independent suspension. Thus, if medium 116 is not perfectly flat, notches 692a–692h allow heads 120a–i to conform to the surface of medium 116, thereby promoting flat contact between heads 120a–i and medium 116. In one embodiment, notches 692a–692h are cut at least half way through head array 308. To further promote contact between heads 120a–i and medium 116, the compliance spring used to couple and support bar 306 to head array 308 (See, e.g., FIGS. 15a–15d) should contact head array 308 at points 694a–694i (FIG. 16g). Such a compliance spring configuration adds to the independence of suspension of heads 120a–i.

Virtually any number of read/write heads may be used in memory storage module 100. Magnetic read/write heads are typically 10 to 12 mils wide, including coils. It is therefore possible to place 60 to 80 heads per inch on head array 308. However, as the spacing between the heads decreases, the length of the data tracks along the X-axis also decreases.

While prior art disk drives normally utilize one read/write channel for each medium surface, memory storage module 100 can utilize multiple read/write channels from the surface of medium 116. Thus, memory storage module 100 can simultaneously read (or write) a byte having a width of eight bits by reading (or writing) one bit through each of the read/write heads 120a–h. In a similar manner, memory storage module 100 can simultaneously read two four-bit bytes. In addition, memory storage module 100 can read eight separate channels of data simultaneously, with each read/write head 120a–h serially reading the data stored on its associated tracks. Read/write heads 120a–h may also be multiplexed. That is, the control circuitry may enable any number of the eight read/write heads 120a–h at any given time. The structure of memory storage module 100 allows the same number of bits to be read at the same frequency and at the same data rate from a plurality of tracks on the surface of medium 116.

Figure 17A:
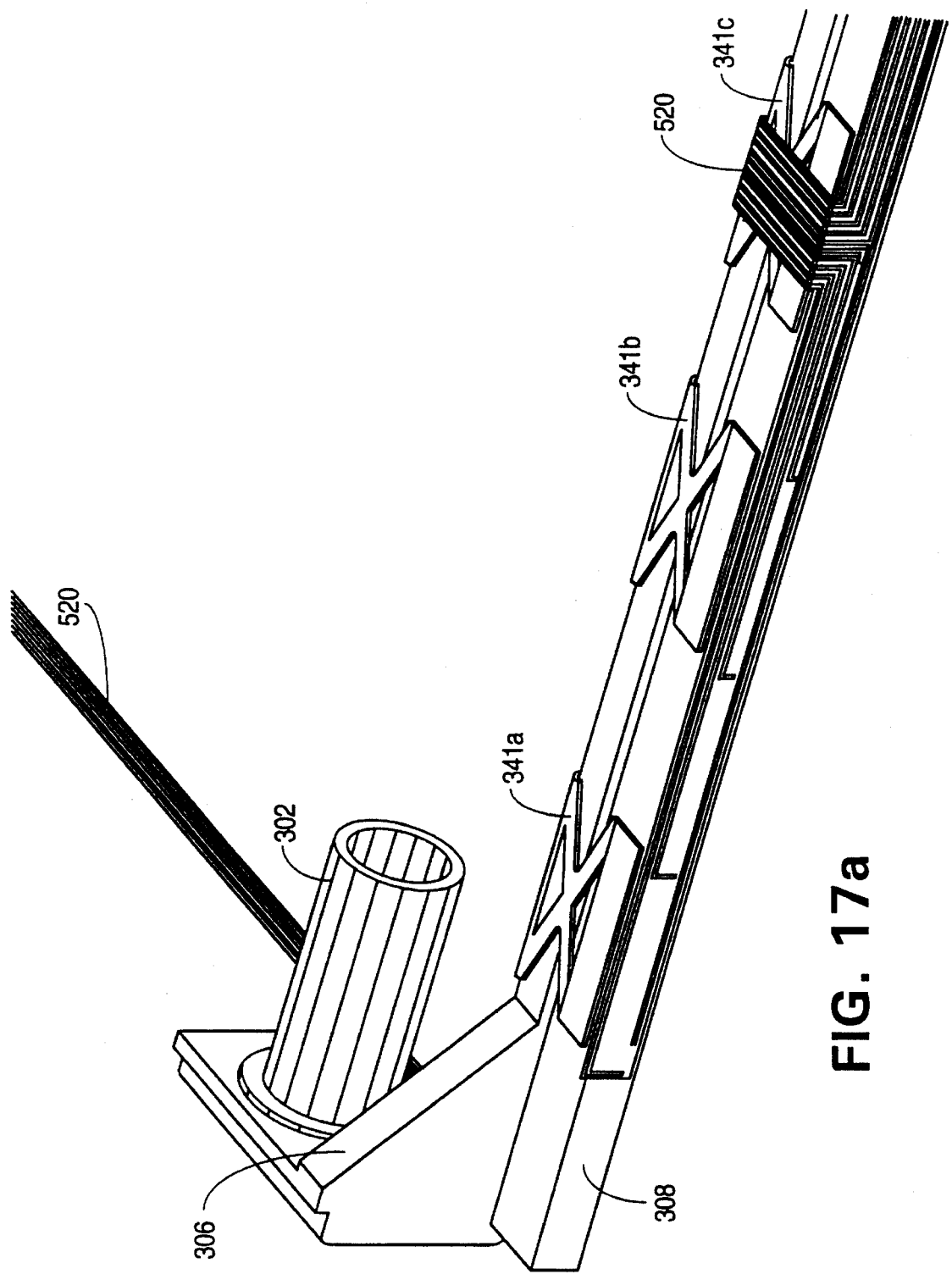
FIG. 17a is an isometric view illustrating a flexible printed circuit cable which connects heads to circuitry on a printed circuit board.

FIG. 17a is an isometric view illustrating a flexible printed circuit cable (PCC) 520 which connects magnetic heads 120a–i to circuitry on PCB 202. PCC 520 contains twenty-two electrically conductive elements (two conductive elements for each head and two conductive elements for each coil 302–303) which connect the coils of heads 120a–i (not shown) to control circuitry in PCB 202. PCC 520 travels over center compliance spring 341c to the rear of support bar 306. At the rear of support bar 306, PCC 520 splits, with up to twelve electrically conductive members traveling along each flexure 104–105 to the rear of carriage 110 where they are connected to bonding pad 240 (not shown).

In an alternate embodiment, PCC 520 terminates at flexures 104–105. PCC 520 is coupled to wire traces which run the length of flexures 104–105. These traces are formed by depositing a dielectric material on the flexure and plating the wire traces on the dielectric material. The wire traces terminate at bonding pads on flexures 104–105. In one embodiment elastomeric connectors located between flexures 104–105 and carriage 110 couple these bonding pads to conductive members which lead to bonding pad 240.

Because the signals used to drive X-axis motor coils 108–109 are larger than the signals transmitted to and from magnetic heads 120a–i, shielding is provided between the conductors carrying the large and small signal to prevent corruption of the small signals. In one embodiment, this shielding is provided by positioning a ground shield within PCC 520 between the conductors carrying the X-axis motor signals and the conductors carrying the signals associated with heads 120a–i. In another embodiment, flexures 104 and 105 are used as a shield by positioning the conductors carrying the X-axis motor signals on one side of flexure 104 or 105 and the conductors carrying the signals associated with heads 120a–i on the opposite side of flexure 104 or 105.

In an alternate embodiment, a steel layer is incorporated in flexible PCC 520 and PCC 520 is also used as a compliance spring coupling support bar 306 and head array 308.

Pre-amplifiers for heads 120a–i are either fabricated as part of head array 308, mounted on carriage 110, connected on PCC 520, or connected to PCB 202. By fabricating pre-amplifiers as part of head array 308, the pre-amplifiers are located closer to heads 120a–i, thereby resulting in advantageous features such as an improved signal to noise ratio for the signals passing to and from heads 120a–i.

Parking Mechanism

Figure 17B:
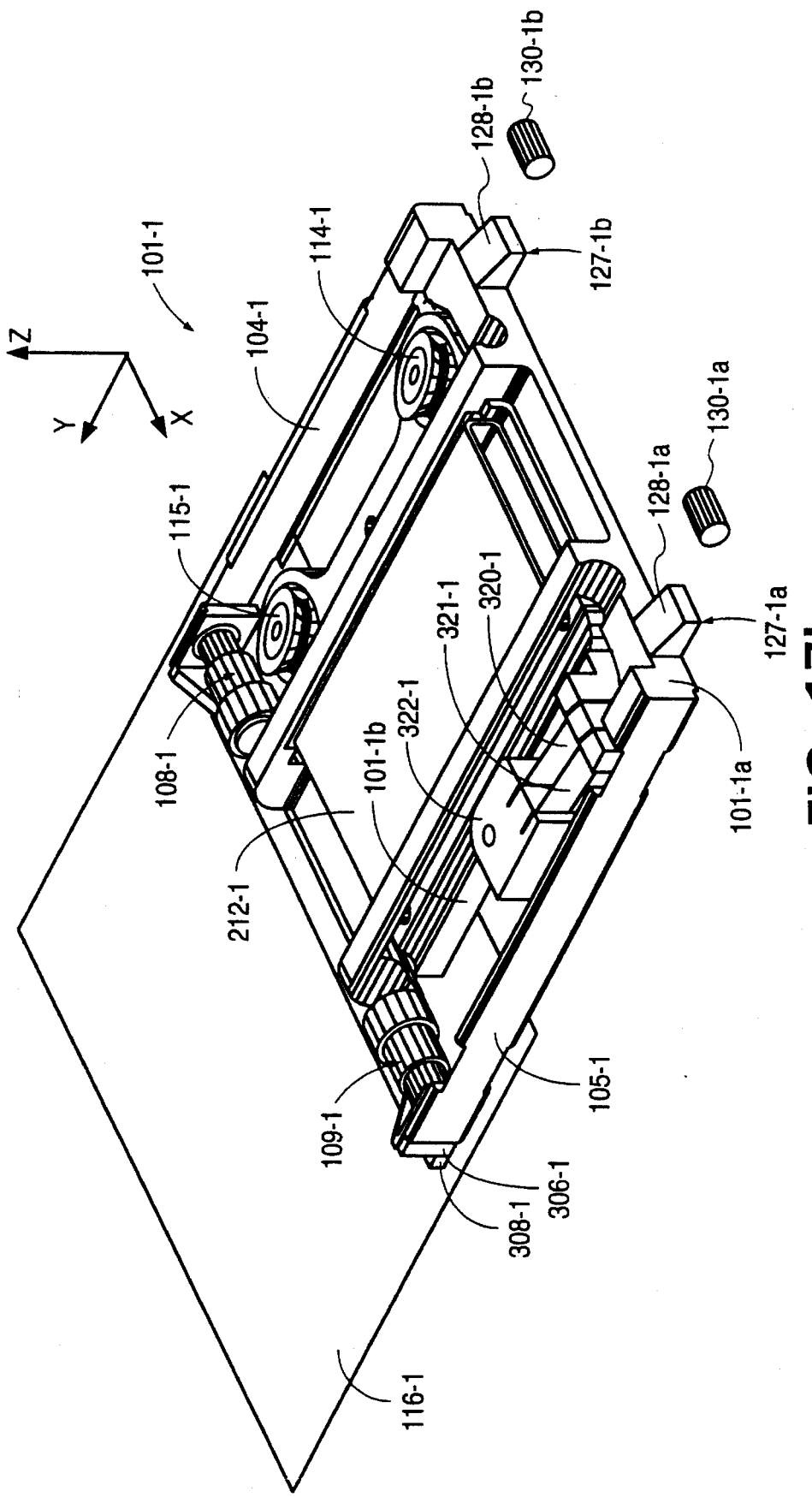
FIGS. 17b–17c are isometric views of a carriage assembly which includes a parking mechanism which lifts the head array off the medium.

FIG. 17b is an isometric view of a carriage assembly 101-1 which includes a parking mechanism which lifts head array 308-1 off medium 116-1 during the time that the memory storage module is not operating. Carriage assembly 101-1 includes head array 308-1, support bar 306-1, head motors 108-1 and 109-1, flexures 104-1 and 105-1, carriage pieces 101-1a and 101-1b, cam stops 127-1a and 127-1b having cam surfaces 128-1a and 128-1b, Y-axis coil 212-1, guide rollers 113-1 (not illustrated), 114-1 and 115-1, roller housing 322-1, preload springs 320-1 and 321-1 and pivot flexure 129-1. The parking mechanism also includes stationary pegs 130-1a and 130-1b, which are mounted on the stationary housing (not illustrated) of the memory storage module.

Figure 17C:
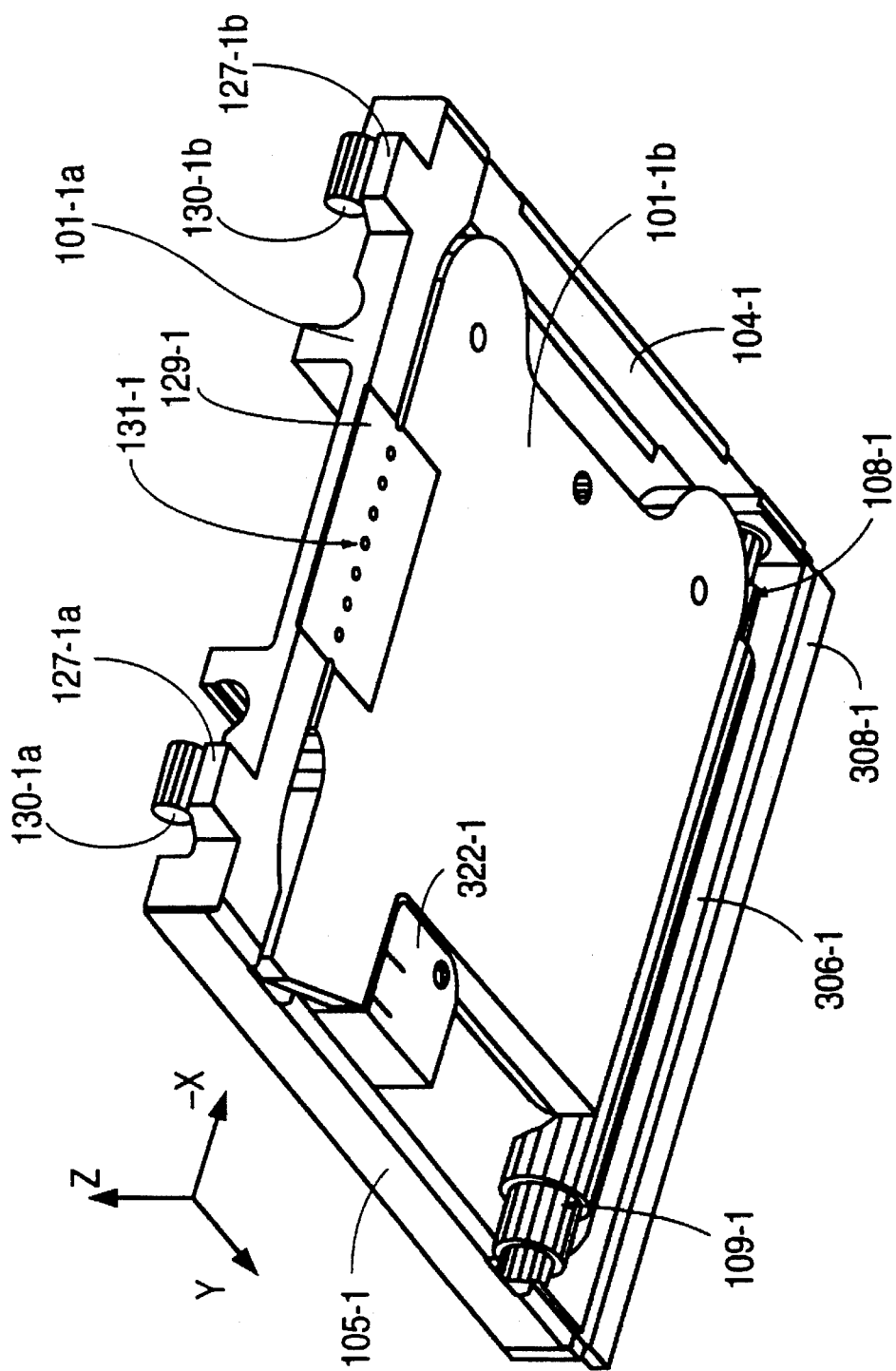

FIG. 17c is an isometric view of the underside of carriage assembly 101-1. In one embodiment, pivot flexure 129-1 provides the only connection between carriage piece 101-1a and carriage piece 101-1b. Pivot flexure 129-1 is made of a material having a suitable spring rate, such as stainless steel. Pivot flexure 129-1 is connected to carriage pieces 101-1a and 101-1b using screws or a suitable adhesive. While pivot flexure 129-1 is very rigid along the X and Y axes, pivot flexure 129-1 is flexible along the Z-axis. In one embodiment, pivot flexure 129-1 includes a series of holes 131-1 in the gap between carriage pieces 101-1a and 101-1b to create this flexibility along the Z-axis.

Figure 17D:
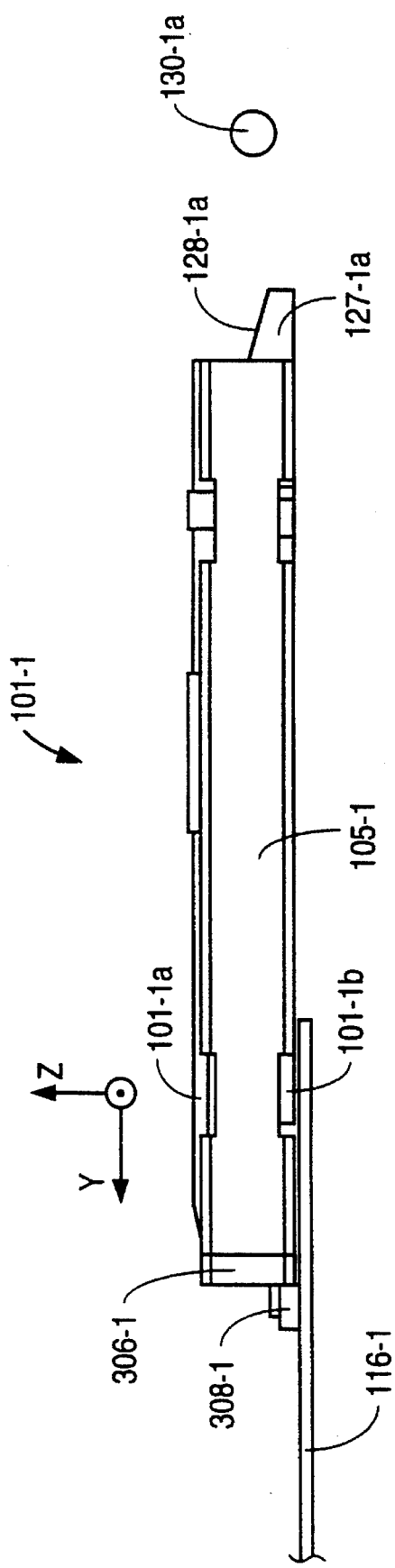
FIGS. 17d–17e are side views of the carriage assembly of FIGS. 17b–17c, FIGS. 18a–18b are cross-sectional views of X-axis motors.
Figure 17E:
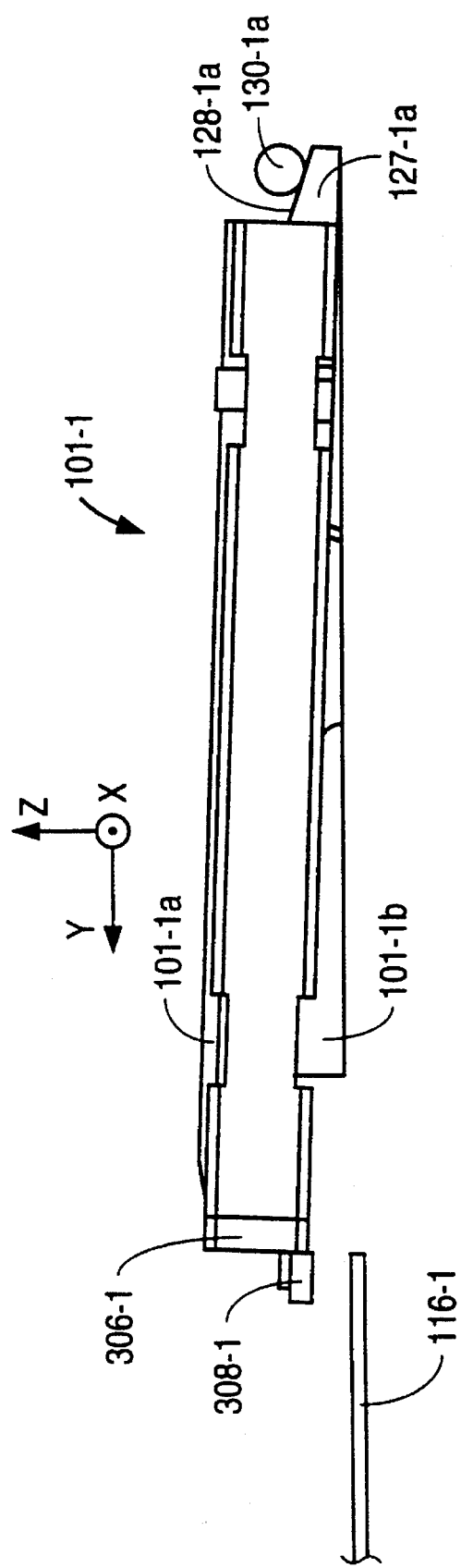

FIG. 17d is a side view of carriage assembly 101-1 during normal operation. During normal operation, head array 308-1 is in contact with medium 116-1 and stationary pegs 130-1a and 130-1b are not in contact with cam surfaces 128-1a and 128-1b of cam stops 127-1a and 127-1b. Also during normal operation, carriage piece 101-1a is preloaded against carriage piece 101-1b by pivot flexure 129-1. FIG. 17e is a side view of carriage assembly 101-1 when the memory storage module is not operating. During this time, carriage assembly 101-1 is moved in the negative Y direction until cam surfaces 128-1a and 128-1b are forced into contact with stationary pegs 130-1a and 130-1b, respectively, thereby causing pivot flexure 129-1 to bend and lift head array 308-1 off the surface of medium 116-1. The separation between head array 308-1 and medium 116-1 is greatly exaggerated for purposes of illustration. When carriage assembly 101-1 is moved into a parked position, head array 308-1, support bar 306-1, head motors 108-1 and 109-1, flexures 104-1 and 105-1, carriage piece 101-1a, and cam stops 127-1a and 127-1b are moved with respect to the Z-axis. However, pivot flexure 129-1 allows carriage piece 101-1b, Y-axis coil 212-1, guide rollers 113-1 (not illustrated), 114-1 and 115-1, roller housing 322-1, and preload springs 320-1 and 321-1 to remain unmoved with respect to the Z-axis.

To start the memory storage module from a parked position, X-axis motors 108 and 109-1 are started and the carriage assembly 101-1 is moved in the positive Y direction, thereby lowering the oscillating head array 308-1 onto medium 116-1. In this manner, the parking mechanism eliminates stiction problems which can arise when the head array 308-1 rests on medium 116-1. The parking mechanism also improves the non-operating shock resistance of the memory storage module.

Although one embodiment of a parking mechanism is illustrated in FIGS. 17b–17e, it is understood that variations on this embodiment are possible. For example, head array 308-1 can be lifted using levers, solenoids or other similar methods.

X-axis Motor

Figure 18A:
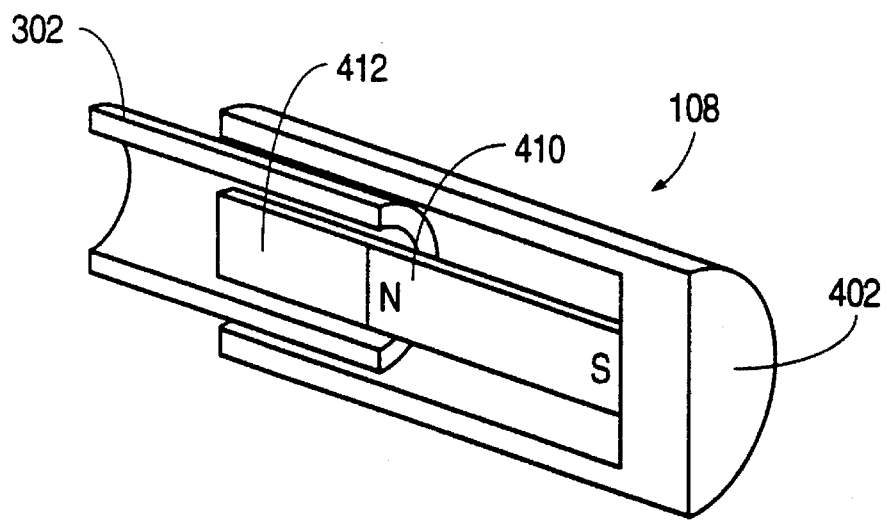
FIGS. 18c–18d are cross sectional views of an alternate embodiment of an X-axis motor, including an X-axis motor coil and a slug.
Figure 18B:
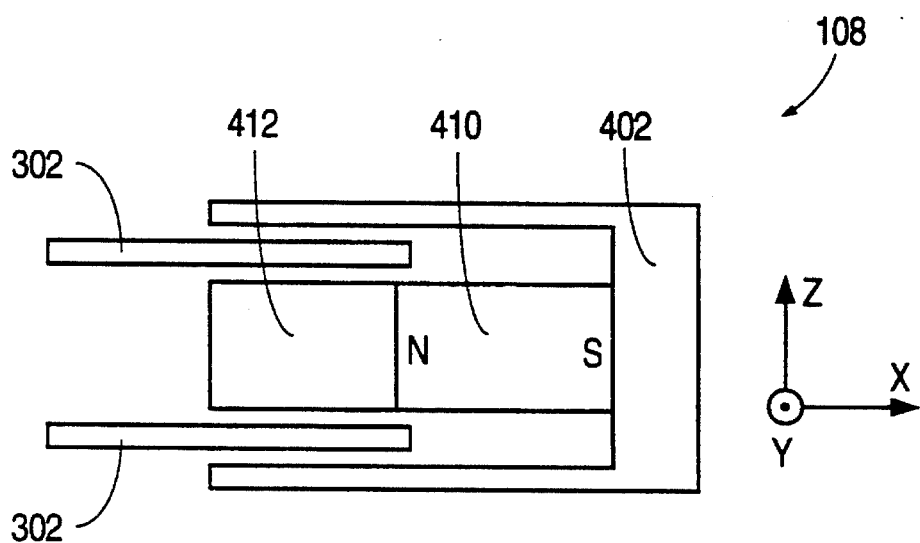

FIG. 18a is an isometric cross-section of X-axis motor 108 including X-axis motor coil 302, magnet 410, pole 412 and return cup 402. FIG. 18b is a cross-section of X-axis motor 108. It is understood that FIGS. 18a–18b are also illustrative of X-axis motor 109 (See, e.g. FIG. 19). X-axis motor coil 302 of X-axis motor 108 is connected to support bar 306 (FIG. 14a). X-axis motor coil 302 is made in the manner previously described in connection with Y-axis coil 212.

When X-axis motor 108 is assembled, X-axis motor coil 302 is positioned between return cup 402 and the combination of magnet 410 and pole 412. (FIGS. 2, 18a, 18b). Pole 412 and return cup 402 are made of a material having a high magnetic permeability, such as sintered iron. Permanent magnet 410 is used to connect return cup 402 and pole 412. Return cup 402 is mounted within motor mount structure 404 formed in carriage 110 (FIG. 2). In general, a current applied to coil 302 generates a force in accordance with the right hand rule which moves coil 302 (and thereby heads 120a–i) along the X-axis. A detailed description of the operation of X-axis motors 108–109 is presented later in the specification.

The X-axis motor coil 302 is located on support bar 306 because coil 302 is lighter than return cup 402, magnet 410 and pole 412. This results in a higher frequency of oscillation and energy savings when X-axis motor 108 is causing support bar 306 to oscillate. The leads of X-axis motor coil 302 run along flexure 104. These leads are connected to bonding pad 240 at the rear of carriage 110. In an alternate embodiment, the leads of coil 302 are connected to bonding pad 240 by forming wire traces along flexure 104.

Figure 18C:
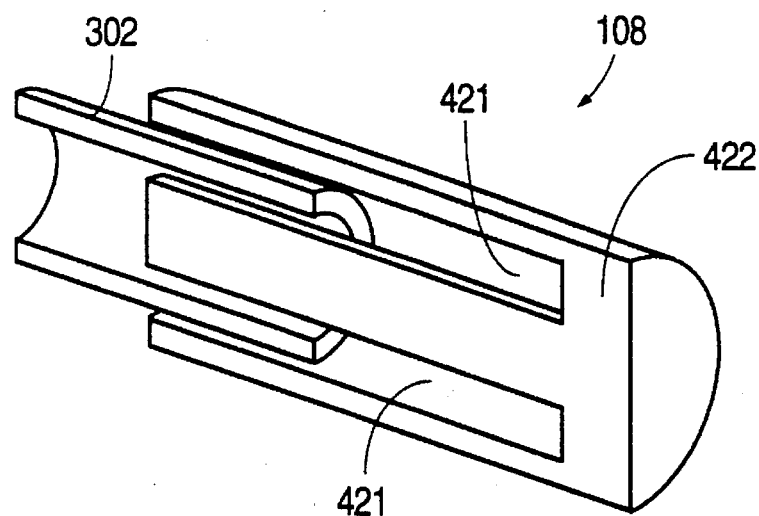
Figure 18D:
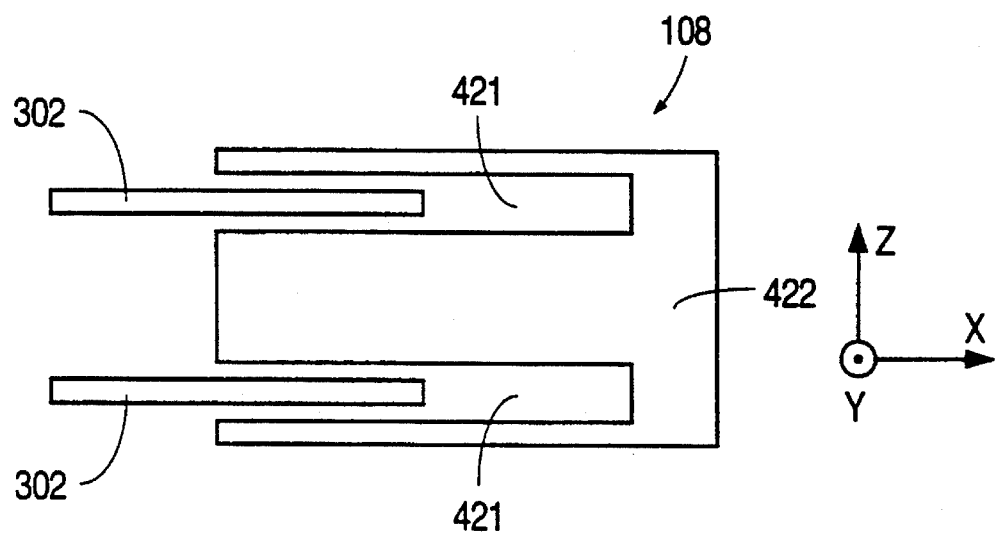

FIGS. 18c and 18d illustrate cross sectional views of an embodiment of X-axis motor 108 which does not utilize a permanent magnet. Slug 422 of X-axis motor 108 is made of a material having a high magnetic permeability. A current flowing in X-axis motor coil 302 creates a magnetic field in gap 421 of slug 422. This magnetic field interacts with the current in coil 302, resulting in an attractive force which moves coil 302 toward slug 422 along the X-axis. The absence of a permanent magnet eliminates stray magnetic fields which could possibly exist in the presence of such a magnet.

Printed Circuit Cable

FIG. 19 is an isometric view of memory storage module 100 showing the connection of a flexible printed circuit cable (PCC) 332 to carriage 110 and PCB 202. The leads from Y-axis coil 212, X-axis motor coils 302–303 and magnetic heads 120a–i (not shown) are connected to bonding pad 240 at the back of carriage 110. One end of PCC 332 is connected to bonding pad 240. The other end of PCC 332 is anchored to stationary housing 238 and the leads from this end of PCC 332 are connected to control circuitry in PCB 202. Because PCC 332 flexes in an accordion-like manner, this configuration allows the carriage assembly 101 to move freely along the Y-axis while keeping PCC 332 away from the moving carriage assembly 101.

Carriage Shield

Figure 20:
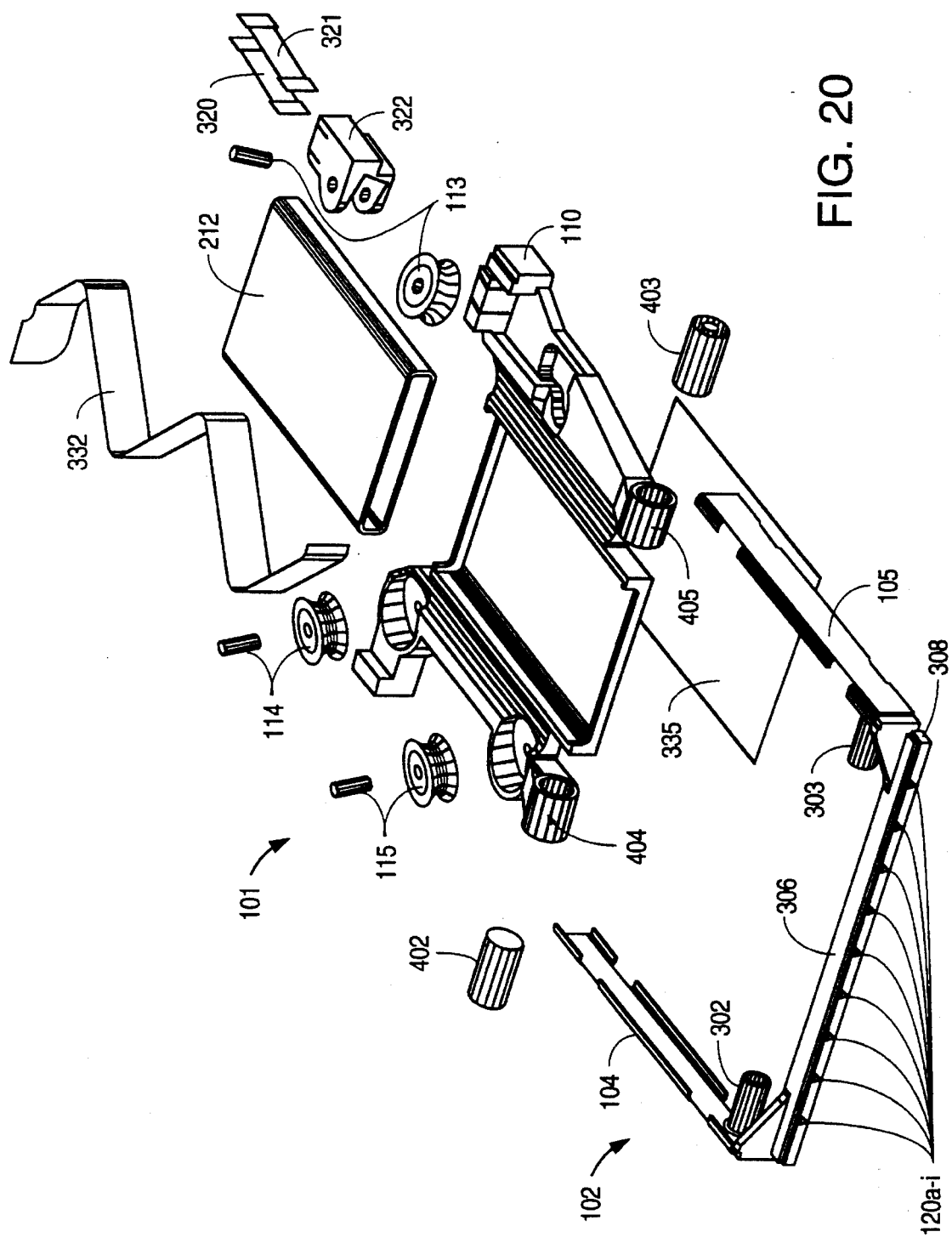
FIG. 20 is an exploded isometric view of a carriage assembly, including a magnetic shield.

FIG. 20 is an exploded isometric view of carriage assembly 101 including magnetic shield 335. Magnetic shield 335 is placed on the underside of the carriage 110 to prevent the magnetic fields created by Y-axis motor 112 (not shown in assembled state), Y-axis coil 212 and X-axis motors 108–109 (not shown in assembled state) from disturbing the information stored on magnetic medium 116 (not shown). Shield 335 is made of a thin layer of a material capable of shielding magnetic fields, such as an alloy of nickel and iron. Shield 335 is affixed to the underside of carriage 110 with a suitable adhesive. Shield 335 insures that the magnetic field strength at the magnetic medium is less than 5 gauss, such that the information stored on the medium will not be disturbed. Shield 335 also maintains the magnetic field strength at the magnetic heads 120a–i at an appropriate level to allow the magnetic heads 120a–i to operate properly.

Magnetic Medium

Magnetic medium 116 is positioned below heads 120a–i (FIGS. 1, 2 and 4b). Medium 116 is fixed to stationary housing 238 of the memory storage module 100 with an adhesive (FIG. 4b). Adhesives which may be used include an RTV adhesive, such as NUVA-SIL 5076, an epoxy or an ultra-violet curable adhesive. The adhesive must be flexible enough to allow the housing 238 and medium 116 to expand or contract, taking into account any differences between the thermal coefficients of expansion of the housing material and the medium material. Magnetic medium similar to that used in prior art hard disk drives may be used as magnetic medium 116. However, the circular shape of the prior art hard disks must be modified so that the medium 116 has a square or rectangular shape. Medium 116 is preferably a high density medium with a coercivity of 1500 oersted or above.

Figure 21:
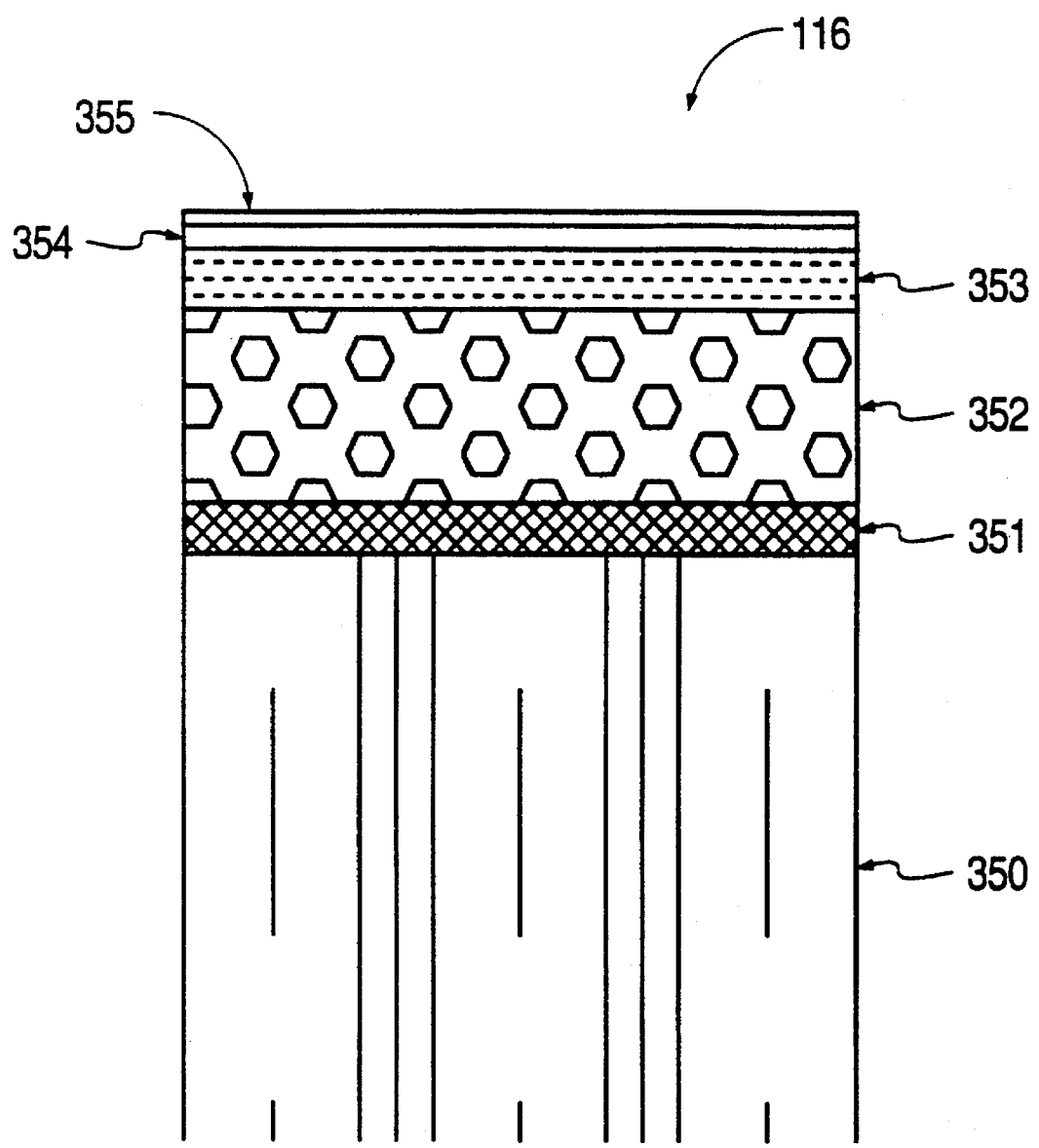
FIG. 21 is a cross sectional view of one embodiment of a magnetic medium.
Figure 22:
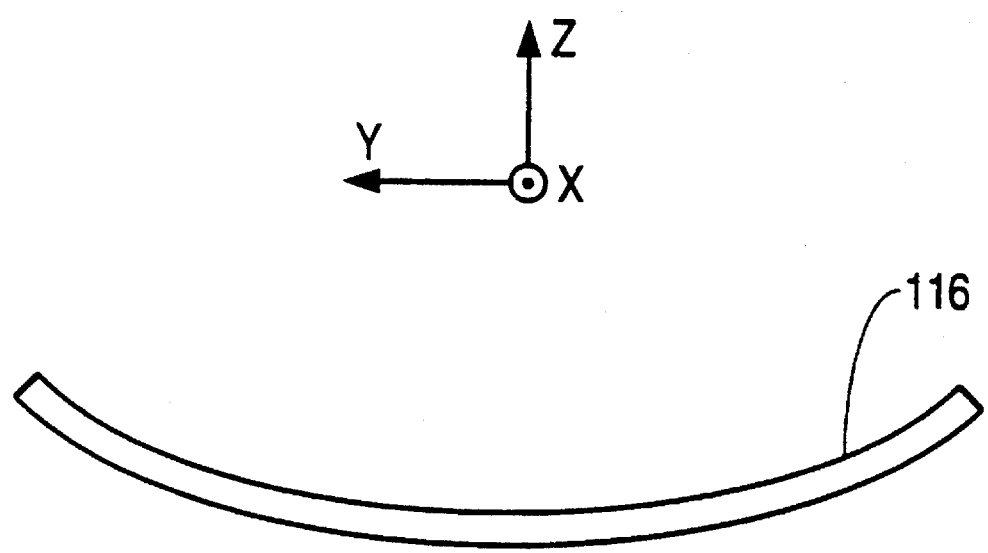
FIG. 22 is an exaggerated side view illustrating the expected distortion for one embodiment of a magnetic medium in accordance with the present invention.

FIG. 21 is a cross sectional view of one embodiment of magnetic medium 116. Medium 116 is comprised of a substrate 350, interface layer 351, chromium layer 352, magnetic layer 353, carbon layer 354 and lubricant 355. Substrate 350 may consist of materials such as glass, ceramic (such Mem-cor, produced by Corning), chemical vapor deposited silicon carbide (made by Morton International), alumina, densified amorphous carbon, beryllium or aluminum. An aluminum substrate may be unsuitable in certain embodiments because it may deform too easily. Substrate 350 has a thickness of approximately 0.5 mm, a width of approximately 1.4 inches (along the X-axis) and a length of approximately 1.3 inches (along the Y-axis). Substrate 350 is made of a material having a crystalline, granular or polymeric structure having a major axis which is orthogonal to a minor axis (such as aluminum, which is a face centered cubic crystal, or a filled ceramic). The major axis is aligned with the Y-axis and the minor axis is aligned with the X-axis, thereby minimizing distortion due to thermal expansion and contraction and residual internal stresses created during fabrication of the medium. This configuration minimizes distortion of the medium along the X-axis. FIG. 22 is an exaggerated side view illustrating the expected distortion for a medium 116 having such a configuration. The distortion along the X-axis can be limited to less than one microinch of distortion per inch of media. Because minimal distortion occurs along the X-axis, head array 308 containing heads 120a–i moves uniformly along the X-axis.

Interface layer 351 is typically sputtered onto substrate 350. The purpose of the interface layer 351 is to provide an acceptable transition from the substrate 350 to the chromium layer 352. The interface layer 351 assures that the bonds within the substrate 350 and chromium layer 352 do not break because of differences between their crystalline structures or differences between their coefficients of expansion. Interface layer 351 has a thickness in the range of 1 to 1000 Å. The material of the interface layer 351 is determined by the material of substrate 350.

Chromium layer 352 is typically sputtered onto interface layer 351. Chromium layer 352 is approximately 3000 Å thick and enhances the properties of the magnetic layer by improving the crystalline structure of the subsequently deposited magnetic layer 353.

Magnetic layer 353 is typically sputtered onto chromium layer 352. In one embodiment, magnetic layer 353 is approximately 300 Å thick and consists of a magnetic alloy such as a nickel-cobalt-platinum alloy or a nickel-cobalt-tantalum alloy.

Carbon layer 354 is typically sputtered onto magnetic layer 353. Carbon layer 354 is approximately 1 to 300 Å thick and is sputtered such that the structure of the carbon approximates a diamond-like structure.

The surface of medium 116 can be textured to reduce stiction between heads 120a–i and medium 116. Because heads 120a–i are in contact with medium 116, the entire surface of medium 116 may be textured. This texturing is particularly useful when heads 120a–i are fabricated in a monolithic or composite head array 308 which rides on the surface of medium 116. In an alternate embodiment, only the zones of the medium in which heads 120a–i come to rest are textured. In yet another embodiment, the monolithic or composite head array is textured on the surface adjacent to the medium. Additionally, when using magnetic heads having a small contact area and low mass/gram loading, the entire surface of medium 116 may be untextured because the instantaneous energy in the X-axis motors 108–109 and Y-axis motor 112 is high enough to overcome possible stiction problems.

Lubrication layer 355, having a thickness of approximately 1–100 Å, is typically placed on carbon layer 354. One advantage of memory storage module 100 is that it does not create centrifugal forces which will spin off lubricant like prior art rotating disk drives.

Figure 23A:
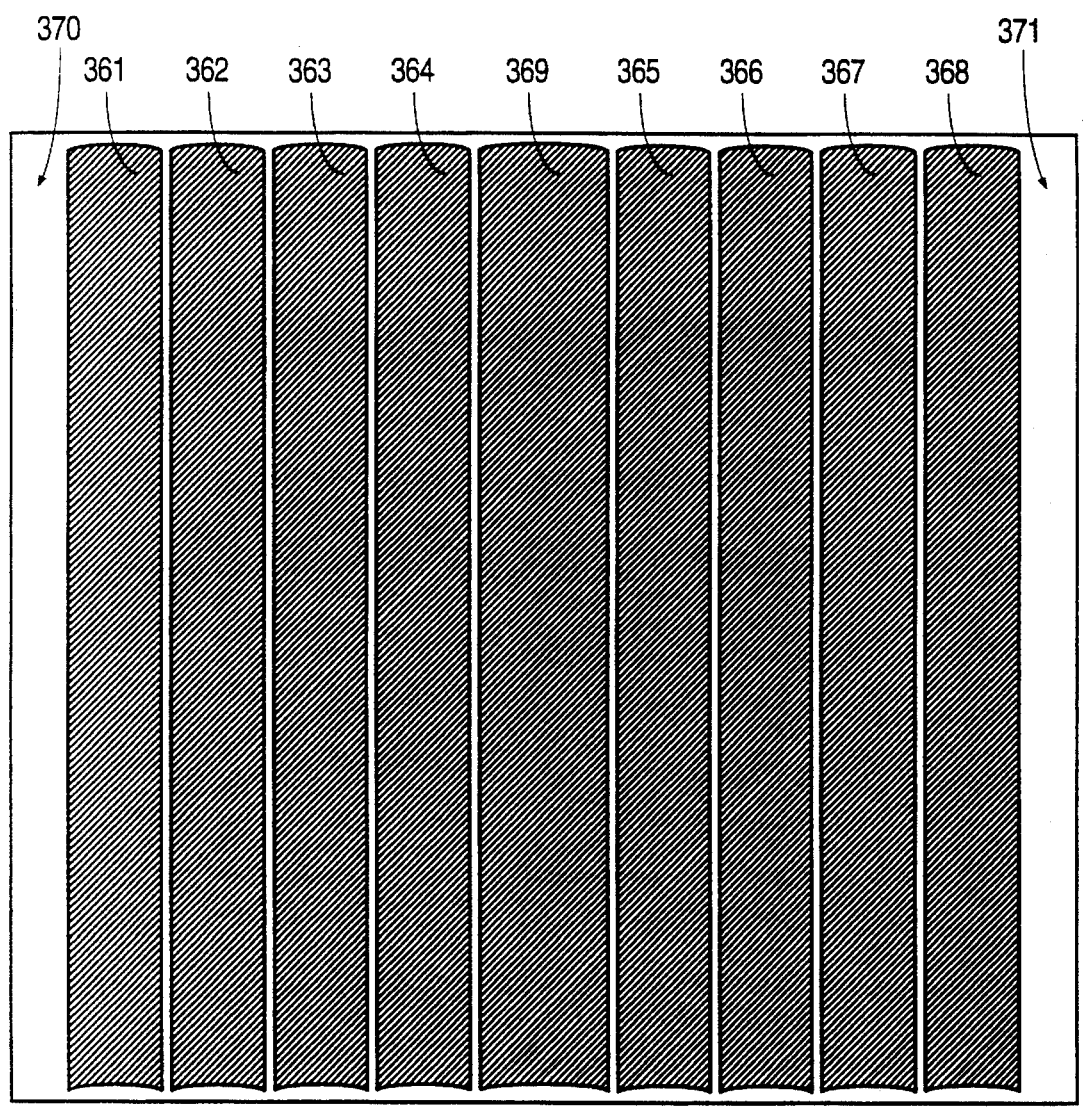
FIG. 23a is a top view of a medium in accordance with the present invention illustrating the tracks and stripes of the medium.

FIG. 23a is a top view of medium 116 illustrating the tracks and stripes of medium 116. There are nine "stripes" of tracks present on this medium, eight data stripes 361–368, (one data stripe located beneath each read/write head 120a–h), and one servo stripe 369 (located beneath servo head 120i). The number of stripes on the medium corresponds to the number of heads used in the particular embodiment. In alternate embodiments, more than one servo head/servo stripe is used. In other embodiments, the servo information is embedded in one or more of the data stripes, and the servo head and servo stripe are eliminated. In yet another embodiment, an optical servo is used to provide servo information, thereby eliminating the need for the servo head/servo stripe.

Figure 23B:
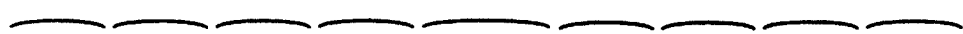
FIG. 23b is a top view of one set of tracks of the medium of FIG. 23a, FIGS. 24a and 24b illustrate an exaggerated data track and an exaggerated servo track, respectively.

Each stripe contains numerous substantially linear tracks, each track extending the width of the stripe along the X-axis. Each track in the eight data stripes is 0.124 inches wide along the X-axis. Each track in the servo stripe is 0.174 inches wide along the X-axis. The stripes 361–369 are separated by gaps having a width along the X-axis of approximately 0.006 inches. Heads 120a–i are switched on and/or off while travelling over these gaps. After passing over a track, heads 120a–i are turned off while over the gaps to prevent the heads 120a–i from erroneously writing data from an adjacent stripe. The width of these gaps is dependent on the speed of the heads 120a–i and the time required to switch heads 120a–i on or off. There are two inactive portions 370–371 on either side of the medium 116. Each inactive portion is approximately 0.1125 inches wide along the X-axis. FIG. 23b is a top view of medium 116 illustrating one set of tracks, eight data tracks and one servo track, which magnetic heads 120a–i will pass over during a sweep.

Figure 24A:
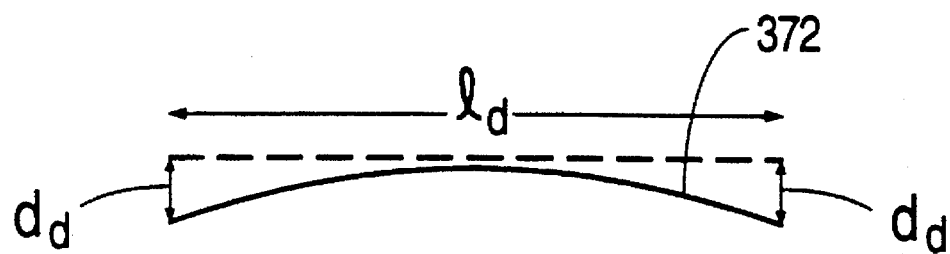
Figure 24B:
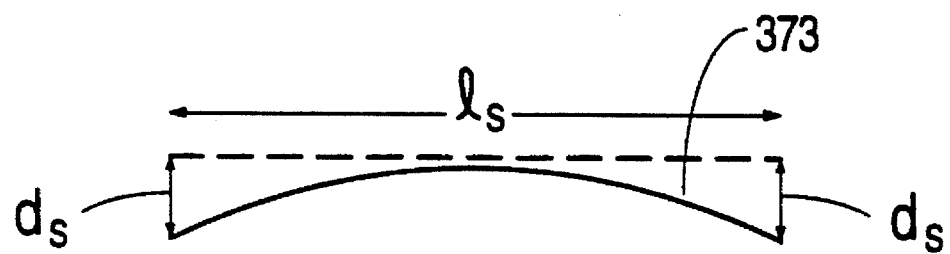

Because heads 120a–i oscillate at the end of flexures 104–105, the tracks are not perfectly straight, but rather have a slight, varying curvature representative of the travel of heads 120a–i. FIG. 24a illustrates an exaggerated data track 372, where $l_d$ is approximately 0.124 inches and $d_d$ is approximately 0.0028 inches. FIG. 24b illustrates an exaggerated servo track 373, where $l_s$ is approximately 0.174 inches and $d_s$ is approximately 0.0054 inches.

In alternate embodiments, the mechanism used to oscillate the heads in the X-direction is modified such that each track has a rectilinear shape or an arc shape with respect to the X-axis.

Assuming that 100 kilobits of data may be stored on each inch of medium 116, each data track can store approximately 12.4 kbits of data. (100 kbit/inch×0.124 inch). In one embodiment, each stripe 361–369 contains approximately 4000 tracks/inch along the Y-axis. Because medium 116 is approximately 1.3 inches long (along the Y-axis) each stripe 361–369 contains approximately 5200 tracks. (1.3 inches× 4000 tracks/inch) Consequently, each data stripe 361–368 has a storage capacity of approximately 8.06 Mbytes (5200 tracks/stripe×12.4 kbits/track×1 byte/8 bits) and the entire medium 116 has a data storage capacity (excluding the servo stripe) of approximately 64.5 Mbytes.

In one embodiment, heads 120a–i are oscillated along the X-axis at a frequency of approximately 341 hZ and an average velocity of approximately 220 in/sec during the time that each head passes over a data track. At this average velocity, each magnetic read/write head 120a–h can read (or write) at an internal data rate of 2.75 Mbytes/second (220 inches/sec×100 Kbits/inch×1 byte/8 bits). All eight read/write heads 120a–h can therefore read (or write) at an internal data rate of 22 Mbytes/second.

By employing smaller head geometries, control circuitry and data formatting, higher storage capacities can be obtained. For example, a smaller head geometry which allows for a linear storage density of 175 Kbits per inch and a track density of 7500 tracks per inch results in a storage capacity of approximately 212 MBytes on a 1.3×1.4 inch medium. The internal data rate of such a memory storage module is approximately 35 Mbytes/second.

Unlike traditional disk drive systems, whose physical sector lengths vary as a function of disk radius, memory storage module 100 has constant length data stripes. This provides greater flexibility in utilizing the data storage capabilities of the medium. For example, in prior art rotating disk drives, the ability to compress data is limited by the amount of data which can be stored in a fixed length sector of the disk, typically 512 bytes. Because each data stripe on medium 116 of memory storage module 100 has a storage capacity of 65 Mbits, compression of larger data blocks is facilitated. A variable amount of the storage capacity of the data stripe can be used to compress a larger amount of data.

Memory storage module can emulate either a disk drive or a tape drive. To perform this emulation, the I/O driver and operating system coupled to memory storage module 100 are used to properly format data received from and transmitted to memory storage module 100. Microcode within memory storage module 100 enables memory storage module 100 to emulate either a disk drive or a tape drive.

In addition, memory storage module 100 uses medium 116 more efficiently than prior art rotating disk drives. Because there is no need to mount the center of medium 116 on a spindle, more of the medium surface may be used for recording. Furthermore, a square medium having a side length of "d" units has approximately 27 percent more surface area than a circular medium having a diameter of "d" units.

In addition, prior art disks are repeatedly clamped at their center during media certification, servo writing and final installation. This repeated clamping causes warpage of the disk. In contrast, medium 116 of memory storage module 100, is soft clamped during testing (because there is no need to rotate medium 116), thereby minimizing warpage during media testing. Also, as described later in the specification, the servo stripe is written after medium 116 has been affixed to stationary housing 238. This eliminates the additional "clamping" step which was previously required for servo writing in prior art disks, and further reduces warpage. Because medium 116 experiences less warpage than prior art disks, a yield gain is experienced. The reduced medium warpage also allows for a higher track density.

Operation of the X-axis Motors

Figure 25A:
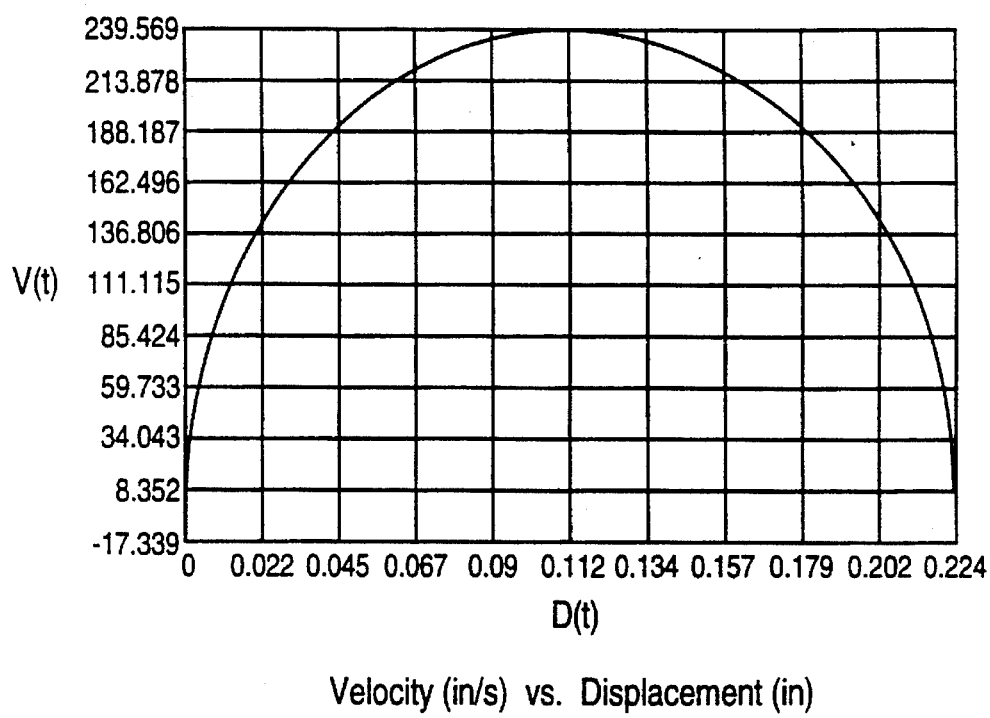
FIG. 25a is a graph of the velocity of read/write heads vs. displacement along the X-axis.
Figure 25B:
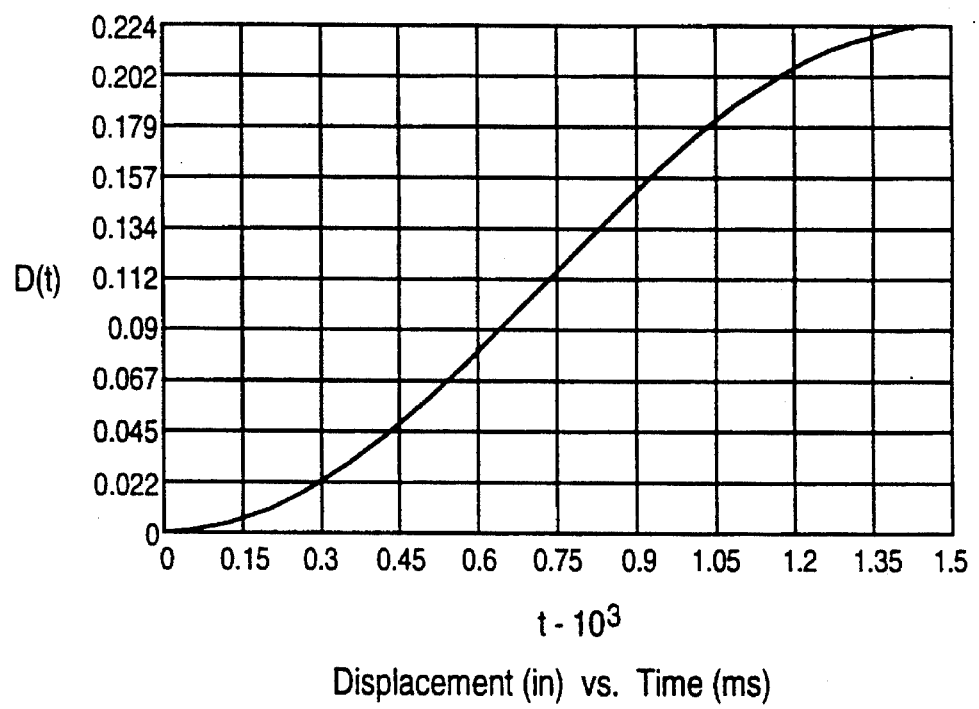
FIG. 25b is a graph of displacement of read/write heads along the X-axis vs. time.
Figure 25C:
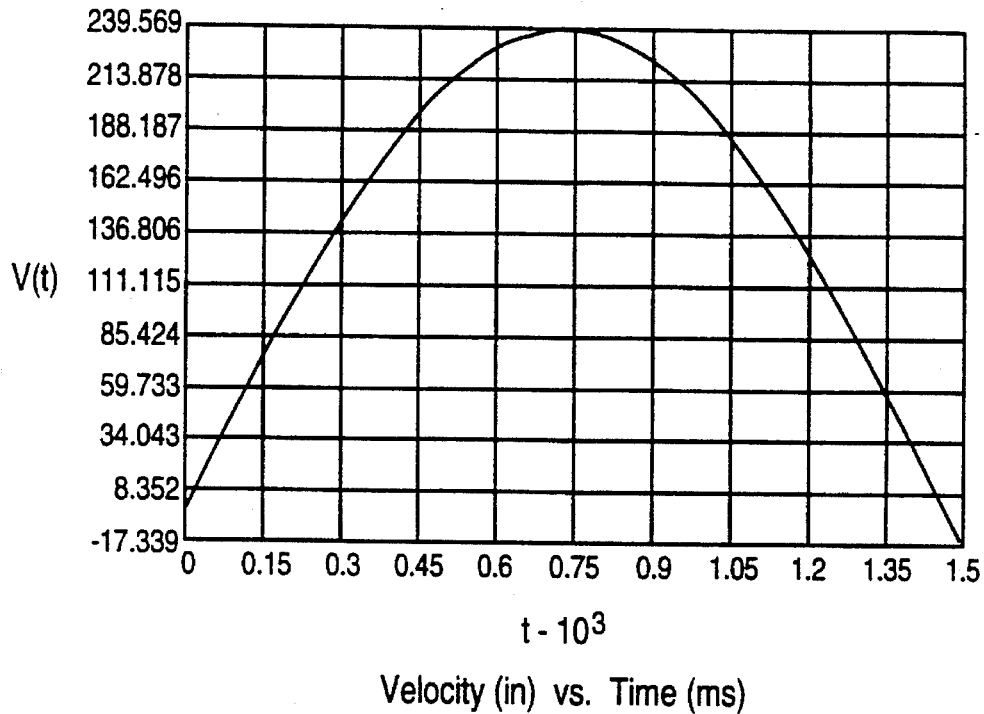
FIG. 25c is a graph of velocity of read/write heads vs. time.
Figure 25D:
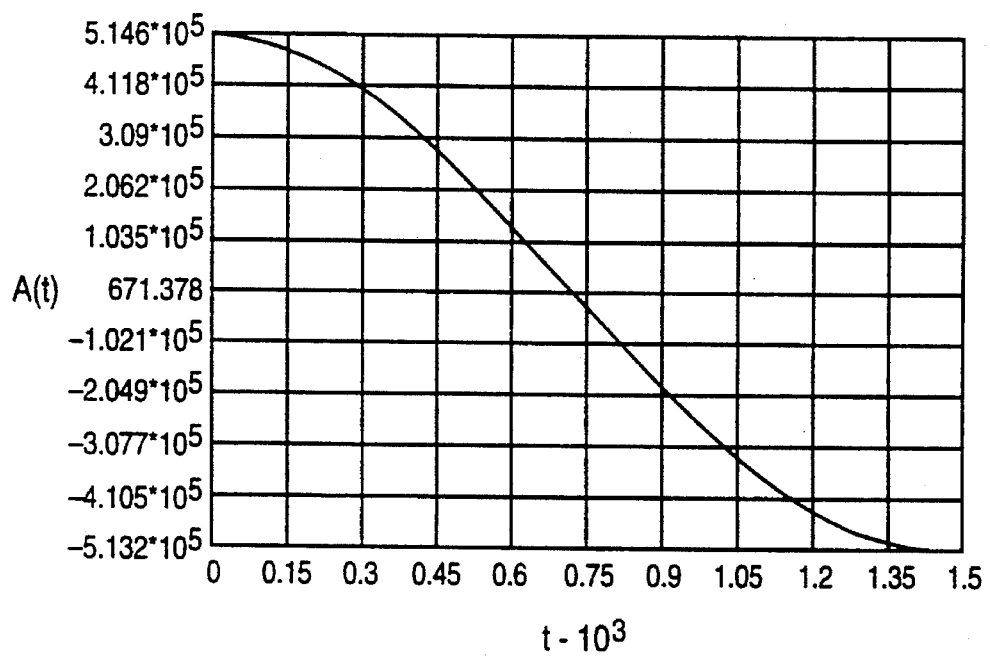
FIG. 25d is a graph of the acceleration of read/write heads vs. time.

In one embodiment, X-axis motors 108 and 109 operate as follows. A direct current of approximately 0.10 amperes is provided to one of the X-axis motor coils, for example, coil 302 (see, e.g. FIG. 2). This creates a force in accordance with the right hand rule which pulls X-axis motor coil 302 in toward return cup 402, thereby moving the magnetic heads 120a–i along the X-axis in the positive X-direction. To move magnetic heads 120a–i along the X-axis in the negative X-direction, a current of approximately 0.10 amperes is provided to X-axis motor coil 303 (no current is provided to X-axis motor coil 302 during this time) to create a force which pulls coil 303 toward return cup 403 in the negative X-direction. In one embodiment, the current supply to the X-axis motor coils is switched from coil 302 to coil 303 (and from coil 303 to coil 302) half way through the oscillation of heads 120a–i. The X-axis motors 108–109 operate at a frequency of approximately 341 hz. Heads 120a–i move a fixed distance of approximately 0.224 inches along the X-axis per half cycle upon achieving a full range of motion. The motion of heads 120a–i is controlled to resemble a sinusoidal function. The present invention contemplates other types of motion. For example, in an alternate embodiment, the motion of heads 120a–i is controlled to resemble a cycloidal function to minimize sudden acceleration and deceleration. FIGS. 25a–d are graphs illustrating the motion of heads 120a–i along the X-axis. FIG. 25a is a graph of the velocity of heads 120a–i (inches/sec) vs. displacement (inches) along the X-axis. FIG. 25b is a graph of displacement of heads 120a–i along the X-axis (inches) vs. time (sec). FIG. 25c is a graph of velocity of heads 120a–i (inches/sec) vs. time (sec). FIG. 25d is a graph of the acceleration of heads 120a–i (inches/sec$^2$) vs. time (sec). The maximum loading caused by acceleration along the X-axis is approximately 1300 G's.

As shown in FIGS. 25a and 25b, the full range of displacement for each sweep of heads 120a–i varies from 0 to 0.224 inches. At both ends of the sweep, the heads change direction, resulting in an instantaneous velocity of zero. As shown in FIG. 25c, the velocity of the heads versus time follows a derivative of a sinusoidal curve. Heads 120a–h are enabled only when the velocity of these heads exceeds a threshold velocity. In one embodiment, this threshold velocity is 200 inches per second. As shown in FIG. 25a, the threshold of 200 inches per second is exceeded when the displacement is between 0.050 inches and 0.174 inches. Consequently, the heads 120a–h exceed the threshold velocity for 0.124 inches over their range of motion. As shown in FIG. 25c, one sweep of heads 120a–h takes approximately 1.5 milliseconds. The threshold velocity of 200 inches per second is exceeded during the time period between 0.45 and 1.05 milliseconds. Therefore, heads 120a–h may be enabled for 0.6 milliseconds during each sweep. After heads 120a–h have passed over the 0.124 inch track (i.e. after the speed of heads 120a–h drops below the threshold velocity) these heads are disabled. This is required because of the spacing between the adjacent stripes of tracks on medium 116. The adjacent stripes on the medium are closely spaced to efficiently utilize the available recording area of medium 116 (FIGS. 23a–23b). Because of this close spacing, heads 120a–h pass over a portion of a track in an adjacent stripe when nearing the end of a sweep. If the magnetic heads 120a–h are not disabled during this time, data may be erroneously written to or read from a track in an adjacent stripe.

As shown in FIGS. 25a and 25c, the velocity of heads 120a–h varies from 200 inches per second to 240 inches per second during the time heads 120a–h are enabled. This variation in velocity is not so significant as to disrupt the operation of heads 120a–h. In other embodiments, the velocity of heads 120a–h can be controlled to "flatten" this velocity profile such that a more constant velocity is obtained during the time that heads 120a–h are enabled. This "flattening" may be performed by modifying flexures 104–105 or by modifying the control of X-axis motors 108–109.

Servo head 120i operates over a longer track than read/write heads 120a–h. Servo head 120i begins to read servo information from a servo track at some point after the velocity of head 120i exceeds 100 inches per second. As shown in FIG. 25a, by enabling servo head 120i when the velocity of servo head 120i exceeds approximately 150 inches per second, the resulting servo track has a length of 0.174 inches. The operation of servo head 120i is described in detail, later in this specification.

In one embodiment, a read or a write operation is only performed once during each oscillation of head array 308. That is, heads 120a–h are enabled only when they are moving in the positive X-direction or when the heads are moving in the negative X-direction. Assuming that heads 120a–h are to be enabled only when they are moving in the negative X-direction, the heads 120a–h are moved from track to track along the Y-axis during the time that heads 120a–i are moving in the positive X-direction. The carriage assembly 101 moves along the Y-axis at a speed that allows the heads to reach the next track within approximately 0.52 msec plus settling time. Because the next track is 0.00025 inches away (4000 tracks/inch), the Y-axis motor 112 must move the carriage assembly 101 at an average rate of 0.96 inches/second (2×0.00025 inches/0.00052 seconds). In another embodiment, heads 120a–h are enabled when they are moving in the both the positive and negative X-directions.

From a standstill, the magnetic heads 120a–i achieve an oscillation having an amplitude of 0.224 inches within 5 to 10 oscillations. Thus, assuming an operating frequency of 341 hz, the memory storage module 100 is operational within 15–30 milli-seconds. During this time, each magnetic head moves less than 2.25 inches across medium 116. The fast start-up cycle of memory storage module 100 allows memory storage module 100 to be enabled when a read or write operation is performed and to remain idle when a read or write operation is not being performed. Consequently, the duty cycle for the memory storage module 100 is low compared to prior art disk drives. This low duty cycle results in a low average noise level and reduced energy consumption in memory storage module 100.

Typical prior art disk drive systems require a 2–3 second start-up period before the head "flies" and acceptable operating conditions exist. During start-up of a 5.25 inch disk drive, the magnetic head remains in contact with the magnetic medium for approximately 500– 600 inches. During start-up of a 1.8 inch disk drive, the magnetic head remains in contact with the medium for approximately 200–300 inches. When the prior art disk drives are decelerated to a stop, the magnetic heads contact the magnetic medium for approximately twice these distances. Because the wear distance of the memory storage module 100 is 2.5 to 3 orders of magnitude less than prior art disk drives, the thin film heads previously used in prior art rotating disk drives can be used in a contact recording configuration in memory storage module 100 without excessive head wear.

For example, a head of a 1.8 inch prior art disk drive, operating at 6000 rpm and having a fast start-up period of 2.5 seconds, experiences approximately 3–6×10$^8$ inches of wear distance in 200,000 contact start/stops. Similarly, a head of a 5.25 inch prior art disk drive, operating at 6000 rpm and having a fast start-up period of 7.5 seconds, experiences approximately 2.7–5.4×10$^9$ inches of wear distance in 200,000 contact start/stops. To read a file having 16 kbytes of information, memory storage module 100 oscillates approximately ten times (including starting and stopping). During this time, the heads are in contact with the medium for approximately 2.5 inches. Therefore, this 16 kbyte file may be read at least 1.2×10$^8$ times (3×10$^8$ inches/ 2.5 inches) before the heads of memory storage module 100 experience a wear distance equivalent to 200,000 accesses of a 1.8 inch prior art disk drive. Using another measure, the 16 kbyte file may be accessed approximately 9600 times per hour, ten hours a day, 250 days per year for five years before experiencing a wear distance equivalent to 200,000 accesses of a 1.8 inch prior art disk drive. In addition, a magnetic head specifically designed for contact recording will last longer in memory storage module 100 than a standard disk drive head designed for non-contact recording.

Because memory storage module 100 is only activated when reading and writing data, and because of the relatively small start-up time/distance, there are significant power savings associated with memory storage module 100 when compared with prior art disk drive systems. For minimum power consumption, the head array assembly 102 (FIG. 14*a*) can be oscillated at its natural resonant frequency. The head array assembly 102 is designed to have a resonant frequency of approximately 341 hz. The actual resonant frequency can be determined by sending a single voltage pulse to one of the X-axis motors 108–109 and measuring the decay characteristics of the oscillating head array assembly 102. During the decay cycle, the head array assembly 102 oscillates at the natural resonant frequency of the head array assembly 102.

Assembly of Y-Axis Motor

FIG. 26 is an exploded isometric drawing illustrating the assembly of Y-axis motor/guide rod assembly 112. Permanent magnets 214–215 are properly positioned in the cavity formed by positioning extensions 234–235 of clips 230–231. Clip 231 is then placed on the ends of upper pole 210 and center pole 211, thereby inserting permanent magnet 215 between these poles 210–211. Permanent magnet 215 establishes the proper spacing between upper pole 210 and center pole 211. Center pole 211 is then inserted through opening 242 in the Y-axis coil 212 and carriage assembly 101 is coupled to upper pole 210 by guiding guide rollers 113–115 of carriage assembly 101 onto guide rods 206–207. Clip 230 is then placed on the ends of upper pole 210 and center pole 211, thereby inserting permanent magnet 214 between these poles 210–211.

Operation of the Y-Axis Motor

Heads 120*a–i* are moved along the Y-axis, from track to track along medium 116, by Y-axis motor/guide rod assembly 112. The force required to move the carriage assembly 101 (which includes heads 120*a–i*) along guide rods 206–207 is created by supplying a direct current to Y-axis coil 212. The interaction of a 0.5 ampere current in Y-axis coil 212 with the magnetic field created by permanent magnets 214–215 between the upper and center poles. 210–211 results in a force of approximately 0.24 newtons which accelerates the carriage assembly 101 along the Y-axis at 68.5 m/sec$^2$. The loading created by acceleration along the Y-axis is at least 5 G's under these conditions, and can be higher depending on the power provided to the Y-axis motor 112. The direction of the force generated by Y-axis motor 112 is determined by the right hand rule. To reverse the direction of the force on carriage assembly 101, the direction of current flow in Y-axis coil 212 is reversed.

Figure 27A:
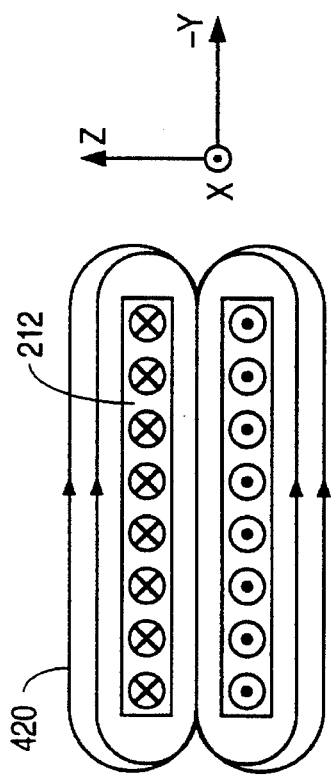
FIG. 27a is a cross-sectional representation of a Y-axis coil along the Y-Z plane.

FIG. 27*a* is a cross-sectional representation of Y-axis coil 212 along the Y-Z plane. The current carried in Y-axis coil 212 creates a magnetic field 420 as shown in FIG. 27*a*. The "X"s in Y-axis coil 212 indicate a current flowing into the plane of the cross-section while the dots indicate current flowing out of the plane of the cross-section. The arrows on magnetic field 420 indicate the direction of the lines of magnetic flux. As the distance from Y-axis coil 212 increases, the strength of magnetic field 420 decreases.

Figure 27B:
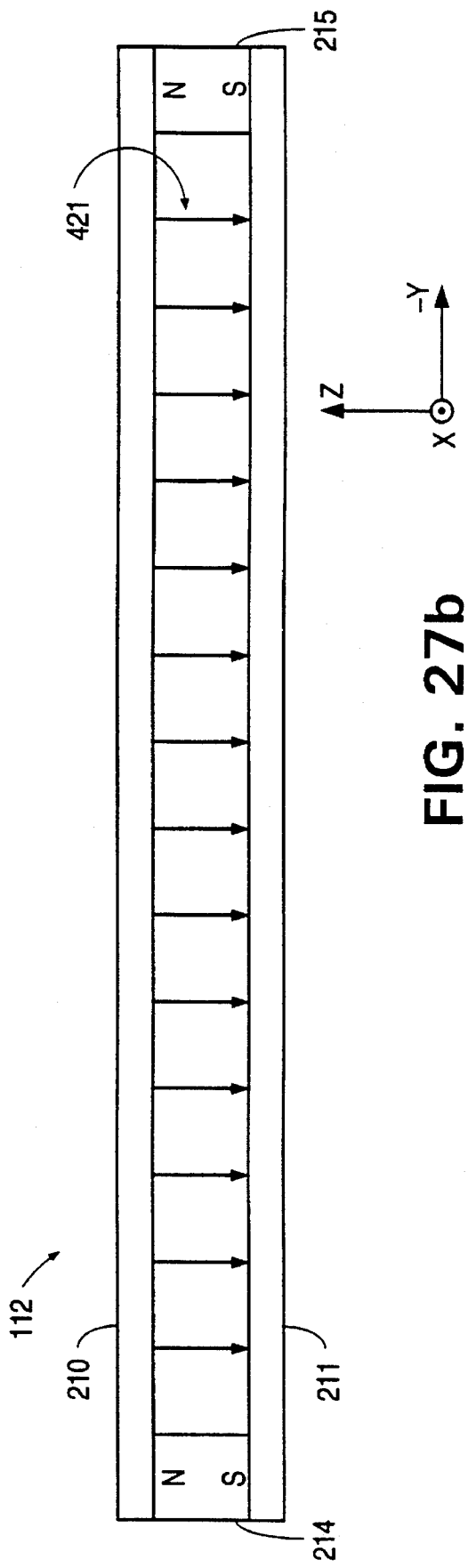
FIG. 27b is a cross sectional representation of a Y-axis motor/guide rod assembly along the Y-Z plane.

FIG. 27*b* is a cross sectional representation of Y-axis motor/guide rod assembly 112, including upper pole 210, center pole 211 and permanent magnets 214–215 along the Y-Z plane. Magnetic field 421 is illustrated as a uniform field.

Figure 27C:
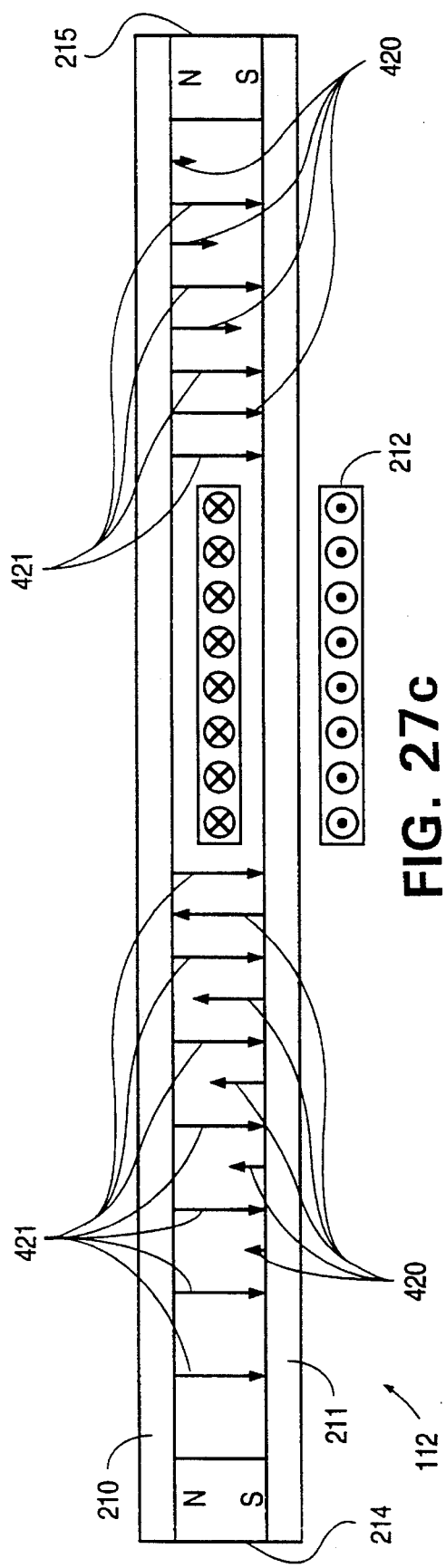
FIG. 27c is a cross sectional representation of the Y-axis coil and Y-axis motor/guide rod assembly of FIGS. 27a–27b and their resultant magnetic fields.
Figure 27D:
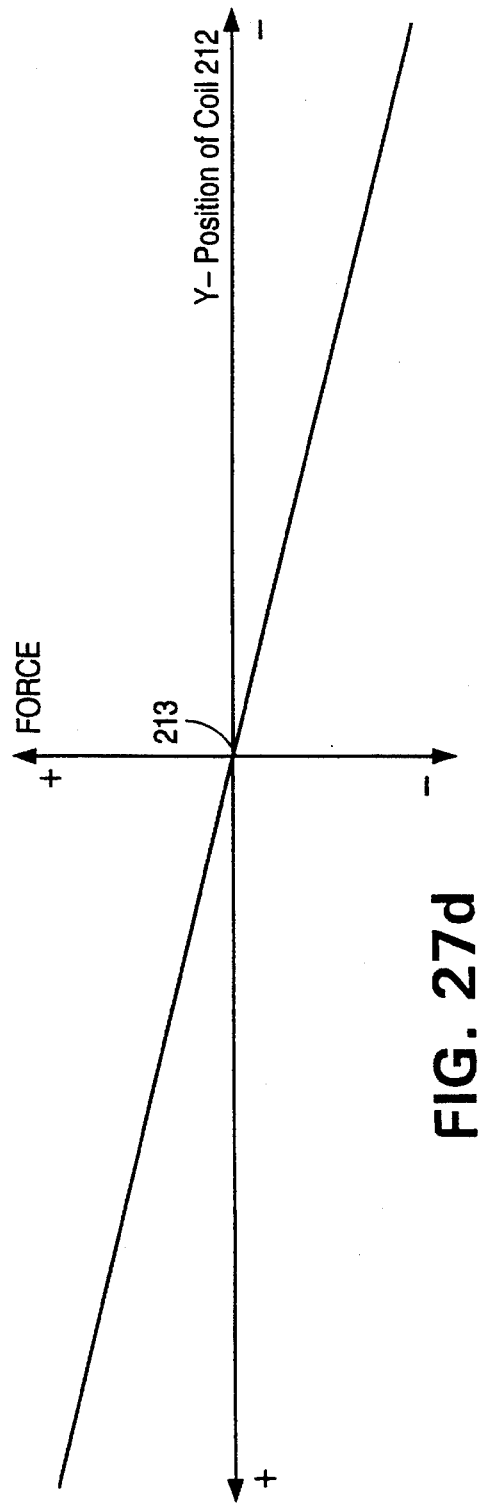
FIG. 27d is a qualitative graph illustrating the force generated as a result of the magnetic field of the Y-axis coil of FIGS. 27a and 27c.

FIG. 27*c* is a cross sectional representation of Y-axis coil 212 and Y-axis motor/guide rod assembly 112, and the resultant magnetic fields. When the Y-axis coil 212 is placed between poles 210–211, magnetic field 420 is large enough to influence magnetic field 421 created by permanent magnets 214–215. FIG. 27*c* shows the flux lines of magnetic fields 420 and 421 to illustrate how magnetic field 420 influences magnetic field 421. Magnetic field 420 of the Y-axis coil adds to magnetic field 421 to the right of X-axis coil 212 and subtracts from magnetic field 421 to the left of Y-axis coil 212. Thus, magnetic field 420 changes the flux density in the gap between poles 210–211. The magnitude of this variation is dependent upon the position of the Y-axis coil 212 along the Y-axis. Consequently, the magnitude of the force generated by Y-axis motor 112 varies as a function of the position of Y-axis coil 212 along the Y-axis. FIG. 27*d* is a qualitative graph illustrating the additional force generated as a result of magnetic field 420 of Y-axis coil 212. A positive force tends to move Y-axis coil 212 in the negative Y-direction toward center position 213. A negative force tends to move Y-axis coil 212 in the positive Y-direction toward center position 213. When Y-axis coil 212 is at center position 213 along the Y-axis, the force generated as a result of magnetic field 420 is zero. The force generated by Y-axis motor 112 becomes less dependent upon the position of Y-axis coil 212 along the Y-axis as the current and the number of turns in Y-axis coil 212 decrease. However, if the current and number of turns are reduced, the force generated by Y-axis motor 112 is reduced, and the time required for Y-axis motor 112 to access a track is increased.

The control circuitry which drives Y-axis coil 212 is therefore programmed to provide a varying current to Y-axis coil 212 to compensate for this varying force. For each motor design, the force is determined as a function of position of Y-axis coil 212 along the Y-axis. An algorithm which modifies the current Y-axis coil 212 in accordance with the position of Y-axis coil 212 along the Y-axis is included in the control circuitry.

In another embodiment, the Y-axis motor is modified to create a linear actuator which can replace rotary actuators currently used in prior art disk drives. In such an embodiment, the head of the disk drive is mounted on a carriage assembly which includes a coil similar to Y-axis coil 212. Carriage assembly is movably coupled to parallel fixed guide rods with carriage guide rollers similar to carriage guide rollers 113–115. The guide rods are positioned parallel to a radius of the disk, such that when the Y-axis coil is energized, the carriage assembly and disk drive head move in a linear manner along a radius of the disk.

Such a linear actuator has several advantages over prior art rotary actuators. Because rotary actuators attempt to approximate a linear motion by moving the disk drive head at the end of a rotary arm, the rotary arm must be long enough to approximate a linear motion. The required length of rotary actuators are significant in determining the minimum size of the entire disk drive system. Because the linear actuator previously described only needs to be long enough to move the disk drive head from the inner radius of the disk to the outer radius of the disk, the linear actuator can be smaller than the rotary actuator, thereby advantageously reducing the overall minimum size of the disk drive system. Furthermore, the three guide roller design reduces the height profile of the linear actuator.

In addition, as rotary actuators move the disk drive head radially along the disk, a relative skew angle is introduced between the structure used to "fly" the disk drive head and the direction of the "wind" created by the rotation of the disk. This skew angle can cause undesirable variations in flying height and instability in the structure used to "fly" the disk drive head. The skew angle also causes the signal to noise ratio to degrade (in both contact and non-contact embodiments). Because the linear actuator maintains a constant angle between the head and the rotating disk, the problems associated with the skew angle are eliminated.

Properly Positioning the Heads over Tracks on the Medium

Figure 28A:
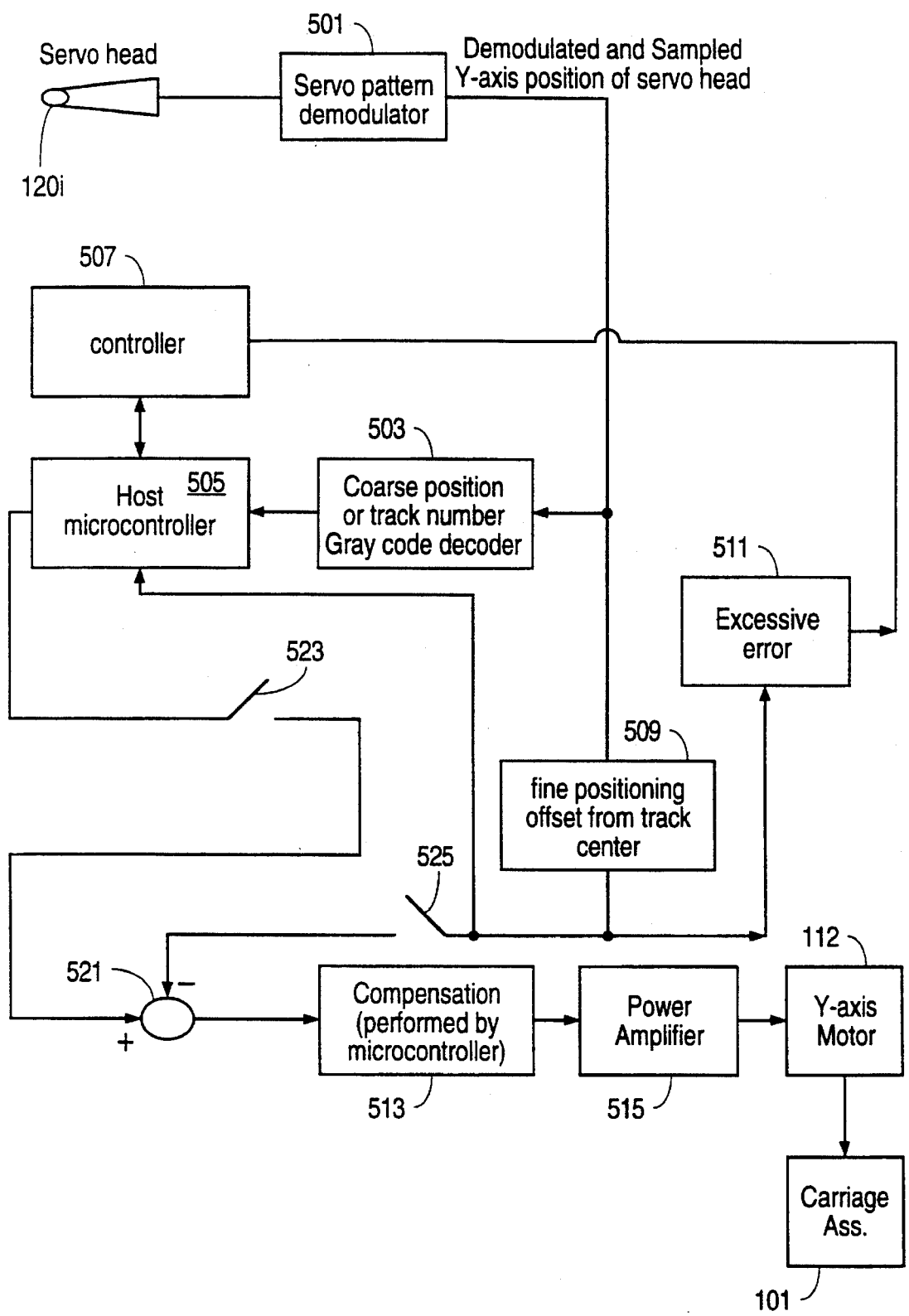
FIG. 28a is a block diagram of one embodiment of the control circuitry used to properly position the heads over the desired tracks along the Y-axis.
Figure 29A:
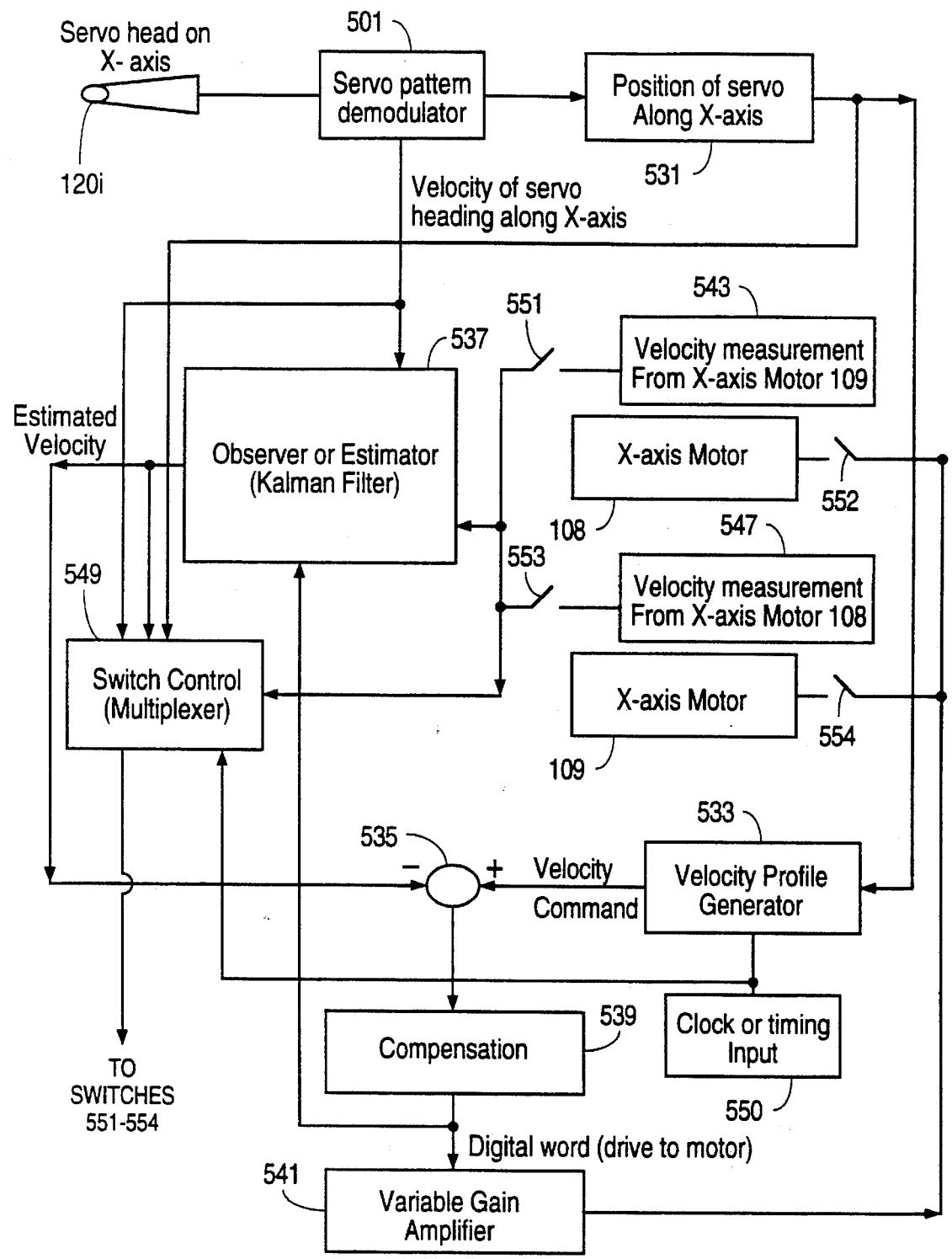
FIG. 29a is a block diagram of one embodiment of the control circuitry which controls the velocity of the heads along the X-axis.

FIG. 28a is a block diagram of one embodiment of the control circuitry used to properly position the servo head 120i (and thereby magnetic heads 120a–h) over the desired tracks on medium 116. Thus, the control circuitry of FIG. 28a controls the position of servo head 120i along the Y-axis as servo head 120i oscillates along the X-axis. FIG. 29a is a block diagram of the control circuitry used to control the velocity of the servo head 120i (and thereby magnetic heads 120a–h) over the desired tracks on medium 116. Thus, the control circuitry controls the position of servo head 120i along one axis while controlling the velocity of servo head 120i along an orthogonal axis. Servo head 120i oscillates on servo tracks in servo stripe 369 (FIG. 23a) to read the servo information stored on medium 116. Each servo track contains servo information including: Y-axis Gray code information, Y-axis track following information, X-axis Gray code information, and X-axis velocity information. The Y-axis Gray code information includes a Gray coded number which identifies each track on the medium. The Y-axis track following information includes information which is encoded on either side of the Y-axis center of each track. The X-axis Gray code information is Gray coded information which identifies the absolute position of the servo head along the X-axis. The X-axis velocity information includes a set of encoded signals spaced a predetermined distance apart along the X-axis. The X-axis Gray code information and X-axis velocity information can be derived from a single magnetic signal on medium 116.

Y-axis Track Seeking

One embodiment of the circuitry used to perform Y-axis track seeking is described in connection with FIG. 28a. During Y-axis track seeking, switch 523 is closed and switch 525 is open. When it is desired to access a certain track along the Y-axis of medium 116, the host microcontroller 505 receives a signal from the device controller 507 which indicates the desired track number. X-axis motors 108–109 drive the servo head 120i along the X-axis in an oscillatory motion such that servo head 120i reads information from the servo track. The servo information is provided to the servo pattern demodulator 501. The servo pattern demodulator 501 decodes several sets of signals from the servo information. One of these signals is a Y-axis Gray code. Encoded in each servo track is a Y-axis Gray code which indicates the position of the track along the Y-axis. For example, if there are 5200 tracks per stripe on medium 116, the Y-axis Gray code identifies each track with a number from 0–5199. The Y-axis Gray code is provided to Y-axis Gray code decoder 503. This Y-axis decoder 503 decodes the track number which the servo head 120i is currently over from the Y-axis Gray code. This track number information is also provided to host microcontroller 505. The host microcontroller 505 provides an output to node 521 to control the Y-axis motor 112. For example, if the Gray code decoder 503 indicates that servo head 120i is over track number 100 and the controller 507 indicates that the desired track is track number 110, the host microcontroller 505 generates a positioning signal designed to move carriage assembly 101 ten tracks along the Y-axis in the appropriate direction. This positioning signal is provided to compensation microcontroller 513 through node 521.

Compensation microcontroller 513 modifies the incoming signal according to a first algorithm. The compensation microcontroller 513 generates a signal in accordance with the first algorithm which ultimately controls the trajectory of the Y-axis motor 112. This trajectory allows the desired track to be approached in a manner consistent with the stability of the system. If the trajectory is too fast, it will not be possible to stop the carriage assembly 101 upon reaching the desired track. Conversely, if the trajectory is too slow, it will take too long to reach the desired track. In general, the first algorithm provides a larger signal, allowing for faster movement of the carriage assembly 101 along Y-axis motor 112, when the servo head 120i is further from the desired track, and provides a smaller signal, thereby slowing down the carriage assembly 101, when the servo head 120i is closer to the desired track. An example of a first algorithm which may be used in compensation microcontroller 513 makes the velocity of the carriage assembly 101 along the Y-axis proportional to the square root of the distance between servo head 120i and the desired track. Host microcontroller 505 is able to determine how far servo head 120i is from the desired track, because host microcontroller receives information from Gray code decoder 503 which indicates the current track over which servo head 120i is positioned. The output of compensation microcontroller 513 is provided to power amplifier 515, which amplifies this output to a current level which is capable of driving Y-axis coil 212 of Y-axis motor 112.

Y-axis Track Following

Upon reaching the desired track, switch 525 is closed and switch 523 remains closed to perform the Y-axis track following operation. The Y-axis track following positions servo head 120i along the Y-axis center of the desired track.

To perform Y-axis track following, the first algorithm used in compensation microcontroller 513 is disabled and a second algorithm in compensation microcontroller 513 is enabled. To switch between algorithms, a first digital filter is turned off and a second digital filter is turned on. This switching creates a transient condition within compensation microcontroller 513. During this transient condition, the second digital filter is not stable. Therefore, the second digital filter must undergo a brief cycling process to obtain stability. To minimize the duration of this cycling process, the state variables associated with the first and second digital filters are optimally selected by using simulation and the available position, velocity and acceleration information. Prior to switching to the track following mode, the state variables of the second digital filter are conditioned in firmware or hardware based on the position, velocity and acceleration information supplied by the first digital filter and/or the microcontroller.

After successfully turning on the second digital filter in compensation microcontroller 513, the Y-axis track following is performed as follows. Servo pattern demodulator 501 provides the Y-axis track following information to fine Y-axis positioning block 509. FIG. 28b is a schematic illustration of the Y-axis track following information of the servo track. This Y-axis track following information includes a first band 530 and a second band 532 which are encoded on either side of the center 534 of the servo track. The first and second bands 530, 532 each have a width, w, equal to one half of the track pitch on either side of the track center 534. The width of servo head 120i is approximately equal to the width of either of first band 530 or second band 532 (i.e., one half of the track pitch). As the servo head 120i moves along the X-axis, the signals which it detects from the first band 530 and second band 532 are proportional to the portion of the servo head 120*i* which is positioned over each band 530, 532. The signal detected from second band 532 is subtracted from the signal detected from first band 530. Thus, if servo head 120*i* is positioned equally over the first and second bands 530, 532, (i.e., over the track center 534), the resulting position offset error signal is zero. If a greater portion of servo head 120*i* is positioned over the first band 530 as shown in FIG. 28*c*, the signal read from the first band 530 will have a greater magnitude than the signal read from the second band 532. The fine positioning block 509 (FIG. 28*a*) subtracts the signal read from the second band 532 from the signal read from the first band 530 to obtain a position offset error signal. A positive position offset error signal indicates that the servo head 120*i* is positioned away from the track center 534 toward the first band 530. A negative position offset error signal indicates that the servo head 120*i* is positioned away from the track center 534 toward the second band 532. A zero position offset error signal indicates the servo head 120*i* is positioned at the track center 534. The position offset error signal is provided to node 521 (FIG. 28*a*).

During Y-axis track following, host microcontroller 505 provides a "zero" reference signal to node 521. The output of fine Y-axis positioning block 509 is provided to host microcontroller 505 to help determine when the output of host microcontroller 505 should be driven to zero. The difference between the "zero" reference signal from host microcontroller 505 and the position offset error signal from fine Y-axis positioning block 509 is provided to compensation microcontroller 513. The output of compensation microcontroller 513 is amplified by power amplifier 515 to create a current which is provided to Y-axis motor 112 to move carriage assembly 101 a small distance along the Y-axis to center servo head 120*i* on the desired track.

The position offset error signal of fine positioning block 509 is also provided to excessive error block 511. If the position offset error signal indicates that the servo head 120*i* is offset from the track center 534 by more than 10 percent, the excessive error block 511 generates an error signal which is sent to the controller 507 to prevent data from being written or read.

The read/write heads 120*a–h* are enabled (or disabled) by controller 507. Two conditions must be met before the heads 120*a–h* are enabled. First, the controller 507 must receive a read/write enable signal from the host microcontroller 505. This read/write enable signal is generated when the host microcontroller 505 is receiving a valid input from the Y-axis Gray code decoder 503. That is, when the servo head 120*i* is positioned over the correct track (as determined by reading the Y-axis Gray code information) and moving over a track at a velocity exceeding the threshold velocity which allows the servo head 120*i* to read the servo information. Second, the controller 507 must not be receiving an excessive error signal from excessive error block 511.

Alternate Y-axis Track Seeking/Track Following

Figure 28D:
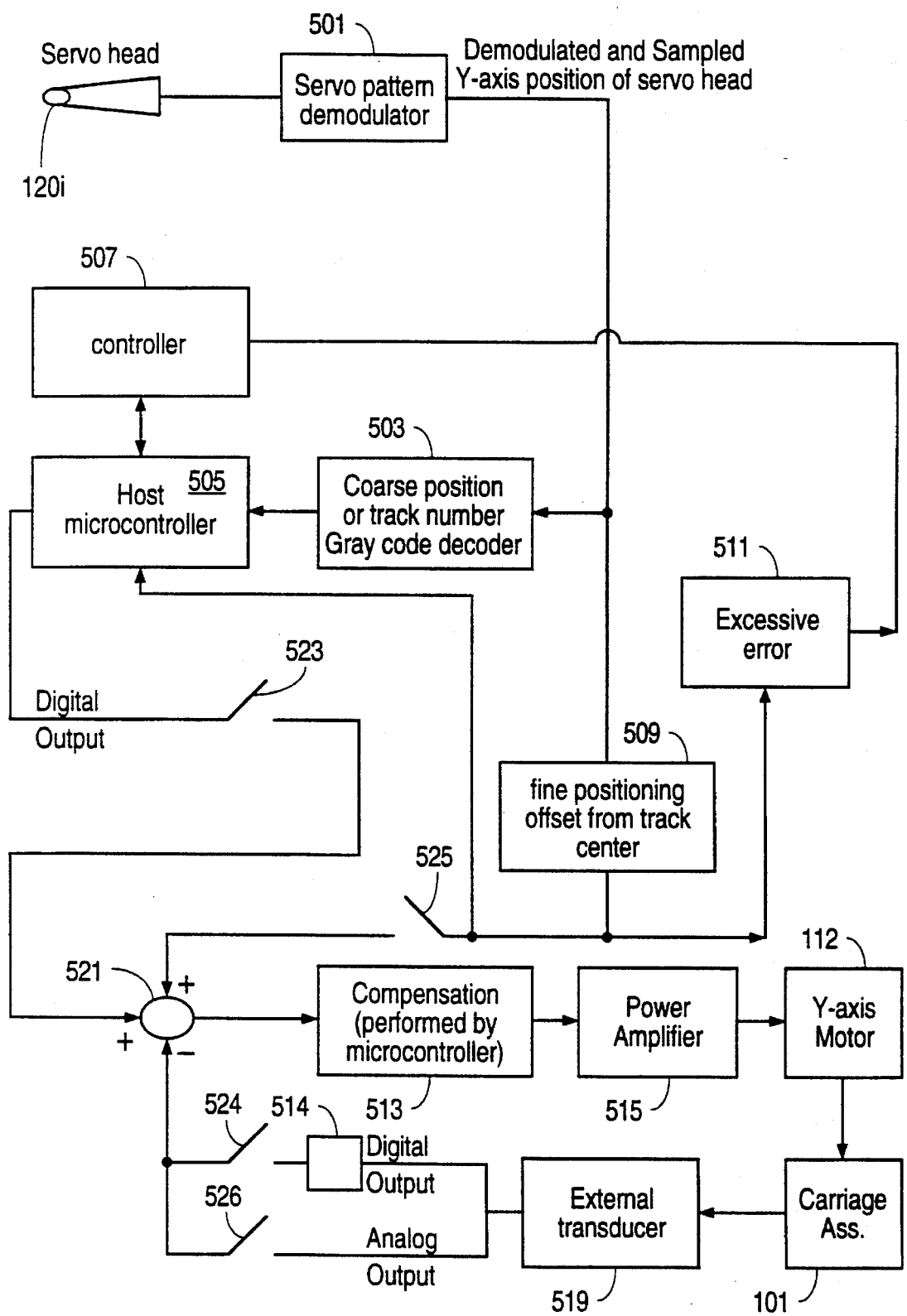
FIG. 28d is a block diagram of an alternate embodiment of the control circuitry used to properly position the heads over the desired tracks along the Y-axis.

FIG. 28*d* is a block diagram of an alternate embodiment of control circuitry used to properly position the heads over the desired tracks along the Y-axis. In addition to the blocks illustrated in FIG. 28*a*, FIG. 28*d* provides a feedback loop which includes an external transducer 519, a counter 514, and switches 524 and 526.

Figure 28E:
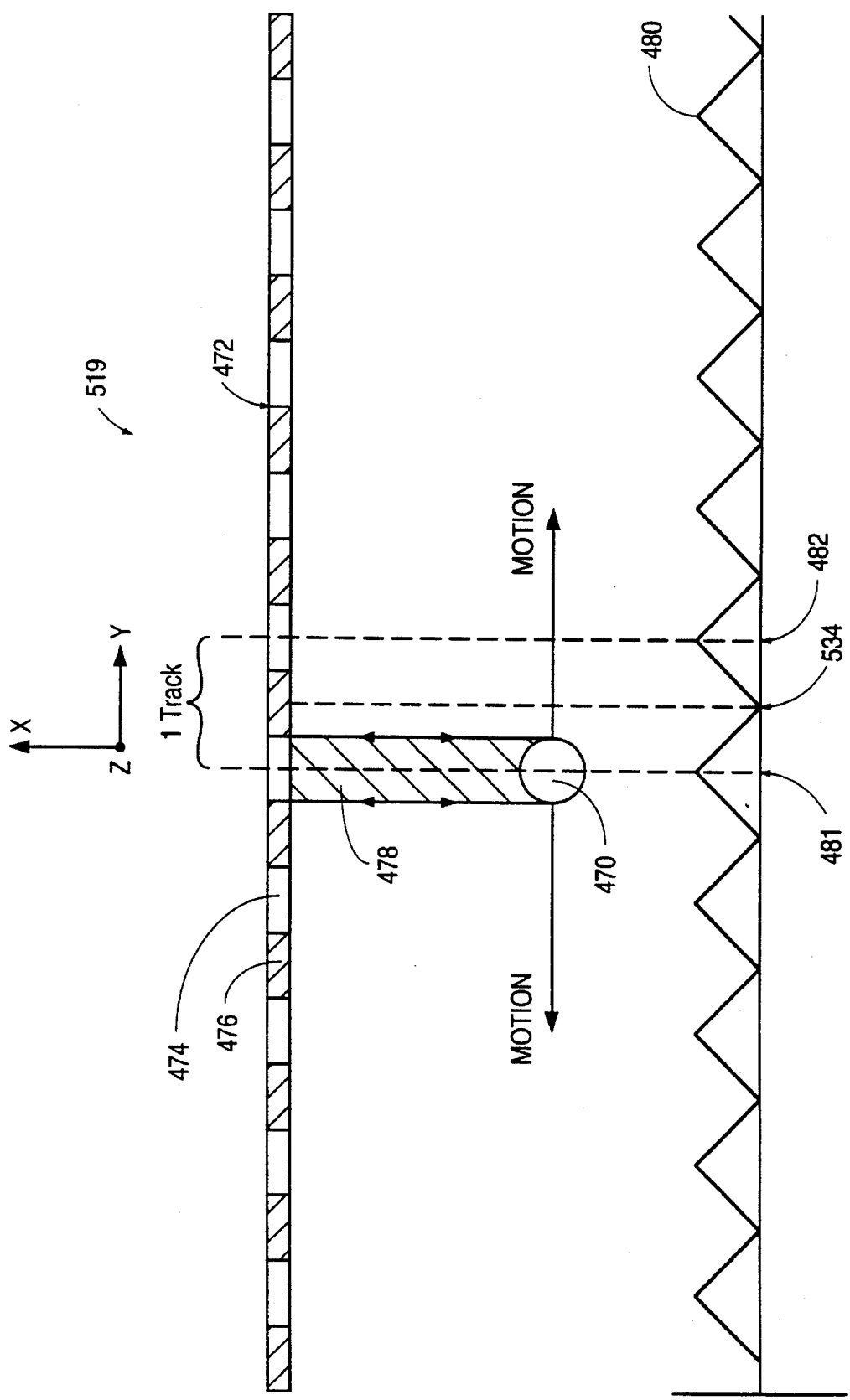
FIG. 28e is a schematic diagram of one embodiment of the external transducer block of FIG. 28d.
Figure 28F:
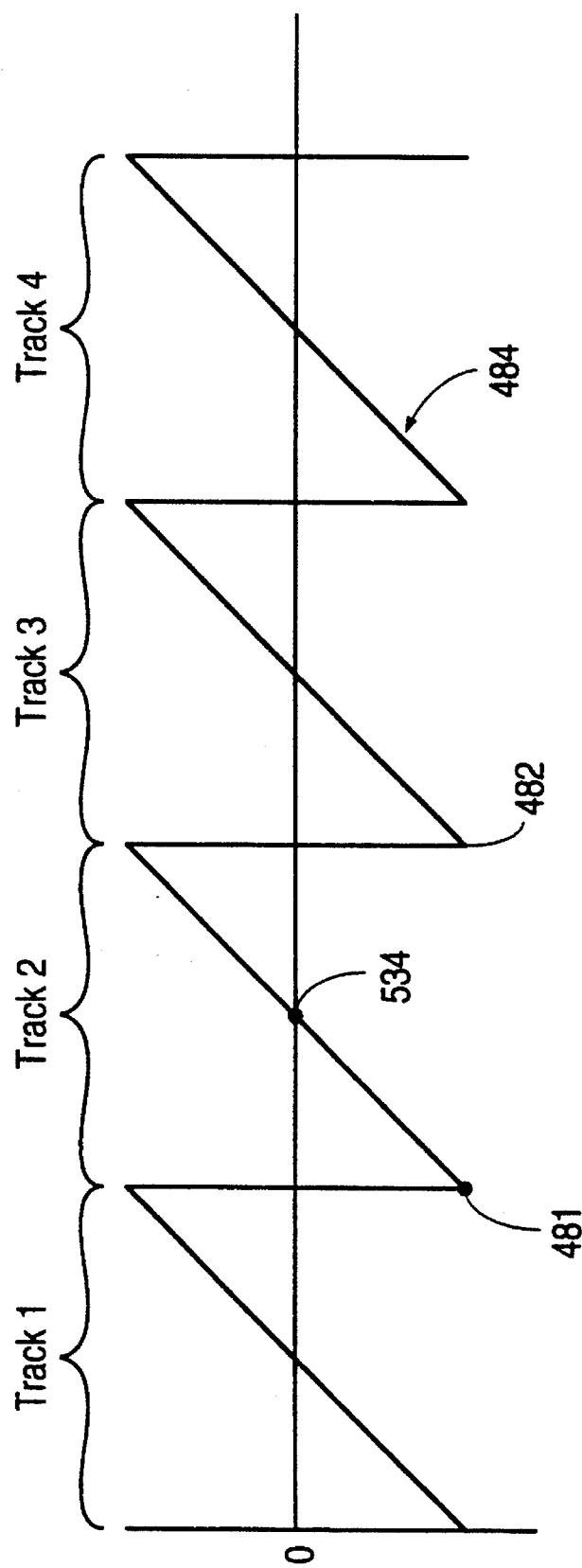
FIG. 28f is a graph of an analog feedback signal generated by the external transducer block of FIG. 28d.

Transducer 519 generates a positioning signal which indicates the actual position of carriage assembly 101 with respect to a predefined reference position. Transducer 519 generates a quadrature signal, i.e., two signals which are 90 degrees out of phase. FIG. 28*e* is a schematic diagram of one embodiment of external transducer 519. FIG. 28*e* illustrates how one of the quadrature signals 480 is generated. The light source/detector 470 is mounted on carriage 110 such that light beam 478 is aimed perpendicularly at fixed grating 472. Fixed grating 472 is positioned on housing 238 and contains reflective bars, such as reflective bar 474, and non-reflective bars, such as non-reflective bar 476, having equal widths. The width of the reflective and non-reflective bars is equal to one half of the width of each track. The width of light beam 478 emitted from light source/detector 470 is also equal to one half of the width of each track. As the carriage assembly 101 moves along the Y-axis, light beam 478 reflects from the reflective bars on grating 472 and is detected by light source/detector 470. The strength of the detected signal 480 is proportional to the portion of light beam 478 which is incident on a reflective bar. In one embodiment, the strength of the detected signal 480 is at a maximum at the end of each track (i.e., at positions 481 and 482) and at a minimum at the center of each track (i.e., at track center 534). In a similar manner, transducer 519 generates another triangular wave signal (not illustrated) which is ninety degrees out of phase with detected signal 480. The two detected signals are electronically modified to create analog feedback signal 484 illustrated in FIG. 28*f*. FIG. 28*f* is a graph of an analog feedback signal 484 generated by transducer 519. The vertical axis represents the strength of analog feedback signal 484 and the horizontal axis represents the position of servo head 120*i* along the Y-axis. Although the creation of analog feedback signal 484 has been described in accordance with a single embodiment, it is understood that the analog feedback signal 484 can be generated in different ways.

The zero-crossings of analog feedback signal 484 are used to create a digital feedback signal which is provided to node 521. This digital feedback signal indicates each time servo head 120*i* passes over a track. The digital feedback signal is provided to a counter 514 that is initialized to correspond to a known track number. In one embodiment, counter 514 is set to zero when servo head 120*i* is over servo track number zero. The digital feedback signal increments or decrements counter 514 (depending upon the direction of motion of the servo head 120*i* along the Y-axis) each time the light source/detector 470 detects a signal which signifies the end of a track. In this manner, the output of counter 514 indicates the track that servo head 120*i* is over.

During Y-axis track seeking, switches 523 and 524 are closed and switches 525 and 526 are open. Thus, the digital feedback signal from counter 514 and the output of host microcontroller 505 are provided to node 521. The output of node 521 is the difference between the positioning signal from host microcontroller 505 the digital feedback signal from counter 514. The output of node 521 is provided to compensation microcontroller 513. The output of compensation microcontroller 513 is amplified by power amplifier 515 and provided to Y-axis coil 112 to move carriage assembly 101 along the Y-axis.

Once the desired track has been reached, Y-axis track following is performed. During Y-axis track following, switches 523 and 524 are opened and switches 525 and 526 are closed. The position offset error signal from fine positioning block 509 is provided to node 521. Analog feedback signal 484 (FIG. 28*f*) from transducer 519 (FIG. 28*d*) is also provided to node 521. As illustrated in FIG. 28*f*, analog feedback signal 484 is ideally zero at the track center 534. The absolute value of the amplitude of analog feedback signal 484 increases as servo head 120*i* is positioned away from the Y-axis track center 534. The polarity of analog feedback signal 484 is dependent on the direction in which servo head 120i moves. The difference between the position offset signal from fine positioning block 509 and analog feedback signal 484 is provided to compensation microcontroller 513. By properly adjusting the position offset error signal by setting demodulator 501 and the external transducer gain, the input to compensation microcontroller 513 is positive if servo head 120i is positioned away from the track center 534 toward the first band 530. Conversely, this input is negative if servo head 120i is positioned away from the track center 534 toward the second band 532. The output of compensation microcontroller 513 is amplified by power amplifier 515 to create a current which moves carriage 110 a small distance along the Y-axis to center servo head 120i on the desired track.

As originally laid out, the Y-axis track center 534 corresponds to the zero of the analog feedback signal 484. However, with effects of temperature variation, aging, etc., the track center 534 and the zero point of the analog feedback signal 484 may not necessarily coincide. To overcome this problem, the entire servo system is calibrated by monitoring the position offset error signal (i.e., the output of the fine positioning block 509 in FIG. 28d) when memory storage module 100 is initially started. As servo head 120i moves along a servo track (X-axis), servo head 120i is moved a small fixed distance relative to the track center 534 along the Y-axis (i.e., along first band 531 and/or second band 532). As servo head 120i is moved along the Y-axis, compensation microcontroller 513 gains knowledge of the relative gains of servo demodulator 501 (volts/meter) as well as the gain associated with the analog output of the external transducer 519. Compensation microcontroller 513 adjusts the position of servo head 120i until the position offset error signal (as determined by the demodulator 501) is forced to zero. At this point, servo head 120i is positioned over the track center 534. However, the analog feedback signal 484 of external transducer 519 is not necessarily zero at track center 534. Consequently, compensation microcontroller 513 determines the value of analog feedback signal 484 (FIG. 28f) at the track center 534 and stores this value as an offset value. To perform the track following operation, compensation microcontroller 513 continually factors in this offset value when determining whether the difference between the position offset error signal and the analog feedback signal 484 of the external transducer 519 indicates that servo head 120i is positioned over track center 534.

X-axis Control

FIG. 29a is a block diagram of the control circuitry which controls the velocity of servo head 120i (and thereby the velocity of read/write heads 120a–h) along the X-axis. The velocity is controlled as a function of the position of servo head 120i along the X-axis.

In FIG. 29a, servo pattern demodulator 501 calculates the velocity of servo head 120i along the X-axis by reading magnetically encoded or embedded signals which are in one embodiment spaced a fixed physical distance apart on the servo track and measuring the time which elapses between reading these magnetic signals. The velocity of servo head 120i along the X-axis is provided to estimator block 537. In another embodiment, the physical distances between these signals are selected in accordance with the velocity profile of the servo head 120i such that a uniform time period elapses each time the servo head 120i passes over a signal.

The servo pattern demodulator 501 also decodes the X-axis Gray code which is magnetically embedded or encoded in the servo track. The X-axis Gray code indicates the position of servo head 120i along the X-axis. The X-axis Gray code information is provided to X-axis servo position block 531 which determines the position of servo head 120i along the X-axis. The position block 531 provides the position of the head 120i to velocity profile generator 533. Velocity profile generator 533 contains the desired velocity profile of servo head 120i and is programmed to output a signal representative of a preselected desired velocity for any position along the X-axis. In one embodiment, velocity profile generator 533 contains the velocity profile information illustrated in FIG. 25a. Velocity profile generator 533 receives the desired velocity profile information from host microcontroller 505 (not shown).

In one embodiment, the X-axis positioning and velocity information is obtained from a single magnetic signal on medium 116. In this embodiment, the signals which make up the X-axis Gray code are physically spaced apart a predetermined distance (or distances) along the X-axis of each servo track. Thus, each servo track contains identical X-axis positioning and velocity information at identical positions along the X-axis. The X-axis positioning and velocity information is contiguously written along the X-axis. Consequently, the X-axis positioning and velocity information is read by servo head 120i as servo head 120i moves along the X-axis, even if servo head 120i simultaneously moves along the Y-axis of medium 116. In other words, the X-axis positioning and velocity information is written in a phase coherent manner.

However, the velocity of servo head 120i decreases as the servo head approaches either end of the track during its oscillation along the X-axis. When the velocity of servo head 120i drops below the threshold velocity, servo head 120i is unable to read any information from the servo track. During this time, the servo pattern demodulator 501 is "blind" and therefore does not provide meaningful outputs. Consequently, during a "blind" period, the velocity profile generator 533 does not receive meaningful information from position block 531. The velocity of the servo head 120i along the X-axis is therefore estimated as a function of time during this period. To perform this estimation, a timing input 550 is provided to velocity profile generator 533 when the "blind" period starts. The velocity profile generator 533 then outputs a predetermined velocity signal which varies as a function of the timing input 550 and is based on the predictable velocity vs. time profile of the head array assembly 102 as illustrated in FIG. 25c.

Thus, velocity profile generator 533 provides a desired velocity signal throughout the entire range of motion of the servo head 120i. The desired velocity signal generated by velocity profile generator 533 is provided to node 535.

Estimator block 537 provides a signal representative of the estimated actual velocity to node 535. Estimator block 537 receives inputs from servo pattern demodulator block 501, compensation block 539 and velocity measurement blocks 543 and 547. Estimator block 537 calculates the estimated actual velocity from these inputs. Estimator block 537 is a dynamic system, which may exist in either hardware or software, whose state variables are an estimate of another observable dynamic system. Estimator block 537 is useful because direct measurement of state variables of interest may be difficult or costly. Even when direct measurement is feasible, estimation may be preferable because errors introduced by measuring sensors and circuits may be larger than the errors in estimating these variables. In one embodiment, estimator block 537 operates as a Kalman-filter. A Kalman filter is a state estimator that is optimum with respect to process noise and observation noise.

As previously discussed, the servo pattern demodulator 501 provides the actual velocity of servo head 120i along the X-axis. This velocity information is very reliable. However, this information is only available during the time that servo head 120i is moving faster than the threshold velocity and reading information from the servo track (i.e., in the middle of the track). When the velocity information is available from the servo pattern demodulator 501, estimator block 537 relies heavily on this velocity information to estimate the actual velocity.

However, when servo head 120i is moving slower than the threshold velocity (i.e., near the ends of the track), the servo pattern demodulator 501 does not provide a meaningful output. During this "blind" period, the estimator block 537 relies on the output of velocity measurement blocks 543 and 547 and compensation block 539 to determine the estimated velocity. Compensation block 539 and velocity measurement blocks 543 and 547 operate as follows.

X-axis motors 108–109 alternately receive drive signals from the compensation block 539 through variable gain amplifier 541 and switches 552 and 554. These drive signals provide current to X-axis motor coils 302 and 303 in X-axis motors 108 and 109, respectively (FIGS. 2, 18a–18b). Switches 551 and 552 are closed (and switches 553 and 554 are open) during the time that variable gain amplifier 541 is providing current to X-axis motor 108. During this time, no current is supplied to X-axis motor 109. However, because X-axis motor 108 is moving the head array assembly 102 (FIG. 14a), the coil 303 of X-axis motor 109 is moving through the magnetic field created by the permanent magnet present in X-axis motor 109. This motion causes X-axis motor 109 to act as a generator. As a result, a voltage which is proportional to the velocity of servo head 120i along the X-axis is induced in coil 303 of X-axis motor 109. The relationship between the linear velocity (v) and the induced voltage (emf) may be stated as follows:

$$emf = k_b \times v$$

where $k_b$ is the back emf constant. The back emf constant, $k_b$, which is equal to the force constant of the X-axis motor (in volts/(meters/second)), may be measured experimentally. The induced voltage is represented by velocity measurement block 543 which provides an output to estimator block 537 through switch 551. The output of compensation block 539 is also provided to estimator block 537.

During the time that variable gain amplifier 541 is providing current to X-axis motor 109, switches 553 and 554 are closed (and switches 551 and 552 are open). During this time, X-axis motor 109 provides the force required to move the head array assembly 102 and X-axis motor 108 acts as a generator. Also during this time, the outputs of compensation block 539 and velocity measurement block 547 (which provides a voltage proportional to the velocity of coil 302 in X-axis motor 108) provide inputs to estimator block 537.

Thus, servo pattern demodulator 501 and velocity measurement blocks 543 and 547 provide measured velocity information to estimator block 537 throughout the entire range of motion of servo head 120i. The estimator block 537 relies on this measured velocity information to generate its estimated velocity output signal during the time that the velocity of servo head 120i is less than the threshold voltage and is unable to read servo information.

The estimated velocity output signal from estimator block 537 is subtracted from the desired velocity output signal from velocity profile generator 533 at node 535. The difference between the actual and desired velocity signals is provided to compensation block 539. Compensation block 539 includes a microcontroller which generates an output which controls the gain of variable gain amplifier 541. The output of variable gain amplifier 541 is provided to X-axis motors 108–109 to appropriately adjust the speed of the servo head 120i (and thereby heads 120a–h) along the X-axis.

Switches 551–554 are controlled by switch control block 549. Switch control block 549 receives inputs from servo pattern demodulator 501, X-axis position block 531, estimator block 537, velocity measurement blocks 543 and 547 and timing input 550. In one embodiment of the present invention, switch control block 549 closes switches 551 and 552 and opens switches 553 and 554 such that the drive signal from variable gain amplifier 541 is provided to X-axis motor 108 at the same time that the velocity measurement is being taken from X-axis motor 109. When switch control block 549 receives a signal from X-axis position block 531 which indicates that servo head 120i has passed over the X-axis center of the servo track (i.e., the servo head has travelled half of the length of the servo track along the X-axis), switch control block 549 opens switches 551 and 552 and closes switches 553 and 554 such that the drive signal from variable gain amplifier 541 is provided to X-axis motor 109 at the same time that the velocity measurement is being taken from X-axis motor 108. In alternate embodiments, the other inputs of switch control block 549 may be used to control switching according to other algorithms.

Figure 29B:
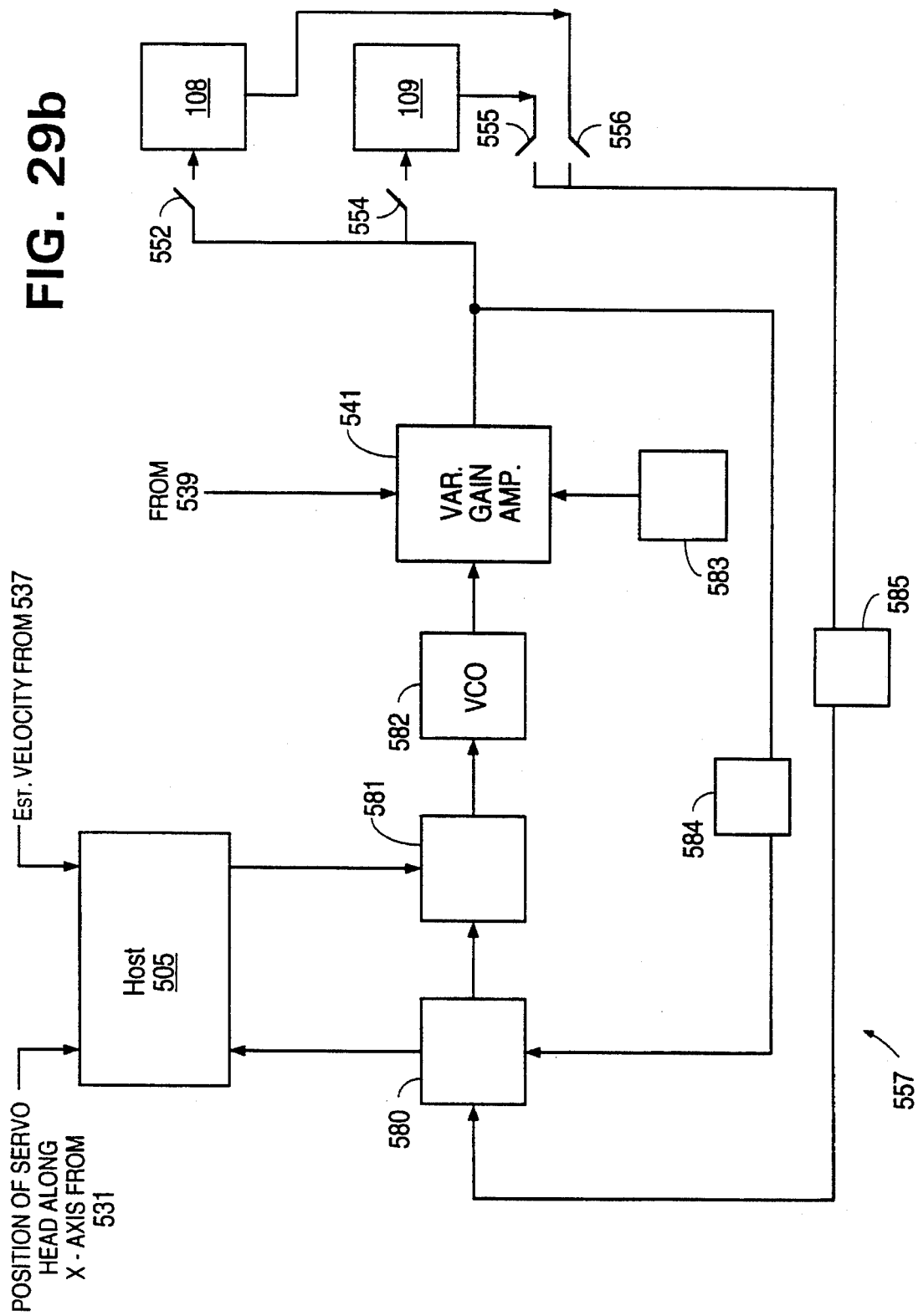
FIG. 29b is a block diagram of a phase locked loop used to control the output frequency of the variable gain amplifier of FIG. 29a, FIG. 30 is an isometric view of a laser interferometer used to write a servo stripe.

FIG. 29b is a block diagram illustrating a phase locked loop 557 used to control the operating frequency of X-axis motors 108–109. The output of compensation block 539 controls the magnitude of the output voltage of variable gain amplifier 541 by setting the gain of amplifier 541. Host microcontroller 505, phase comparator 580, loop compensation block 581, voltage controlled oscillator (VCO) 582, voltage sensor 584 and current sensor 585 are used to control the frequency at which X-axis motors 108–109 are driven. To accomplish this, voltage sensor 584 detects the voltage of the output of variable gain amplifier 541 and provides this voltage to phase comparator 580. Similarly, current sensor 585 senses the current flowing in the coils of either X-axis motor 108 or X-axis motor 109, depending on which X-axis motor is currently receiving the output of variable gain amplifier 541. Thus, switches 552 and 556 are simultaneously opened and closed and switches 553 and 555 are simultaneously opened and closed. The output of current sensor 585 is provided to phase comparator 580. Phase comparator 580 determines the phase difference between the outputs of voltage sensor 584 and current sensor 585. This phase difference is proportional to the difference between the drive frequency and the resonant frequency of X-axis motor 108 (or X-axis motor 109). Because X-axis motors 108 and 109 each approximates a second order system, the phase difference is zero when X-axis motor 108 or 109 is operating at its resonant frequency. When the phase locked loop 557 is locked (i.e., when the phase difference and the first and second derivatives of the phase difference are zero), phase comparator 580 provides a signal to host microcontroller 505 which indicates this condition. The output of phase comparator 580 is a DC signal which is representative of the actual phase difference. This output is provided to loop compensation block 581. Loop compensation block 581 also receives a phase offset input signal from host microcontroller 505. This phase offset input signal is representative of a desired phase difference. Loop compensation block 581 compares the actual phase difference with the desired phase difference. If a difference exists between the actual phase difference and the desired phase difference, loop compensation block 581 uses an algorithm to generate a DC signal representative of this difference. This DC signal is provided to VCO 582. This DC signal causes the frequency of the signal generated by VCO 582 to either increase or decrease, depending on whether the actual phase difference leads or lags the desired phase difference. In this manner, the frequency of the output of VCO 582 tracks the resonant frequency of X-axis motors 108 and 109. The circuitry of FIG. 29b will track shifts in the resonant frequencies of X-axis motors 108 and 109 which exist because of manufacturing variations between different X-axis motors. The circuitry of FIG. 29b will also track shifts in the resonant frequency of X-axis motors 108 and/or 109 which occur because of varying temperature during operation of the X-axis motors 108 and 109.

Host microcontroller 505 receives input signals from X-axis position block 531 and estimator block 537 (FIG. 29a). The signal received from X-axis position block 531 is representative of the X-axis position of the servo head 120i along the servo track. The signal received from estimator block 537 is representative of the actual velocity of the servo head 120i. When the signal from X-axis position block 531 indicates that the servo head 120i is at a particular point (e.g., the mid-point of the servo track along the X-axis), the host microcontroller 505 samples the estimated velocity signal from estimator block 537. If the estimated velocity signal is higher or lower than the expected velocity for that particular point, host microcontroller 505 can change the phase offset input signal which is provided to loop compensation block 581, thereby changing the output frequency of VCO 582 and adjusting the speed of X-axis motor 108 or 109. Host microcontroller 505 can also change the gain of variable gain amplifier 541 by loading a different velocity profile into variable gain amplifier 541, thereby changing the amplitude of the drive signal.

FIG. 29b also illustrates an optional limit sensor 583. Limit sensor 583 represents capacitive, inductive or optical switches that are used to insure that the amplitude of oscillation does not exceed a preselected amplitude. Limit sensors 583 limit the output of variable gain amplifier 541 when this preselected amplitude is exceeded. This condition is also signalled to host microcontroller 505.

The blocks illustrated in FIGS. 29a and 29b interact to control X-axis motors 108–109. As previously discussed, host microcontroller 505 can control the output frequency of variable gain amplifier 541 by changing the phase offset input signal which host microcontroller 505 provides to compensation block 581. In addition, host microcontroller 505 can change the desired velocity profile provided to velocity profile generator 533, thereby increasing the error signal which is transmitted from node 535 through compensation block 539 to variable gain amplifier 541.

Servo Writing

Figure 30:
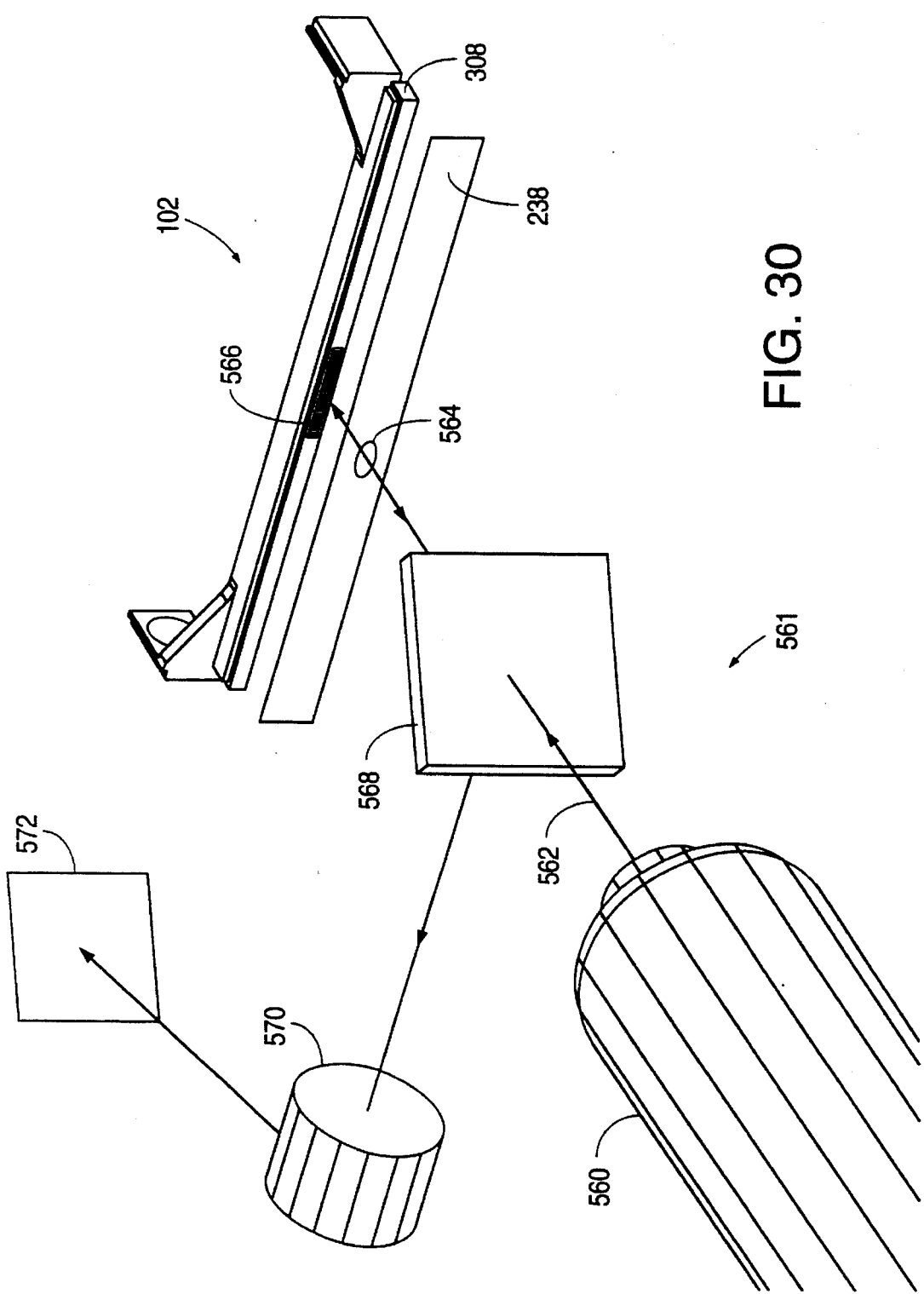

Another advantage of the present invention is that the dedicated servo stripe 369 can be written after memory storage module 100 has been assembled. FIG. 30 is an isometric view of laser interferometer 561 used to write servo stripe 369. To write servo stripe 369, a laser 560 is fixed at a distance from memory storage module 100. A laser beam 562 is applied along the Y-axis through beam splitter 568 and an opening 564 in the front of stationary housing 238 so that the laser beam 562 is incident on a grating 566 formed on the front of the head array assembly 102. The laser beam 562 reflects from the grating 566 and is directed through beam splitter 568 to detector 570. Grating 566 has spaced markings such that the position of the head array along the X-axis can be determined by the beam received by detector 570. The Y-axis position of head array 308 is determined by Standard interferometry methods in which the distance between the laser interferometer 560 and the grating 566 is determined by the phase of the reflected beam received by detector 570. In this manner, control circuitry 572 (which is coupled to detector 570) is able to determine the X and Y coordinates of the servo head as the servo head moves over the medium. Using this information, control circuitry 570 provides the appropriate signals to servo head 120i to write the appropriate servo information along the servo tracks. Opening 564 is sealed after servo stripe 369 is written. Physical and logical formatting of the memory device, including the data tracks, can be performed simultaneously with writing the servo track. In an alternate embodiment, grating is replaced with a reflective coating. In this embodiment, the X-axis position is determined by the control circuitry, given the frequency of microcontroller and the natural frequency of oscillation of the head array assembly 102. Because the servo writing is performed in situ, the positioning of the servo tracks is inherently more accurate than when dedicated servo writing is performed by another device. This improved accuracy allows for greater track density along the Y-axis.

Alternate Embodiment

Figure 31:
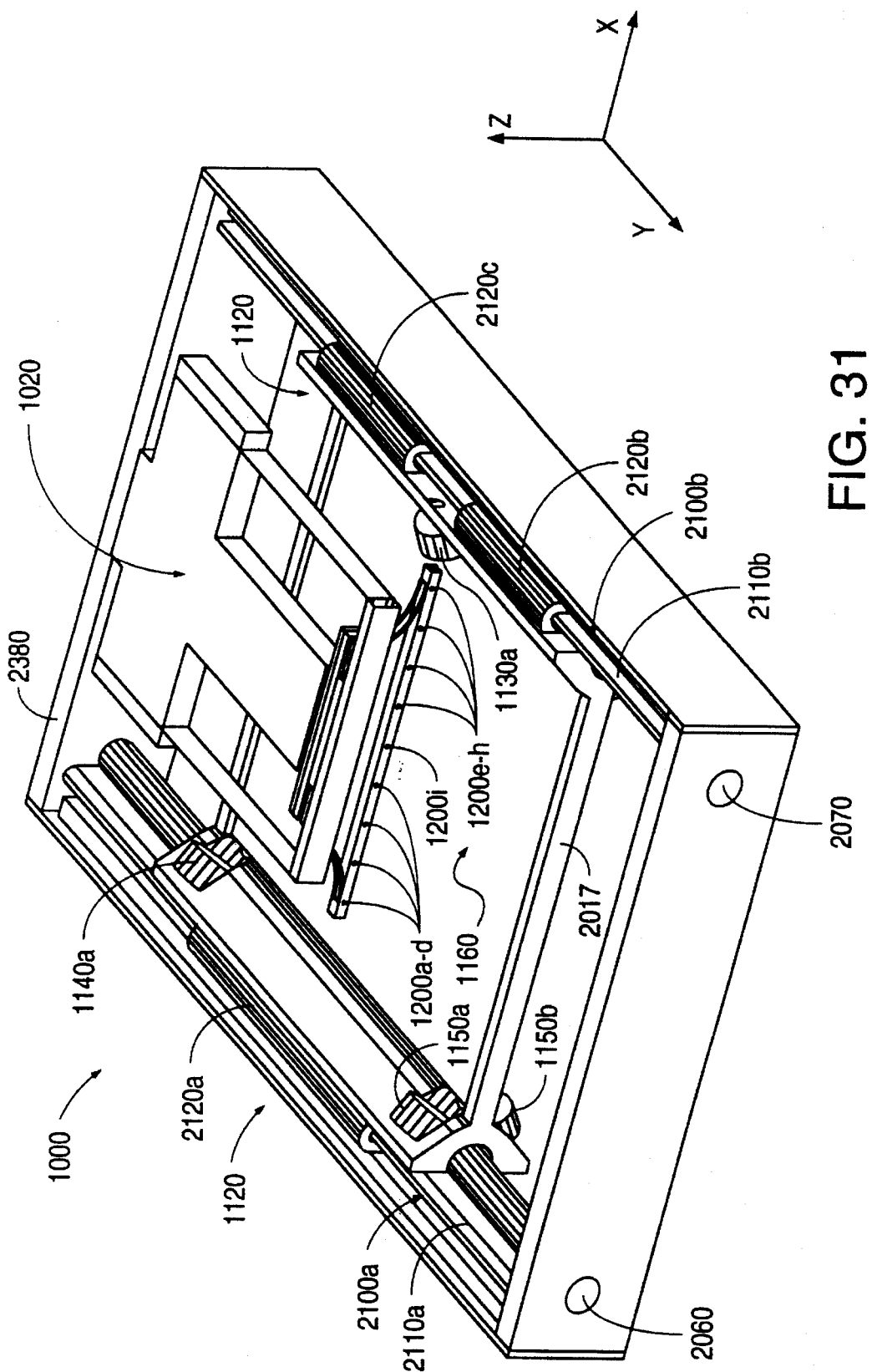
FIGS. 31–34 are isometric views of an alternative embodiment of a memory storage module in accordance with the present invention.

FIG. 31 is an isometric view of an alternative embodiment of a memory storage module in accordance with the present invention. In memory storage module 1000, a head array assembly 1020 (similar to head array assembly 102) is fixed to stationary housing 2380 and medium 1160 is moved with Y-axis motor 1120 to provide the relative motion between medium 1160 and heads 1200a–i along the Y-axis.

Figure 32:
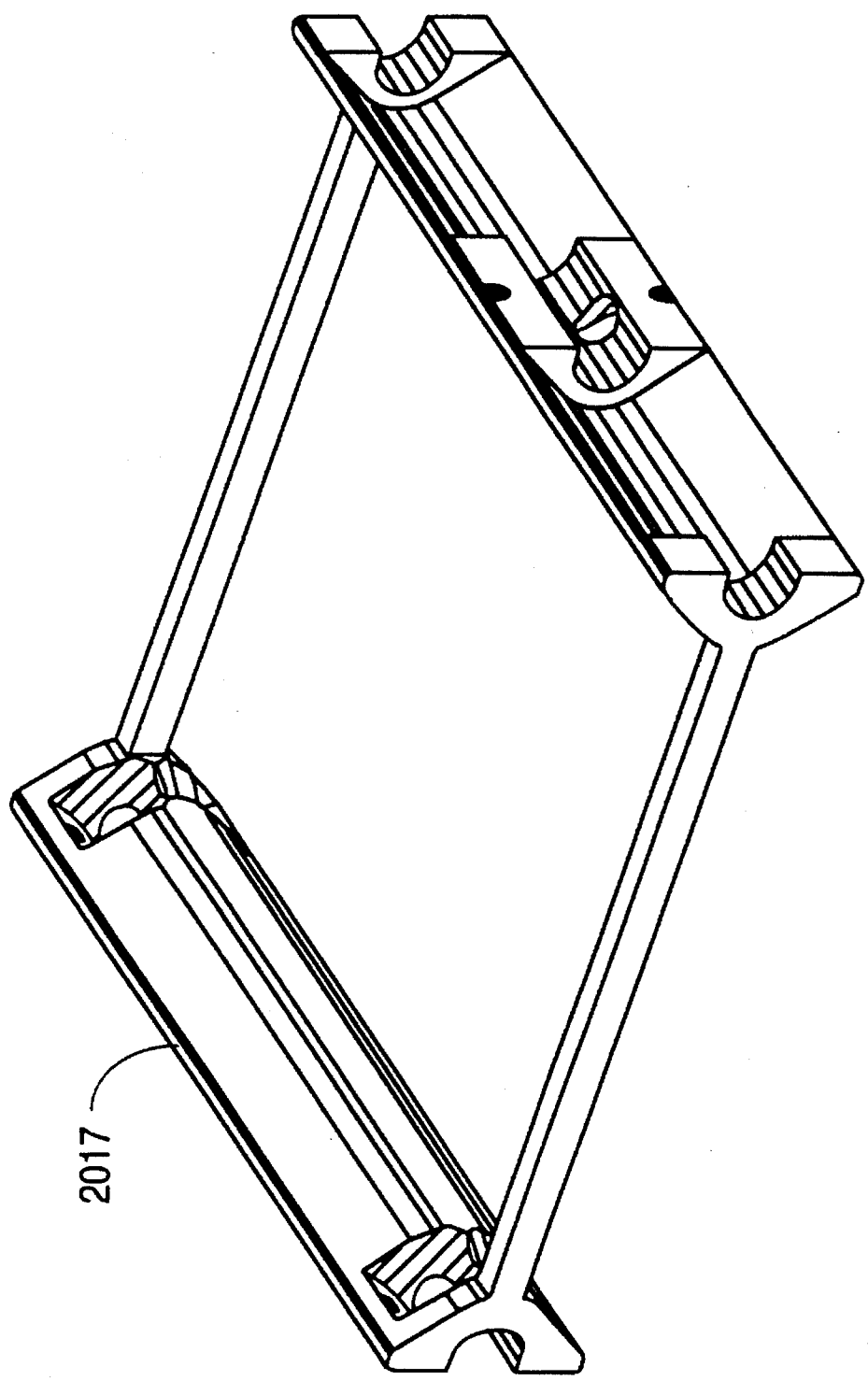
Figure 33:
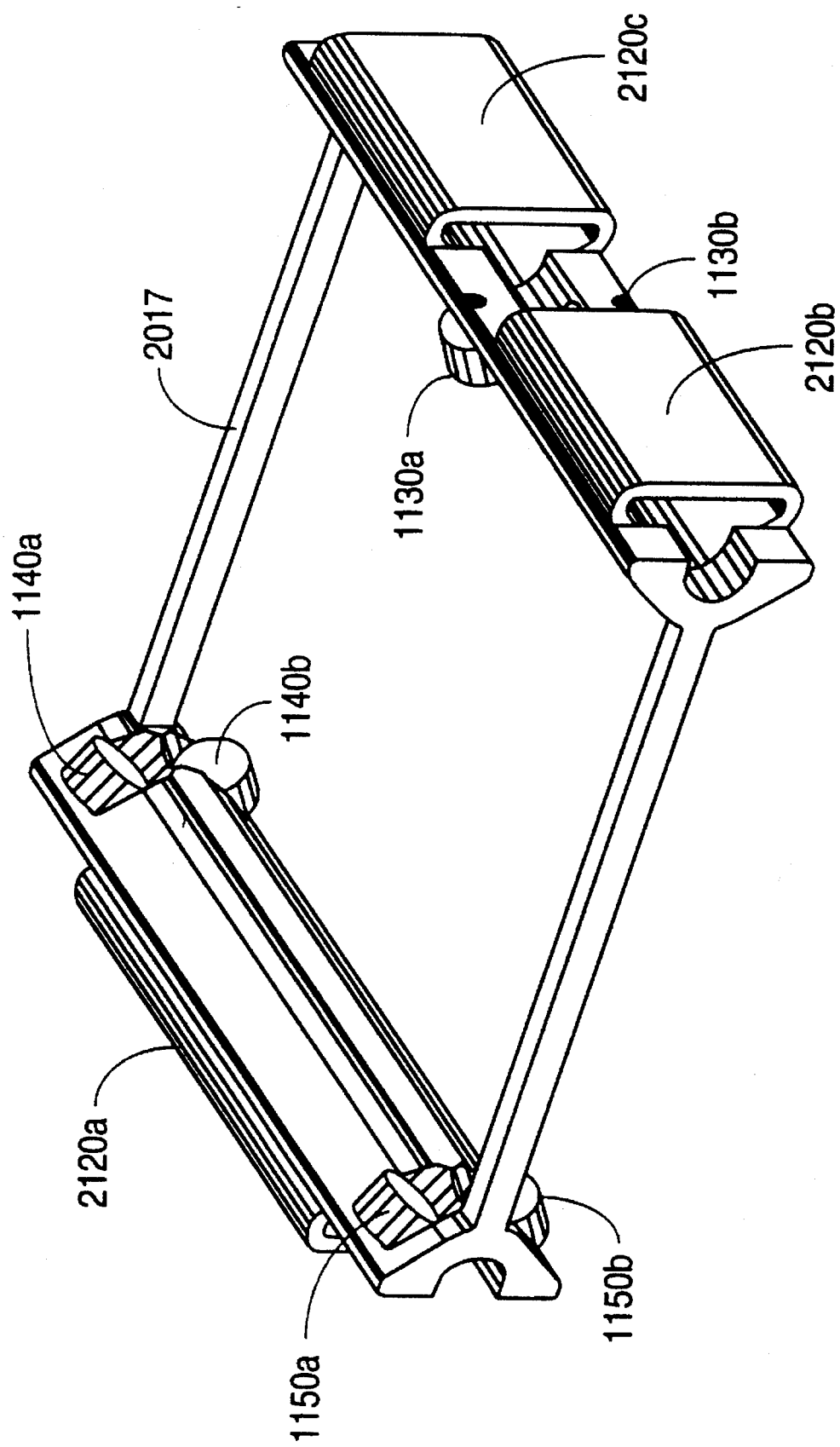
Figure 34:
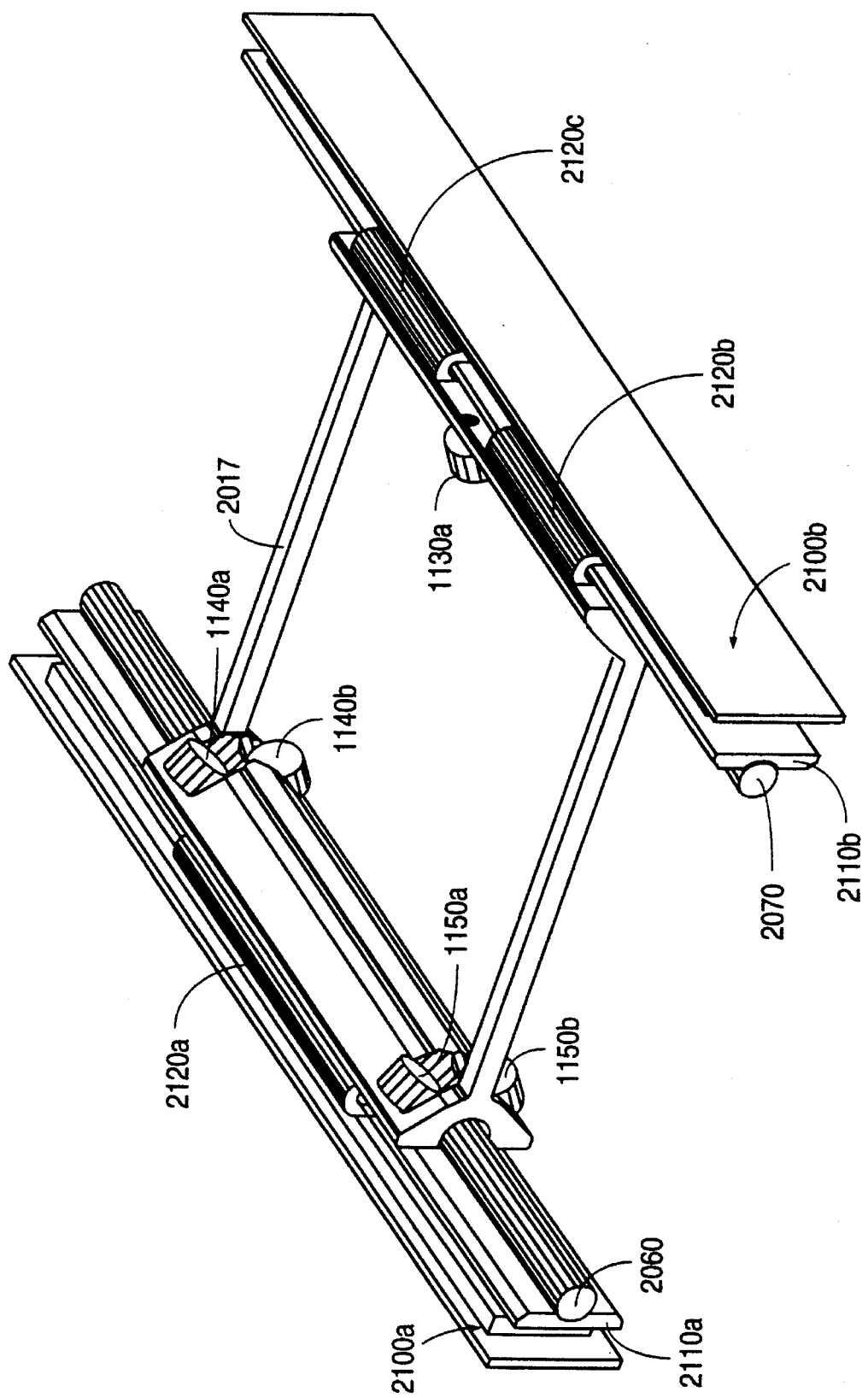
Figure 35:
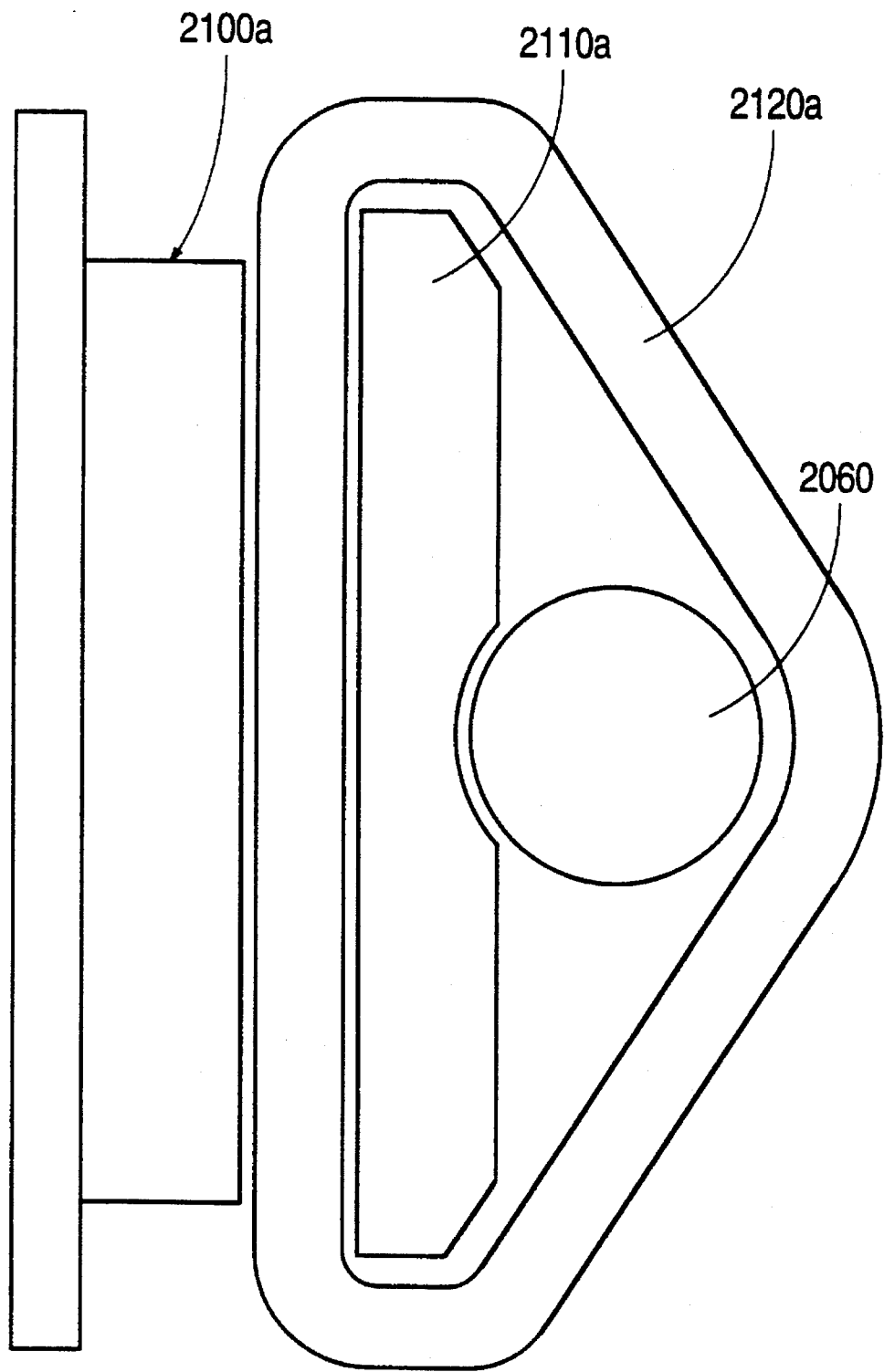
FIG. 35 is a cross section of a guide rod, a center pole, an upper pole, and a Y-axis coil of the memory-storage module illustrated in FIGS. 31–34.
Figure 36:
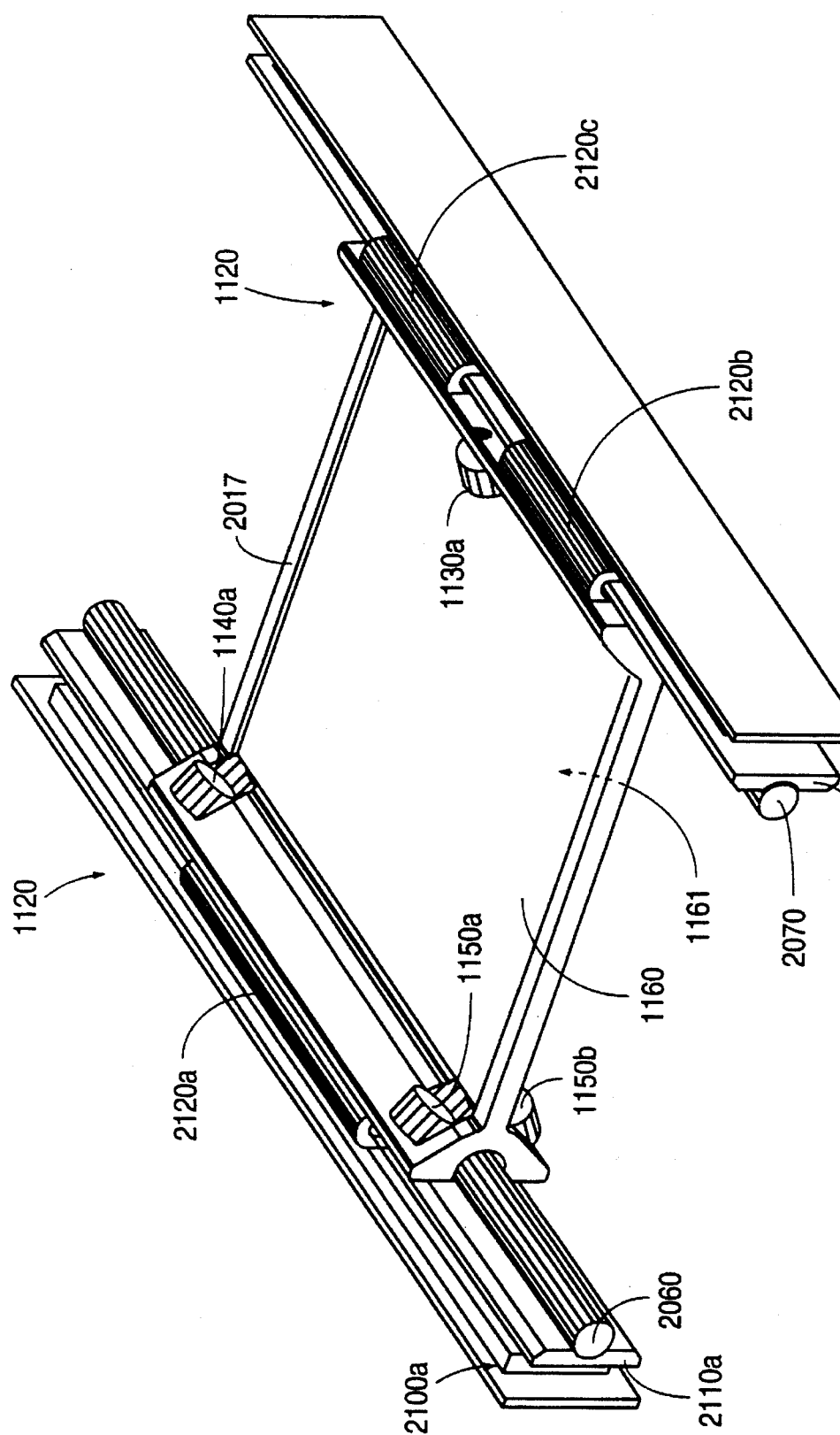
FIG. 36 is an isometric view illustrating a medium mounted in a frame of the memory storage module illustrated in FIGS. 31–35.

FIG. 32 is an isometric view of the frame 2017 of Y-axis motor 1120. FIG. 33 is an isometric view of rollers 1130a–1130b, 1140a–1140b and 1150a–1150b and Y-axis coils 2120a–2120c affixed to frame 2017. FIG. 34 is an isometric view of frame 2017, rollers 1130a, 1140a–1140b and 1150a–1150b and Y-axis coils 2120a–2120c positioned on guide rods 2060, 2070, upper poles 2100a–2100b and center poles 2110a–2110b. FIG. 35 is a cross section of guide rod 2060, center pole 2110a, upper pole 2100a, and Y-axis coil 2120a. Guide rod 2060 is affixed in a groove in center pole 2110a. Permanent magnets (not shown) are positioned between upper pole 2100a and center pole 2110a and between upper pole 2100b and center pole 2110b. Guide rod 2070 is movable along the X-axis and is preloaded against guide rollers 1130a–1130b. FIG. 36 is an isometric view illustrating medium 1160 mounted in frame 2017. Y-axis motor 1120 of memory storage module 1000 operates in a manner similar to Y-axis motor 112 of memory storage module 100. Thus, a current supplied to Y-axis coils 2120a–c interacts with magnetic fields between poles 2100a and 2110a and between poles 2100b and 2110b to create a force which moves media 1160 along the Y-axis.

As shown in FIG. 36, the opposite side 1161 of medium 1160 can also be utilized. In such an embodiment, an additional head array assembly (not shown) is mounted on the underside of stationary housing 2380 below head array assembly 1020 such that this additional head array assembly can cause information to be accessed and stored on side 1161 of medium 1160.

While the present invention has been described with reference to particular embodiments, this description is solely for the purpose of illustration and is not to be construed as limiting the scope of the invention. For example, the relative motion between the heads and the medium may be created in a number of different ways. As previously discussed, the medium, rather than the carriage assembly, can be moved to create relative motion between the heads and the medium along the Y-axis. In addition, the medium, rather than the head array assembly, can be oscillated along the X-axis to create relative motion between the heads and the medium along the X-axis.

Figure 37:
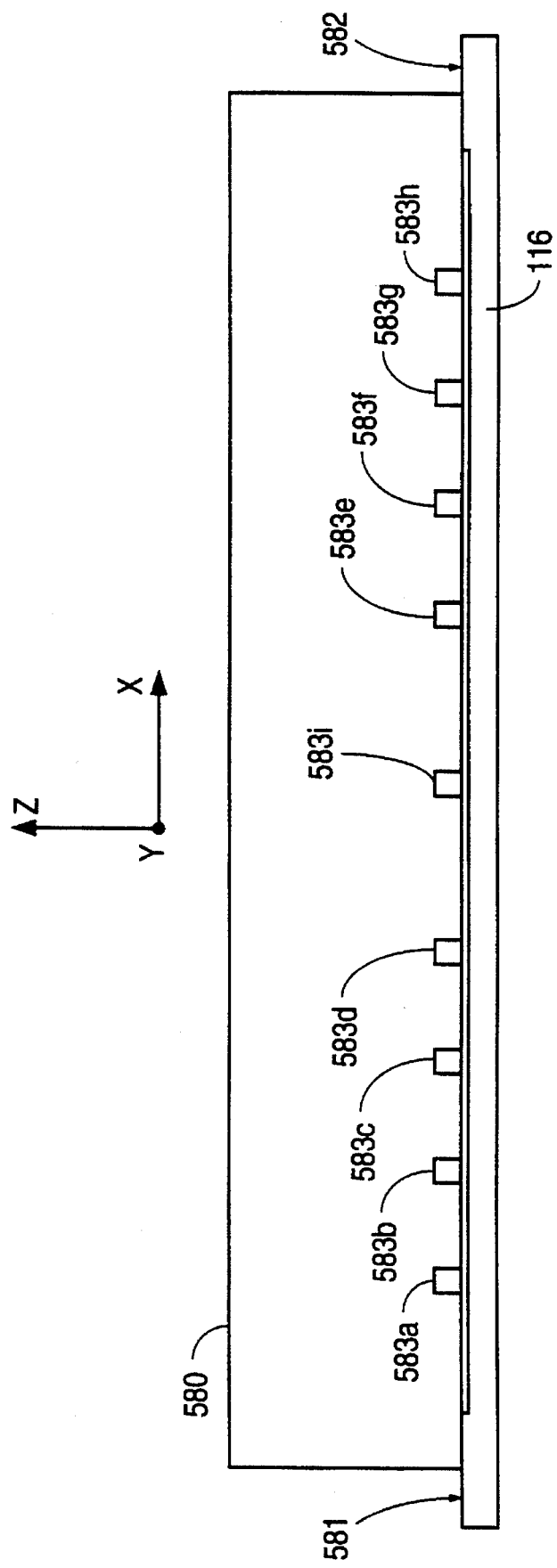
FIG. 37 is an end view of a generic head array resting on bearing strips.

In addition, a non-contact recording embodiment may be realized by positioning the magnetic heads a predetermined distance above the stationary medium 116. In one embodiment, this is accomplished by forming two bearing strips on either side of medium 116. FIG. 37 is an end view of a generic head array 580 which rests on bearing strips 581–582, thereby spacing the magnetic heads 583a–i a predetermined distance above medium 116. Bearing strips 581–582 are made of a wear-resistant material such as diamond-like carbon. In one embodiment, head to medium spacing is set at approximately three micro-inches. This distance is approximately equal to the effective diameter of an air molecule at standard temperature and pressure (taking into account Brownian movement). With a head to medium spacing of 3 micro-inches, air molecules are incompressible.

Figure 38:
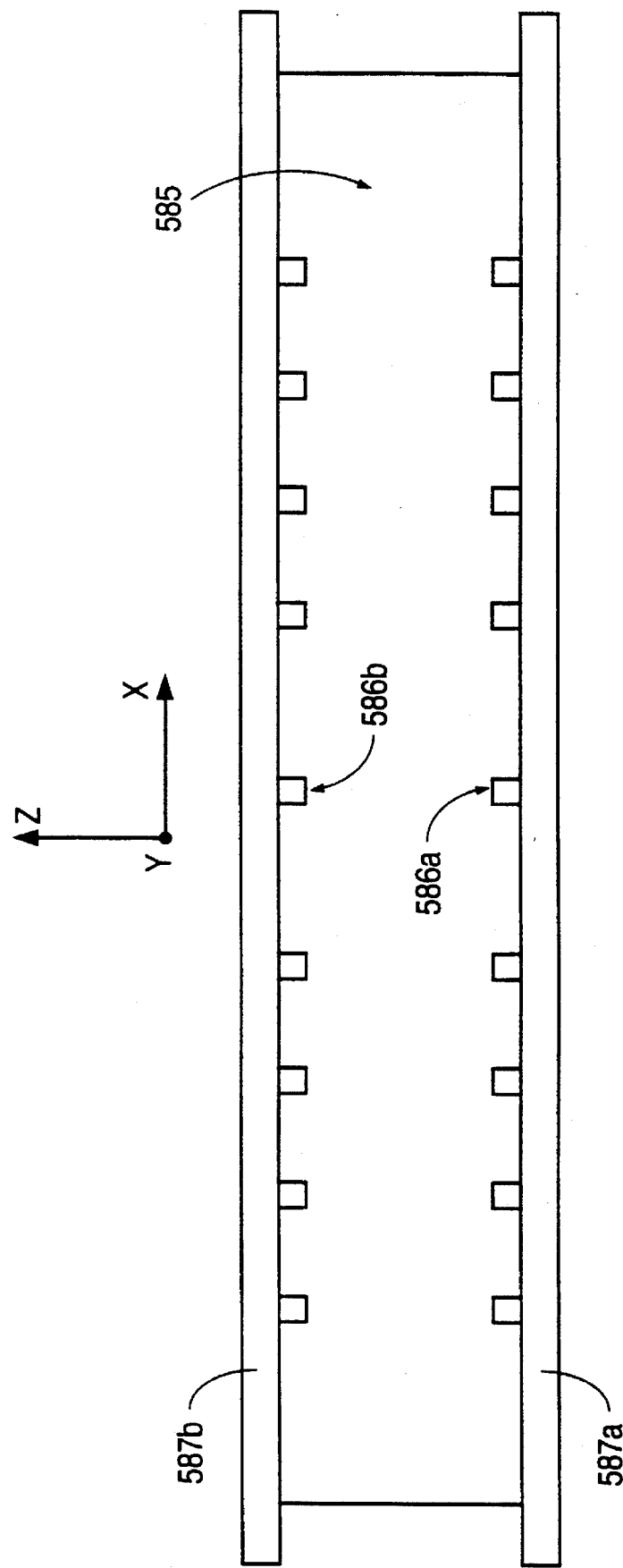
FIG. 38 is an end view of a generic head array which uses two sets of heads to access two media.

FIG. 38 is an end view of a generic head array 585 which uses two sets of heads 586a and 586b to access two media 587a and 587b. In this embodiment the same flexures (not shown) drive both opposing sets of magnetic heads 586a–586b.

Figure 39:
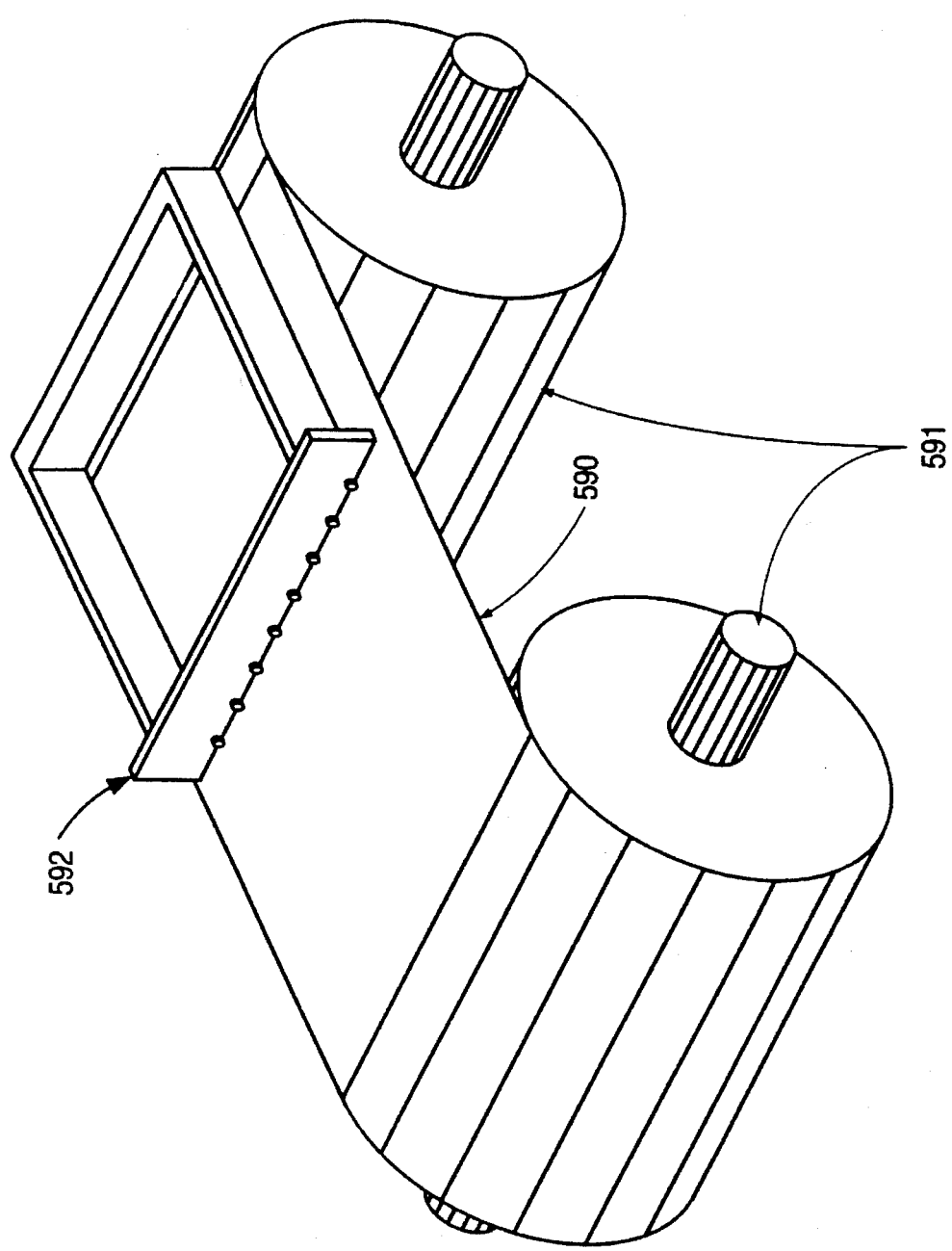
FIG. 39 is an isometric view of an alternate embodiment of a memory storage module which utilizes a flexible magnetic medium.

FIG. 39 is an isometric view of an alternate embodiment of the present invention in which medium 116 is replaced with a flexible medium 590. This modification allows a long magnetic medium 590 to be positioned by a roller-type mechanism 591, beneath carriage assembly 592.

Figure 40:
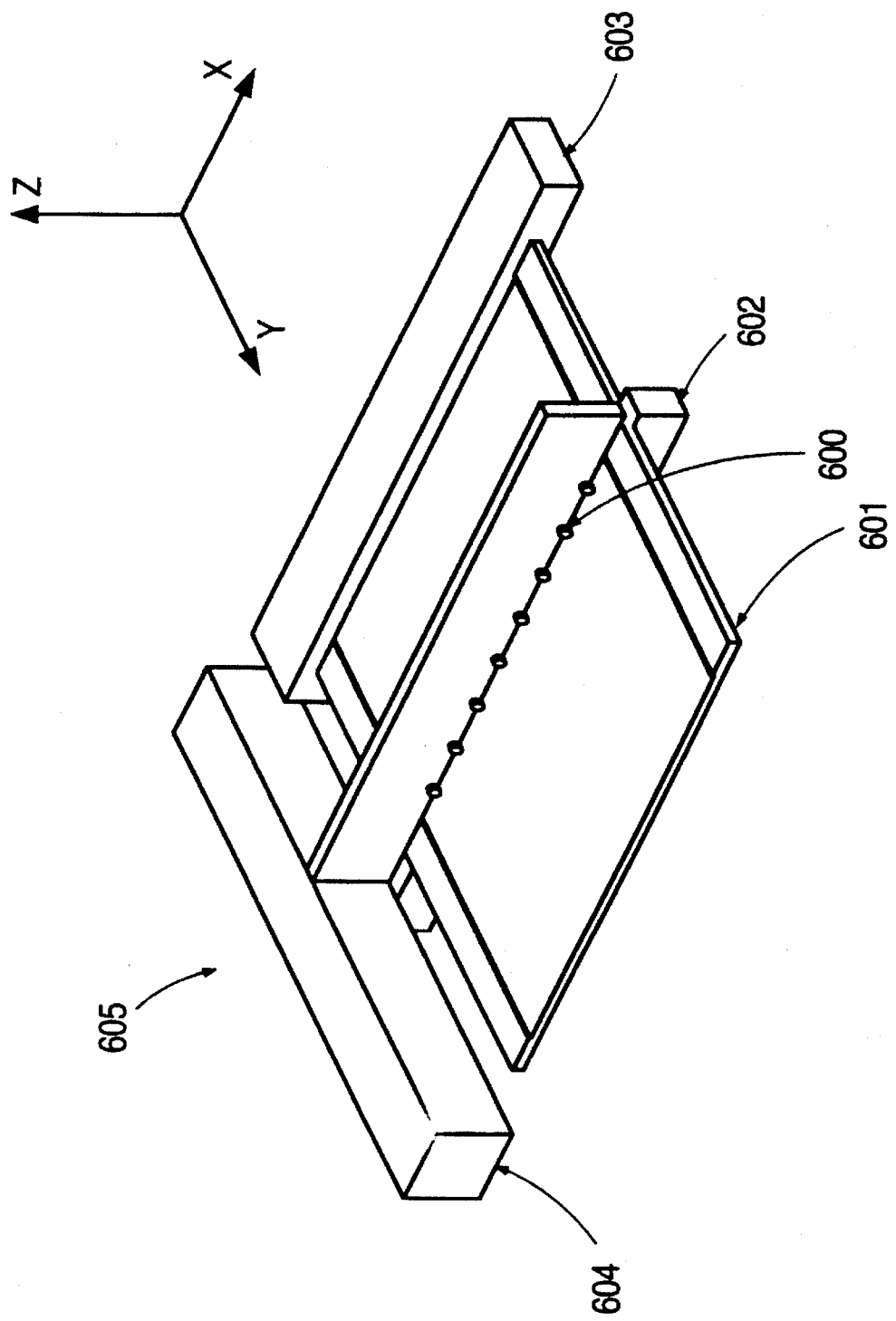
FIG. 40 is an isometric view of an alternate embodiment of a memory storage module which utilizes optical read/write technology.

The present invention can also be modified to utilize storage technologies other than magnetic storage. FIG. 40 is an isometric view of memory storage module 605 which utilizes optical read/write technology. Optical read/write heads 600 are positioned on one side of the optical medium 601 and optical detectors 602 are positioned on the other side of the optical medium 601. Medium motor 603 oscillates the medium 601 along the X-axis and Y-axis motor 604 moves heads 600 and detectors 602 along the Y-axis.

Figure 41:
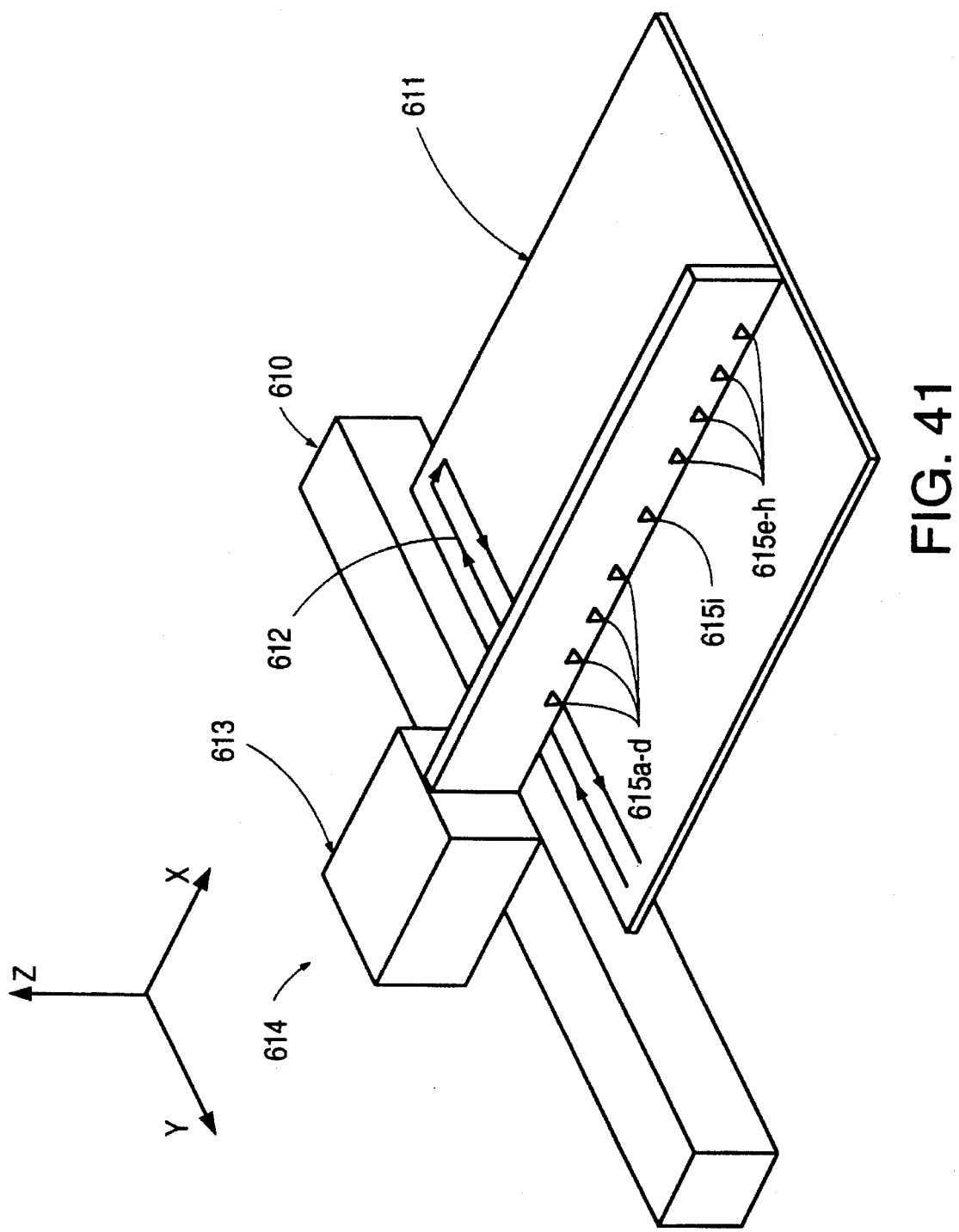
FIG. 41 is an isometric view of alternate embodiment of a memory storage module which utilizes tracks oriented along the Y-axis.

In another embodiment, the tracks on the medium are oriented along the Y-axis. FIG. 41 is an isometric view of memory storage module 614 which utilizes tracks along the Y-axis of medium 611. A Y-axis motor 610 moves heads 615a–b along the Y-axis of medium 611 to read or write information on the Y-axis tracks 612. Upon reaching the end of a Y-axis track 612, heads 615a–i are moved a small distance along the X-axis by an X-axis motor 613 to the next Y-axis track. Y-axis track 612 can be curvilinear, rectilinear or arc shaped, depending on the characteristics of Y-axis motor 610.

Figure 42A:
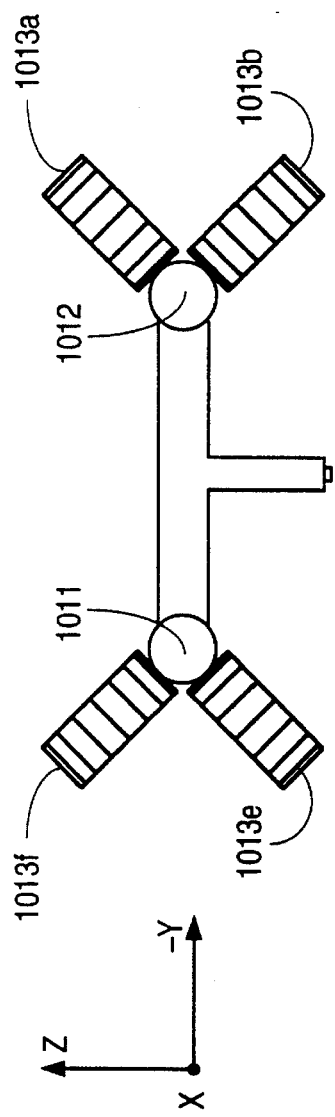
FIG. 42a is an end view of an alternate embodiment of a head array assembly.
Figure 42B:
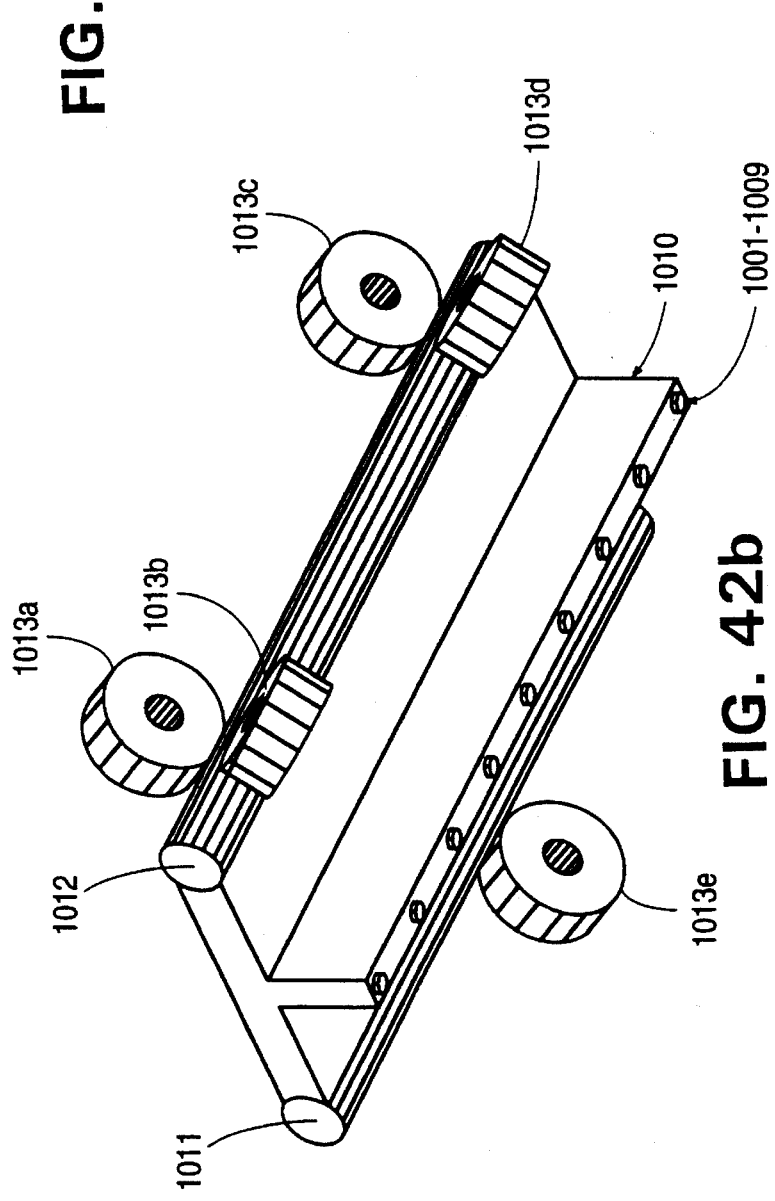
FIG. 42b is an isometric view of the head array assembly of FIG. 43a, FIG. 42c is a schematic diagram of a voice coil motor which can be used to drive the head array of FIGS. 42a–42b.

Additionally, the present invention contemplates alternate means of oscillating the heads with respect to the medium along the X-axis. FIG. 42a is an end view of head array 1010 which oscillates heads 1001–1009 in a linear manner along the X-axis. FIG. 42b is an isometric view of head array 1010. In this embodiment, head array 1010 is constructed with two parallel guide rods 1011 and 1012 and magnetic heads 1001–1009. Rolling bearings 1013a–f are arranged in angled pairs, typically two pairs 1013a–1013b and 1013c–1013d on one guide rod 1012 and one pair 1013e–1013f on the other guide rod 1011 with the axles of the bearings 1013a–1013f perpendicular to the guide rods 1011–1012. This allows head array 1010 to move along the X-axis. The axles of rolling bearings 1013a–1013f are attached to the frame relative to which the guided linear motion occurs.

Figure 42C:
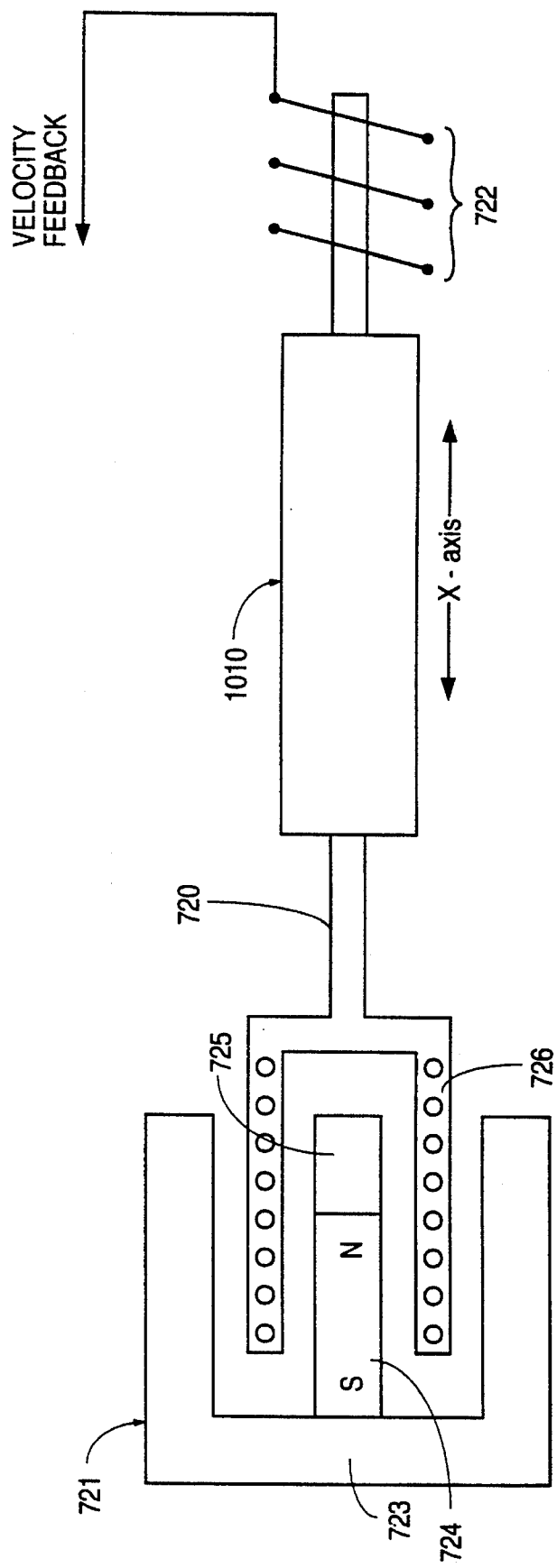
FIG. 42d is a schematic diagram of spring-type elements used to reduce the external energy required to oscillate the head array of FIGS. 42a–42b, and FIGS. 43 and 44 are schematic drawings illustrating embodiments in which heads are reciprocated along an axis other than the X-axis of the medium.

FIG. 42c is a schematic diagram of a voice coil motor 721 which can be used to drive head array 1010. Voice coil motor 721 is similar to previously described X-axis motors 108–109. Voice coil motor 721 includes return cup 723, permanent magnet 723, pole 725 and coil 726. Connecting bar 720 couples coil 726 to head array 1010 and transmits the oscillating force generated by voice coil motor 721 to head array 1010. Head array 1010 is also coupled to sensor element 722, which monitors the velocity of head array 1010. Sensor element 722 provides a velocity feedback signal which is used to control the velocity and frequency of motor 721. In one embodiment, sensor element 722 is similar to X-axis motor 109.

Figure 42D:
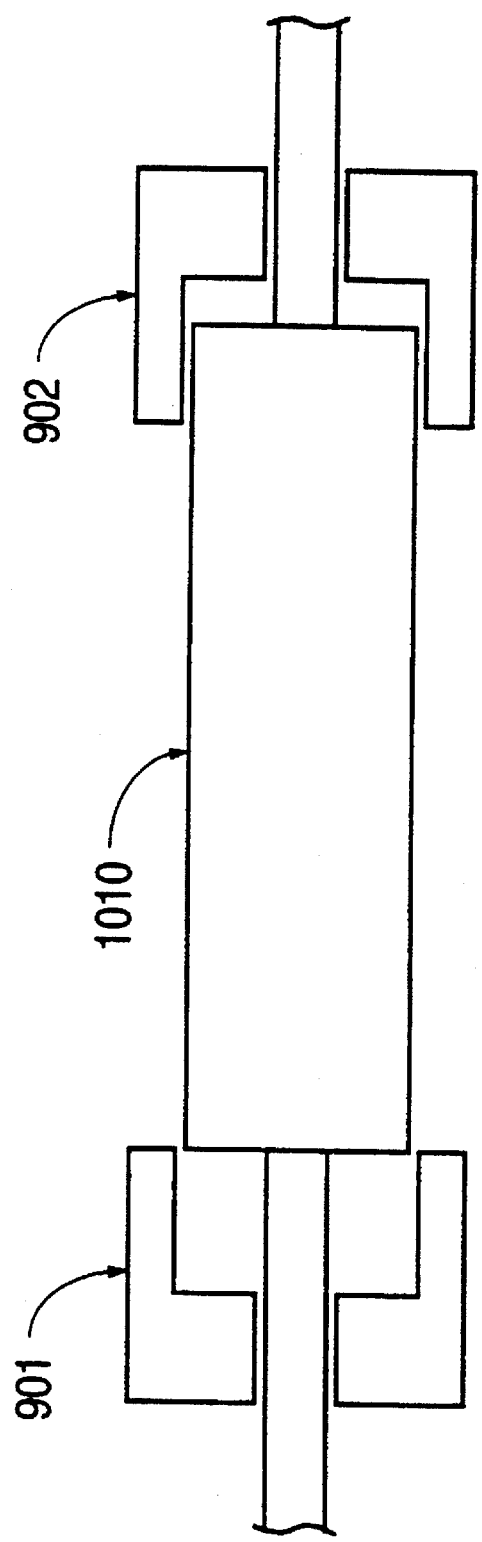

FIG. 42d is a schematic diagram of spring-type elements 901–902 used to reduce the external energy required to oscillate head array 1010. Spring-type elements 901–902 are stationary compression blocks which are formed to closely receive head array 1010. As head array 1010 approaches spring type element 902, air between these two elements is compressed. This compressed air provides a force which acts to reverse the motion of head array 1010. Spring type element 901 acts in a similar manner. This "air spring" reduces the amount of external energy required to change the direction of head array 1010.

Figure 44:
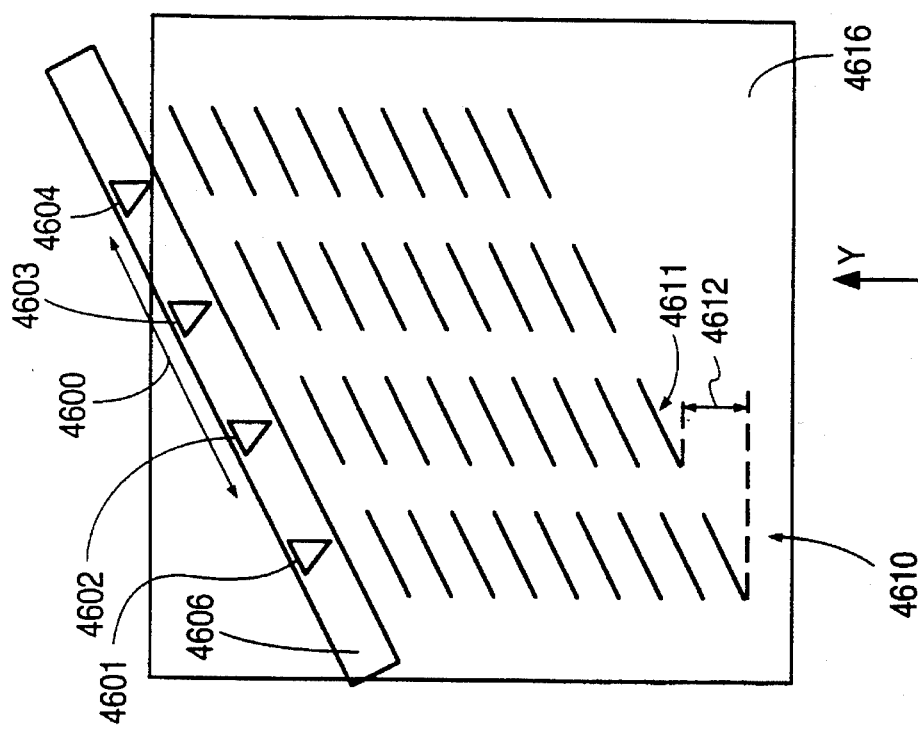
Figure 43:
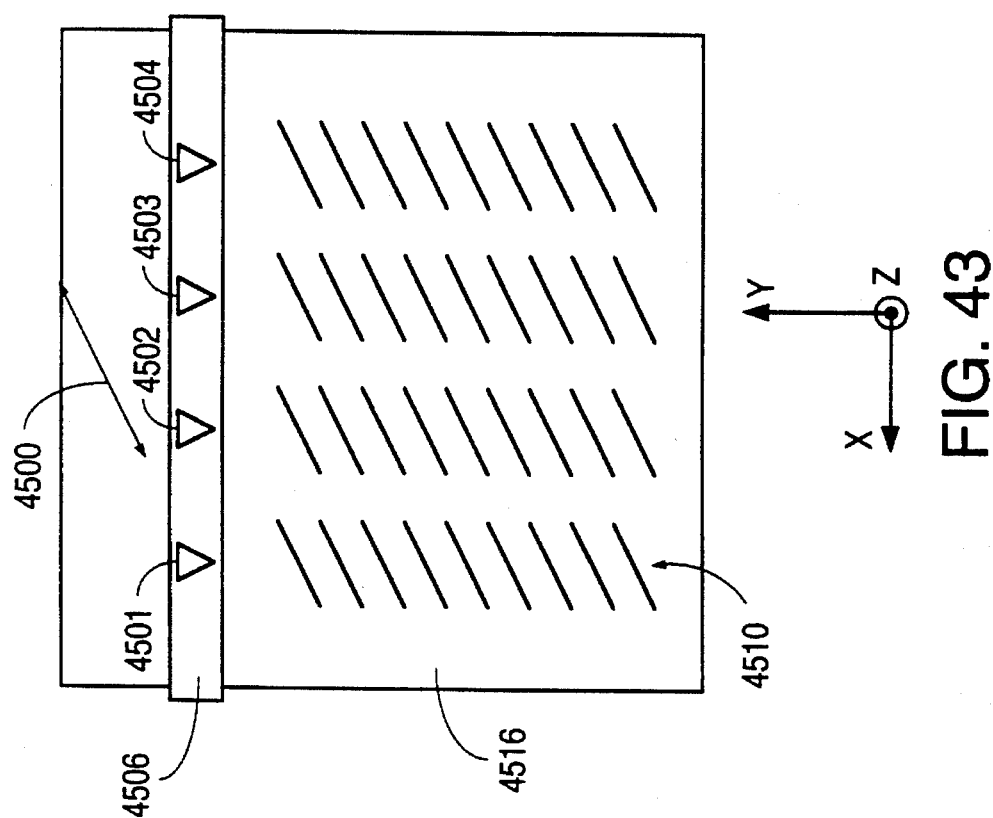

In other embodiments of the present invention, the axis along which the heads are reciprocated is not orthogonal to the Y-axis of the medium. FIGS. 43 and 44 are schematic drawings illustrating embodiments in which heads 4501–4504 and 4601–4604 are reciprocated along axis 4500 and axis 4600, respectively. In FIG. 43, head bar 4506, which contains heads 4501–4504, is aligned with the X-axis of medium 4516. However, head bar 4506 is reciprocated along axis 4500 to move heads 4501–4504 along the illustrated tracks on medium 4516. Track to track movement occurs along the Y-axis of medium 4516. Consequently, the stripes, such as stripe 4510, are aligned with the Y-axis. The tracks within the stripes are parallel to axis 4500.

In FIG. 44 head bar 4606, which contains heads 4601–4604, is aligned with axis 4600. Head bar 4606 is reciprocated along axis 4600 to move heads 4601–4604 along the illustrated tracks on medium 4616. Track to track movement occurs along the Y-axis of medium 4616. Consequently, the stripes, such as stripe 4610, are aligned with the Y-axis. The tracks within the stripes are parallel to axis 4600. Because head bar 4606 is positioned at an angle with respect to the X-axis of medium 4616, the adjacent stripes, such as stripes 4610 and 4611, are offset with respect to each other along the Y-axis by distance 4612. The embodiments illustrated in FIGS. 43 and 44 are desirable in applications in which longer tracks are required.

Other modifications and applications may be made by those skilled in the art without departing from the scope of the invention as defined in the following claims.

What is claimed is:

1. A memory storage module comprising:

a storage medium having a memory storage area arranged in relation to an X-axis and a Y-axis, said X-axis being perpendicular to said Y-axis, said medium being substantially flat along a plane defined by said X-axis and said Y-axis;

a carriage assembly comprising:.
  a carriage;

a head array assembly coupled to said carriage, wherein said head array assembly is capable of motion along a first axis of the plane;

a plurality of read/write heads coupled to said head array assembly and positioned adjacent to said medium; and a first motor coupled to said head array assembly for creating a reciprocating substantially linear motion between said plurality of read/write heads and said medium along said first axis;

a second motor for creating linear motion between said plurality of read/write heads and said medium along said Y-axis; and a servo head coupled to said head array assembly, said servo head reading servo information on said medium as said servo head moves across said medium along said X-axis, wherein said servo information is used to control said first motor and said second motor.

2. A method of positioning a servo head on a servo stripe of a medium, said medium having a memory storage area arranged in relation to an X-axis and a Y-axis, said Y-axis being perpendicular to said X-axis, said servo stripe comprising a plurality of substantially linear servo tracks, each of said plurality of substantially linear servo tracks being parallel to said X-axis, said method comprising the steps of moving said servo head along said X-axis to read servo information on one of said servo tracks, said servo information representative of an actual position of the servo head along said Y-axis, generating a first signal representative of the actual position of the servo head along said Y-axis, generating a second signal representative of a desired position of the servo head along said Y-axis, and generating an output signal based on said first and second signals, wherein said output signal moves the servo head from the actual position along the Y-axis to the desired position along the Y-axis.

3. The method of claim 2, further comprising the steps of, generating a feedback signal representative of the distance between the actual position of the servo head along the Y-axis and the desired position of the servo head along the Y-axis, and using said feedback signal to control the velocity of the servo head along the Y-axis.

4. The method of claim 3, wherein the velocity of the servo head decreases as the distance between the actual position of the servo head along the Y-axis and the desired position of the servo head along the Y-axis decreases.

5. The method of claim 3, wherein said feedback signal is generated by an optical transducer.

6. A method of positioning a servo head on a servo track of a medium, said medium having a memory storage area arranged in relation to an X-axis and a Y-axis, said Y-axis being perpendicular to said X-axis, said servo track being parallel to said X-axis, said method comprising the steps of moving said servo head along said X-axis to read centering information stored on said servo track, said centering information comprising a first band and a second band on said medium, said first band and said second band each being parallel to said X-axis, whereby said servo head receives a first signal proportional to a portion of said servo head positioned over said first band and said servo head receives a second signal proportional to a portion of said servo head positioned over said second band, generating a third signal corresponding to a difference between said first signal and said second signal, and using said third signal move said servo head along said Y-axis toward the center of the servo track.

7. A method of controlling the velocity of a servo head, said servo head linearly moving over a servo track of a medium, said medium having a memory storage area arranged in relation to an X-axis, said servo track being parallel to said X-axis, said method comprising the steps of generating a first signal representative of an actual velocity of the servo head along said X-axis, generating a second signal representative of a position of the servo head along said X-axis, providing said second signal to a velocity profile generator, generating a third signal within said velocity profile generator, wherein said third signal is representative of a desired velocity of said servo head along said X-axis, said desired velocity corresponding to the actual position of said servo head along said X-axis, and using the difference between the first and third signals to control the velocity of the servo head along said X-axis.

8. The method of claim 7, wherein said step of generating said third signal comprises the steps of determining when the velocity of the servo head is greater than or less than a threshold velocity, and if the velocity of the servo head is greater than the threshold velocity,
reading X-axis position signals on said servo track to determine the actual position of said servo head along said X-axis,
generating said second signal in response to said X-axis position signals, and
generating said third signal in response to said second signal, and, if the velocity of the servo head is less than the threshold velocity,
starting a timing input,
providing the timing input to the velocity profile generator, and
generating said third signal in response to said timing input, said third signal being a predetermined velocity signal which varies as a function of the timing input, wherein said predetermined velocity signal is based on a predictable velocity profile of the servo head.

9. The method of claim 7, wherein said servo head is moved in a reciprocating motion by alternately driving two X-axis motors, wherein the step of generating said first signal further comprises the steps of reading a plurality of velocity signals which are spaced a fixed distance apart on said servo track, measuring the time which elapses between the reading of each of said velocity signals, calculating an actual velocity signal representative of the actual velocity of the servo head along said X-axis, measuring an induced voltage in an X-axis motor which is not being driven, generating a first estimated velocity signal from said induced voltage, said first estimated velocity signal representative of an estimated velocity of the servo head along said X-axis, and filtering said actual velocity signal and said first estimated velocity signal to create a second estimated velocity signal.

10. A method for storing and accessing information on a plurality of substantially linear data tracks of a magnetic medium, said magnetic medium having a memory storage area arranged in relation to an X-axis and a Y-axis, wherein each of said plurality of data tracks is parallel to said X-axis, said method comprising the steps of positioning a read/write head adjacent to a first data track of said magnetic medium, reciprocating said read/write head in a substantially linear manner along said X-axis, thereby moving said read/write head along said first data track, causing said read/write head to store and access information on said first data track as said read/write head moves along said first data track, moving said read/write head along said Y-axis, whereby said read/write head is positioned adjacent to a second data track of said magnetic medium, reciprocating said read/write head in a substantially linear manner along said X-axis, thereby moving said read/write head along said second data track, and causing said read/write head to store and access information on said second data track as said read/write head moves along said second data track.

* * * * *